(12) United States Patent
Itoh

(10) Patent No.: US 7,233,508 B2
(45) Date of Patent: *Jun. 19, 2007

(54) CHARGE PUMP CIRCUIT AND POWER SUPPLY CIRCUIT

(75) Inventor: Kohzoh Itoh, Hyogo-ken (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/396,625

(22) Filed: Apr. 4, 2006

(65) Prior Publication Data

US 2006/0176718 A1 Aug. 10, 2006

Related U.S. Application Data

(63) Continuation of application No. 11/022,952, filed on Dec. 28, 2004, now Pat. No. 7,050,315, which is a continuation of application No. 10/414,153, filed on Apr. 16, 2003, now Pat. No. 6,853,566.

(30) Foreign Application Priority Data

Apr. 18, 2002 (JP) .............................. 2002-116403
May 15, 2002 (JP) .............................. 2002-140442
May 27, 2002 (JP) .............................. 2002-152846

(51) Int. Cl.
  *H02M 3/18* (2006.01)
(52) U.S. Cl. ........................................ 363/60; 327/536

(58) Field of Classification Search .................. 363/60, 363/59; 327/536; 361/18
See application file for complete search history.

(56) References Cited

U.S. PATENT DOCUMENTS

| 4,807,104 A | * | 2/1989 | Floyd et al. .................. 363/59 |
| 5,461,557 A | | 10/1995 | Tamagawa |
| 6,438,005 B1 | | 8/2002 | Walter |
| 6,738,272 B2 | | 5/2004 | Yamanaka et al. |

FOREIGN PATENT DOCUMENTS

| JP | 10-14218 | 1/1998 |
| JP | 2001-169537 | 6/2001 |

* cited by examiner

*Primary Examiner*—Shawn Riley
(74) *Attorney, Agent, or Firm*—Dickstein Shapiro LLP

(57) ABSTRACT

A charge pump circuit is provided for generating a voltage (1+1/n) times as high as a supply voltage. The charge pump circuit eliminates the need for diodes for preventing a current from flowing back from a high potential side of capacitors to prevent a reduction in the voltage due to a forward voltage, and reduces a reactive current and latch-up when the charge pump circuit is integrated into a single IC chip. The charge pump circuit includes a fourth switching element having a substrate gate connected to a drain for preventing a current from flowing back to an input terminal from a high potential side of fly back capacitors connected in series, and a second switching element having a substrate gate connected to a drain for preventing a current from flowing back from a high potential side of a catch-up capacitor to the fly back capacitors connected in series.

8 Claims, 30 Drawing Sheets

| FIG. 13A |
| FIG. 13B |

CHARGE PUMP CIRCUIT AND POWER SUPPLY CIRCUIT

CROSS REFERENCE TO RELATED APPLICATIONS

This application is a continuation of application Ser. No. 11/022,952, filed Dec. 28, 2004 now U.S. Pat. No. 7,050,315, which is a continuation of application Ser. No. 10/414,153, filed Apr. 16, 2003, now U.S. Pat. No. 6,853,566, which is based on Japanese patent application, No. 2002-116403 filed on Apr. 18, 2002, No. 2002-152846 filed on May 27, 2002, and No. 2002-140442 filed on May 15, 2002 in the Japanese Patent Office, the entire contents of all of which are incorporated by reference herein.

BACKGROUND OF THE INVENTION

1. Field of the Invention

The present invention relates to a charge pump circuit for use in a power supply circuit, and more particularly to a charge pump circuit which can efficiently power a load that requires a voltage much higher than a supply voltage. The present invention also relates to a power supply circuit using a charge pump circuit which can improve reliability when it is used for a load which presents large fluctuations in current consumption, and ensure safety even in the event of short-circuiting to a ground voltage.

2. Description of the Related Art

When a voltage higher than a supply voltage is required, an inductance based DC-DC converter is mainly used as a power supply circuit. The DC-DC converter is used in many applications because it can generate an arbitrary voltage and efficiently power a load which consumes a large current. However, since the DC-DC converter requires a number of parts such as a transformer, a coil and the like, it is difficult to reduce the size of the DC-DC converter, and all the parts of the DC-DC converter cannot be integrated into a semiconductor integrated circuit.

For the reason set forth above, a highly efficient charge pump circuit which can be reduced in size is used for a power supply circuit for powering a load which consumes a relatively small current. However, since the charge pump circuit adds voltages on capacitors charged by a supply voltage from a DC power supply for boosting, the charge pump circuit can merely provide output voltages which are integer multiples of the supply voltage. Depending on the relationship between the supply voltage and a voltage required by a load, the load is supplied with an unnecessarily high voltage, resulting in larger power consumption of the load and a significantly lower efficiency.

Laid-open Japanese Patent Application (JP-A-) No. 2001-169537 discloses a charge pump circuit which improves a drawback of the charge pump circuit which merely provides output voltages that are integer multiples of a supply voltage. Specifically, two capacitors having the same capacitance are disposed closest to a power supply. The two capacitors are connected in series and charged by a supply voltage, so that each of the capacitors is charged to one half of the supply voltage.

The voltage generated by the two charged capacitors connected in parallel is added to a voltage on another capacitor which is charged at the same voltage as the supply voltage or to the supply voltage to generate a voltage (N+0.5) times as high as the supply voltage, where N is an integer larger than zero (N>0). JP-A-2001-169537 also discloses a circuit which comprises four capacitors disposed closest to a power supply, and can set output voltages in increments of a quarter of the supply voltage by adding voltages on the four capacitors connected in parallel.

In general, conventional charge pump circuits employ a plurality of diodes for preventing a current from flowing back from a high potential side of a capacitor charged at a high voltage to the DC power supply. Therefore, a loss caused by forward voltages of the diodes degrades the efficiency to a non-negligible extent, particularly when the supply voltage is low. Although the charge pump circuit disclosed in JP-A-2001-169537 can boost the voltage in small increments of one quarter of the supply voltage, this charge pump circuit also employs diodes for preventing a current from flowing back from a high potential side of the capacitors charged at a high voltage, seemingly causing a loss due to the forward voltages of the diodes.

In addition, a switching element for connecting the capacitors in series includes a MOS transistor which has a substrate gate connected to a source. Assuming that these circuits are integrated into a single IC chip, when the MOS transistor has a source voltage higher than a drain voltage in the middle of a boosting operation, a forward current flows into a parasitic diode of the MOS transistor to cause a reactive current to flow between the supply voltage and a ground voltage, possibly resulting in a lower power efficiency. Moreover, if a parasitic transistor of the MOS transistor latches up, the IC will be heated so as to possibly cause a failure.

On the other hand, the charge pump circuit is generally used for a load which consumes a relatively small current and supplies a charge accumulated on a capacitor, so that no protection circuit is provided against an over-current to the load. Also, since the charge pump circuit includes a capacitor having a relatively large capacitance, a large rush current is generated upon power-on.

JP-A-10-14218 discloses a method of preventing rush current while limiting a reduction in power conversion efficiency. Specifically, JP-A-10-14218 employs a P-channel type MOS transistor which is turned on when a capacitor is charged. The P-channel MOS transistor is applied with an inverted version of an output voltage at a gate from a charge pump circuit. Therefore, when the charge pump circuit outputs a low voltage, a large rush current can be prevented from flowing because the P-channel type MOS transistor has a large impedance.

Also, the impedance of the P-channel MOS transistor is reduced as the voltage of the charge pump circuit is increased, such that the P-channel type MOS transistor is fully turned on before the output voltage of the charge pump circuit reaches a predetermined value. With this configuration, a power loss can be reduced even if a resistor is inserted for preventing the rush current.

However, the charge pump circuit disclosed in JP-A-10-14218 can have a long rising time because the capacitor is applied with a small charging current when the charge pump circuit outputs a low voltage. Also, when the output voltage of the charge pump circuit is reduced due to an over-current from an output terminal, short-circuiting of a load, or the like, a small current flows from the P-channel type MOS transistor. However, because of an unknown load current at which the output current of the P-channel type MOS transistor begins decreasing, the charge pump is not suitable for use with a load which largely fluctuates in current. Further, the high dependency of the output voltage of the charge pump circuit on a supply voltage still remains unsolved.

SUMMARY OF THE INVENTION

The present invention solves the problems as mentioned above, and it is an object of the invention to provide a highly efficient charge pump circuit which is capable of generating a voltage (1+1/n) times as high as a supply voltage, while eliminating a reduced voltage due to a forward voltage of diodes otherwise provided for preventing a current from flowing back from a high potential side of capacitors, and reducing a reactive current and latch-up when the charge pump circuit is integrated into a single IC chip.

It is another object of the present invention to provide a power supply circuit based on a charge pump circuit which is capable of generating a substantially constant output voltage even when a supply voltage gradually decreases as it is used, as is the case with a DC power supply.

It is a further object of the present invention to provide a power supply circuit based on a charge pump circuit which is capable of limiting a rush current flowing into the charge pump circuit, accurately setting an output current value at which a protection circuit starts operating to power a load which presents large fluctuations in current, and avoiding the influence due to fluctuations in supply voltage.

In a first aspect, the present invention provides a charge pump circuit for boosting an input voltage applied to a positive power supply input terminal and outputting the boosted voltage from an output terminal. The charge pump circuit includes a plurality of first capacitors each charged with the input voltage, a plurality of first switches each for connecting a low potential side of a corresponding one of the first capacitors to the positive power supply input terminal when the first capacitor is charged, a plurality of second switches each for connecting a high potential side of the corresponding one of the first capacitors to the output terminal when the first capacitor is charged, a plurality of third switching elements each connected to the capacitor in series, a fourth switching element for connecting one end of a series circuit of each first capacitor and each third switching element to the positive power supply input terminal, a fifth switching element for connecting the other end of the series circuit of each first capacitor and each third switching element to a negative power supply input terminal, a second capacitor charged with a voltage generated by charging each first capacitor, and a control circuit for controlling each of the first switching elements, each of the second switching elements, each of the third switching element, the fourth switching element and the fifth switching element in response to a predetermined clock signal.

Specifically, each of the second switching elements includes a MOS transistor having a substrate gate connected to form a parasitic diode in a direction in which a current flow is prevented from the second capacitor to the corresponding one of the first capacitors, and the fourth switching element includes a MOS transistor having a substrate gate connected to form a parasitic diode in a direction in which a current flow is prevented from the first capacitor to the positive power supply input terminal.

When the second capacitor is charged with the voltage charged on the respective first capacitor, the control circuit turns off each of the first switching elements, each of the second switching elements, each of the third switching elements, the fourth switching element and the fifth switching element in response to a change in a signal level of the clock signal, turns on each of the second switching elements after the lapse of a first predetermined time, and turns on each of the first switching elements after the lapse of a second predetermined time.

Also, when the second capacitor is charged with voltages charged on the respective first capacitor, the control circuit turns off each of the first switching elements, each of the second switching elements, each of the third switching elements, the fourth switching element and the fifth switching element in response to a change in a signal level of the clock signal, turns on the fourth switching element and the fifth switching element after the lapse of a third predetermined time, and turns on each of the third switching elements after the lapse of a fourth predetermined time.

Each of the third switching elements may include a MOS transistor. The charge pump circuit may further include a plurality of change-over switches each for connecting a substrate gate of a corresponding one of the MOS transistors to a drain or a source of the MOS transistor, and the control circuit controls the switching of the change-over switches in response to the predetermined clock signal.

Specifically, when the second capacitor is charged with voltages charged on the respective first capacitor, the control circuit turns off each of the first switching elements, each of the second switching elements, each of the third switching elements, the fourth switching element and the fifth switching element in response to a change in a signal level of the clock signal, turns on the fourth switching element and the fifth switching element, and switches each of the change-over switches after the lapse of a third predetermined time.

In this event, the control circuit controls each of the change-over switches to switch the connection of the substrate gate, after the lapse of the third predetermined time, to form a parasitic diode in a direction in which a current generated by a voltage applied to the positive power supply input terminal is prevented.

In a second aspect, the present invention provides a power supply circuit which includes a voltage regulator circuit for generating a predetermined constant voltage from a supply voltage supplied from a DC power supply to output the predetermined constant voltage, and a charge pump circuit for boosting the output voltage from the voltage regulator circuit by a scaling factor in accordance with the value of the supply voltage to supply the boosted voltage for powering a load. The scaling factor is increased as the supply voltage is lowered.

In the power supply circuit described above, the charge pump circuit may have a first operation mode for outputting the output voltage of the voltage regulator circuit as it is, a second operation mode for boosting the output voltage of the voltage regulator circuit by a factor of $\alpha$, and a third operation mode for boosting the output voltage of the voltage regulator circuit by a factor of $\beta$, and is operable in one of the first operation mode, the second operation mode and the third operation mode in accordance with the supply voltage.

Specifically, the charge pump circuit is operated in the first operation mode when the supply voltage exceeds a first predetermined value, operated in the second operation mode when the supply voltage exceeds a second predetermined value smaller than the first predetermined value, and operated in the third operation mode when the supply voltage is equal to or lower than the second predetermined value.

Alternatively, the charge pump circuit may be operated in the first operation mode when the supply voltage exceeds a first predetermined voltage, and operated in the third operation mode when the supply voltage is equal to or lower than the first predetermined voltage.

Also alternatively, the charge pump circuit may be operated in the first operation mode when the supply voltage exceeds a first predetermined voltage, and operated in the second operation mode when the supply voltage is equal to or lower than the first predetermined voltage.

Further alternatively, the charge pump circuit may be operated in the second operation mode when the supply voltage exceeds a third predetermined value, and operated in the third operation mode when the supply voltage is equal to or lower than the third predetermined value.

Specifically, the voltage regulator circuit outputs the supply voltage as the output voltage when the charge pump is operated in the first operation mode.

The charge pump circuit includes a pair of first capacitors each charged with the output voltage of the voltage regulator circuit, a first switching element for connecting a low potential side of a corresponding one of the first capacitors to an input terminal applied with the output voltage of the voltage regulator circuit when the first capacitors are charged, a second switching element for connecting a high potential side of the corresponding one of the first capacitors to an output terminal for outputting the voltage to the load when the first capacitors are charged, a third switching element connected to the corresponding one of the first capacitors in series, a fourth switching element for connecting one end of a series circuit of the first capacitor and the third switching element to the input terminal, a fifth switching element for connecting the other end of the series circuit of the first capacitor and the third capacitor to a negative supply voltage of the DC power supply, a sixth switching element for connecting the high potential side of the first capacitor to the input terminal, a seventh switching element for connecting the low potential side of the first capacitor to the negative supply voltage of the DC power supply, a second capacitor charged with a voltage generated by charging each of the first capacitors, a voltage detector circuit for detecting the supply voltage to output a signal indicative of the detected voltage value, and a control circuit for controlling the first to seventh switching elements based on a predetermined clock signal in response to the signal from the voltage detector circuit and for controlling the operation of the voltage regulator circuit.

In the charge pump circuit, the control circuit controls each of the first to seventh switching elements such that the switching elements connected in series between the input terminal and the second capacitor are not simultaneously turned on when the charge pump circuit boosts the output voltage of the voltage regulator circuit.

Also, the control circuit may control each of the first to seventh switching elements such that the switching elements connected in series between the input terminal and the negative supply voltage of the DC power supply are not simultaneously turned on.

Each of the third and sixth switching elements includes a MOS transistor. The power supply circuit further includes a first and a second change-over switch each for connecting a substrate gate of a corresponding one of the MOS transistors to a drain or a source of the corresponding MOS transistor. The control circuit controls the first and second change-over switches to connect the substrate gate to the source of the corresponding MOS transistor when the corresponding MOS transistor has a source voltage higher than a drain voltage, and to connect the substrate gate to the drain of the corresponding MOS transistor when the corresponding MOS transistor has a source voltage lower than a drain voltage.

Specifically, each of the second switching elements includes a MOS transistor which has a substrate gate connected to form a parasitic diode in a direction in which a current flow is prevented from the second capacitor to the corresponding one of the first capacitors. The fourth switching element includes a MOS transistor which has a substrate gate connected to form a parasitic diode in a direction in which a current flow is prevented from the first capacitors to the input terminal.

Also, the control circuit may turn on each of the fourth and fifth switching elements and then turns on the third switching element when each of the first capacitors is charged with the output voltage of the voltage regulator circuit.

In a third aspect, the present invention provides a power supply circuit for supplying a load with a predetermined voltage. The power supply circuit includes a charge pump circuit for generating the predetermined voltage, and a voltage regulator circuit for generating a predetermined constant voltage from a supply voltage applied thereto from a DC power supply. The voltage regulator circuit has a voltage regulator circuit unit for generating the predetermined constant voltage from the supply voltage supplied from the DC power supply, and outputting the predetermined constant voltage to the charge pump circuit, and a current limiting circuit unit for limiting an output current of the voltage regulator circuit unit such that the output current from the voltage regulator circuit does not exceed a first predetermined current value.

The voltage regulator circuit may further have a short-circuit protection circuit unit for limiting the current output from the voltage regulator circuit unit such that the current is reduced simultaneously with the voltage output from the voltage regulator circuit unit when the voltage is reduced from the predetermined constant voltage, wherein the limited current value presents a second predetermined value when the output voltage of the voltage regulator circuit unit is at the predetermined constant voltage, and the limited current value presents a third predetermined value when the output voltage of the voltage regulator circuit unit is at a ground voltage.

Another power supply circuit in the third aspect of the present invention includes a charge pump circuit for generating the predetermined voltage, and a voltage regulator circuit for generating a predetermined constant voltage from a supply voltage applied thereto from a DC power supply. The voltage regulator circuit has a voltage regulator circuit unit for generating the predetermined constant voltage from the supply voltage supplied from the DC power supply, and outputting the predetermined constant voltage to the charge pump circuit, a current limiting circuit unit for limiting an output current of the voltage regulator circuit unit such that the output current from the voltage regulator circuit does not exceed a first predetermined current value, and a short-circuit protection circuit unit for limiting the current output from the voltage regulator circuit unit such that the current is reduced simultaneously with the voltage output from the voltage regulator circuit unit when the voltage is reduced from the predetermined constant voltage, wherein the limited current value presents a second predetermined value when the output voltage of the voltage regulator circuit unit is at the predetermined constant voltage, and the limited current value presents a third predetermined value when the output voltage of the voltage regulator circuit unit is at a ground voltage.

The power supply circuit further includes a switching circuit for connecting the output terminal of the voltage regulator circuit to the output terminal of the charge pump circuit to bypass the charge pump circuit when the output voltage of the charge pump circuit is reduced lower than the output voltage of the voltage regulator circuit.

Specifically, the switching circuit includes a diode which is connected such that a direction from the output terminal of the voltage regulator circuit to the output terminal of the charge pump circuit is a forward direction. The diode may be a Schottky diode The switching circuit may include a transistor connected between the output terminal of the voltage regulator circuit and the output terminal of the charge pump circuit, and a control circuit unit for detecting the output voltage of the charge pump circuit to control the transistor to turn on when the output voltage of the charge pump circuit is equal to or lower than a predetermined voltage value.

Alternatively, the switching circuit may include a transistor connected between the output terminal of the voltage regulator circuit and the output terminal of the charge pump circuit, and a constant voltage generator circuit for generating a predetermined constant voltage, and outputting the predetermined constant voltage to a control signal input terminal of the transistor. The predetermined constant voltage is smaller than the sum of the output voltage of the voltage regulator circuit when the output terminal of the charge pump circuit is short-circuited to the ground voltage and a threshold voltage of the transistor.

DETAILED DESCRIPTION OF THE EMBODIMENTS

In the following, the present invention will be described in detail with reference to several embodiments illustrated in the accompanying drawings.

Figure 1:
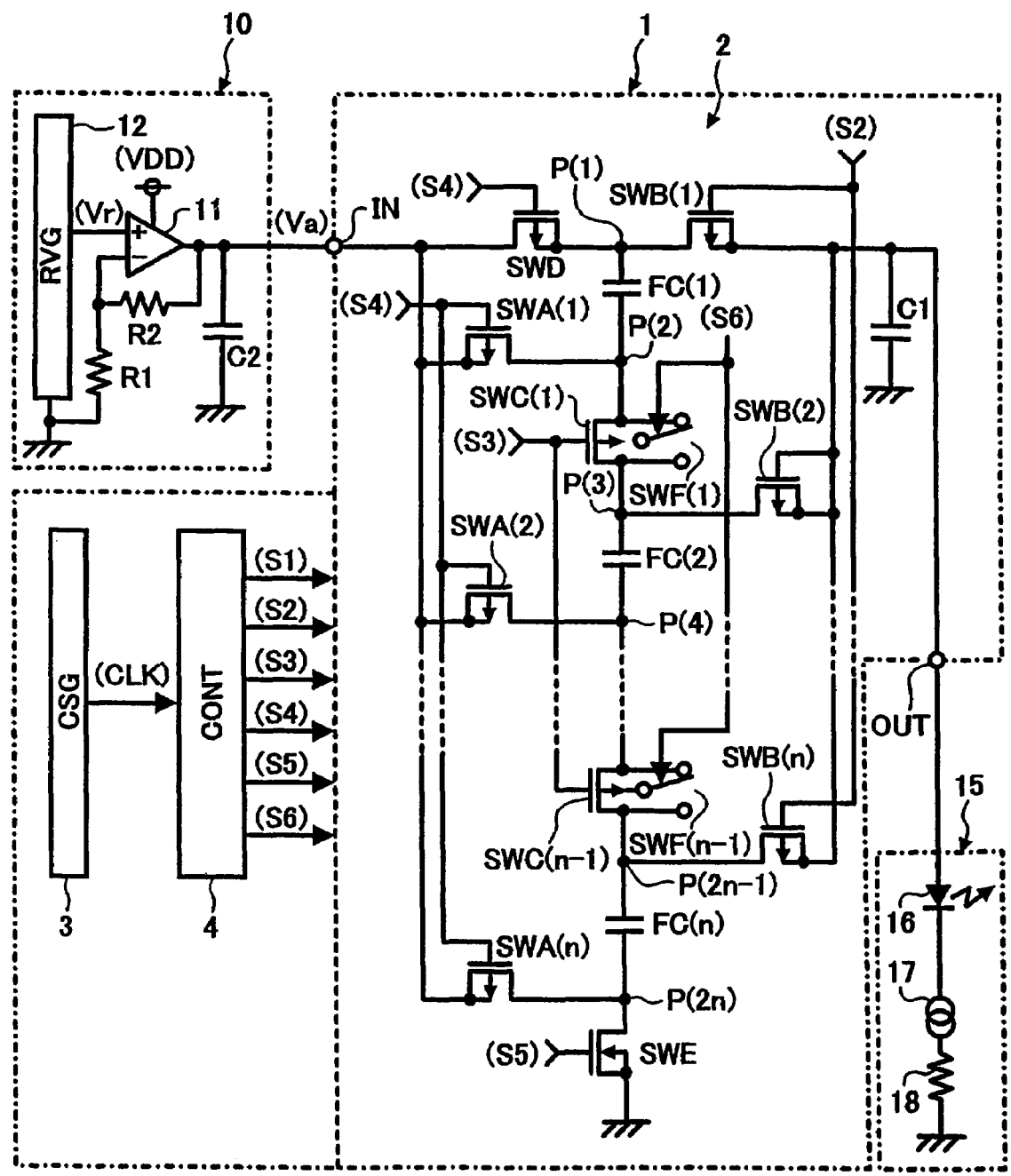
FIG. 1 is a circuit diagram illustrating an exemplary charge pump circuit according to a first embodiment of the present invention.

First Embodiment:

FIG. 1 is a circuit diagram illustrating an exemplary charge pump circuit according to a first embodiment of the present invention.

The charge pump circuit 1 illustrated in FIG. 1 boosts a constant voltage Va input to an input terminal IN from a voltage regulator circuit 10 by a factor of (1+1/n), and outputs the boosted voltage from an output terminal OUT, where n is an integer larger than one (n>1). In FIG. 1, a series regulator is used for the voltage regulator circuit 10 as an example. The input terminal IN is a positive power supply input terminal, and FIG. 1 shows, as an example, that a negative power supply input terminal (not shown) is grounded.

The voltage regulator circuit 10 comprises an error amplifier 11; a reference voltage generator circuit unit (RVG) 12 for outputting a predetermined reference voltage Vr; a series circuit comprised of a resistor R1 and a resistor R2 for dividing a voltage output from the error amplifier 11, and a capacitor C2. In the voltage regulator circuit 10, the error amplifier 11 amplifies and outputs an error of a voltage divided by the resistors R1, R2 with respect to the reference voltage Vr. This output voltage is stabilized by the capacitor C2 to generate the constant voltage Va.

The charge pump circuit 1 comprises a charge pump circuit unit 2 for boosting the constant voltage Va fed from the voltage regulator circuit 10 by a factor of (1+1/n) and outputting the boosted voltage; a clock signal generator circuit unit (CSG) 3 for generating and outputting a clock signal CLK at a predetermined frequency; and a control circuit unit (CONT) 4 for controlling the boosting operation of the charge pump circuit unit 2 based on the clock signal CLK fed thereto from the clock signal generator circuit unit 3.

The charge pump circuit unit 2 comprises n capacitors (hereinafter referred to as the "fly back capacitors") FC(1) –FC(F) having the same capacitance; a capacitor (hereinafter referred to as the "catch-up capacitor") C1 for stabilizing the output voltage of the charge pump circuit unit 2; and first switching elements SWA(1)–SWA(n), second switching elements SWB(1)–SWB(n), third switching elements SWC(1) –SWC(n), and a fourth switching element SWD, each of which is comprised of a P-channel MOS transistor (hereinafter referred to as the "PMOS" transistor).

The charge pump circuit unit 2 further comprises a fifth switching element SWE and change-over switches SWF(1) –SWF(n−1), each of which is comprised of an N-channel MOS transistor (hereinafter referred to as the "NMOS transistor"). The change-over switches SWF(1)–SWF(n−1) are changed over in response to control signals fed thereto. The fly back capacitors FC(1)–FC(n) comprise first capacitors, and the catch-up capacitor C1 comprises a second capacitor.

In the charge pump circuit unit 2, a fourth switching element SWD, a series circuit having alternately connected fly back capacitors FC(1)–FC(n) and third switching elements SWC(1)–SWC(n−1), and the switching element SWE are connected in series between the input terminal IN fed with the constant voltage Va from the voltage regulator circuit 10 and the ground voltage. Specifically, in the series circuit of the fly back capacitors FC(1)–FC(n) and third switching capacitors FC(1)–FC(n), the fly back capacitors FC(1)–FC(n) are connected in series with each other through the third switching elements SWC(1)–SWC(n) corresponding thereto.

A connection between the fourth switching element SWD and fly back capacitor FC(1) is designated by P(1), and a connection point between a fly back capacitor FC(j) and a third switching element SWC(j) is designated by P(2j), where j=1–n−1. Also, a connection between the fly back capacitor FC(n) and fifth switching element SWE is designated by P(2n). On the other hand, a first switching element SWA(k) is connected in correspondence between the input terminal IN and connection P(2k), while a second switching element SWB(k) is connected in correspondence between the output terminal OUT and connection P(2k−1), where k=1–n.

The change-over switches SWF(1)–SWF(n−1) are provided in correspondence to the third switching elements SWC(1)–SWC(n−1), respectively. For example, a change-over switch SWF(j) is provided in correspondence to a third switching element SWC(j) for switching a connection of a substrate gate (back gate) of the third switching element SWC(j) to a source or a drain in response to a control signal fed thereto. The catch-up capacitor C1 and a load circuit 15 are connected in parallel between the output terminal OUT and ground voltage. The load circuit 15 is formed, for example, of a series circuit comprised of a LED 16, a current regulator circuit 17 and a resistor 18.

Each of the first switching elements SWA(1)–SWA(n) receives a control signal S1 from the control circuit unit 4 at the gate, while each of the second switching elements SWB(1)–SWB(n) receives a control signal S2 from the control circuit unit 4 at the gate. Also, each of the third switching elements SWC(1)–SWC(n−1) receives a control signal S3 from the control circuit unit 4 at the gate, the fourth switching element SWD receives a control signal S4 from the control circuit unit 4 at the gate, and each of the change-over switches SWF(1)–SWF(n−1) receives a control signal S6 from the control circuit unit 4 at the gate.

Figure 2:
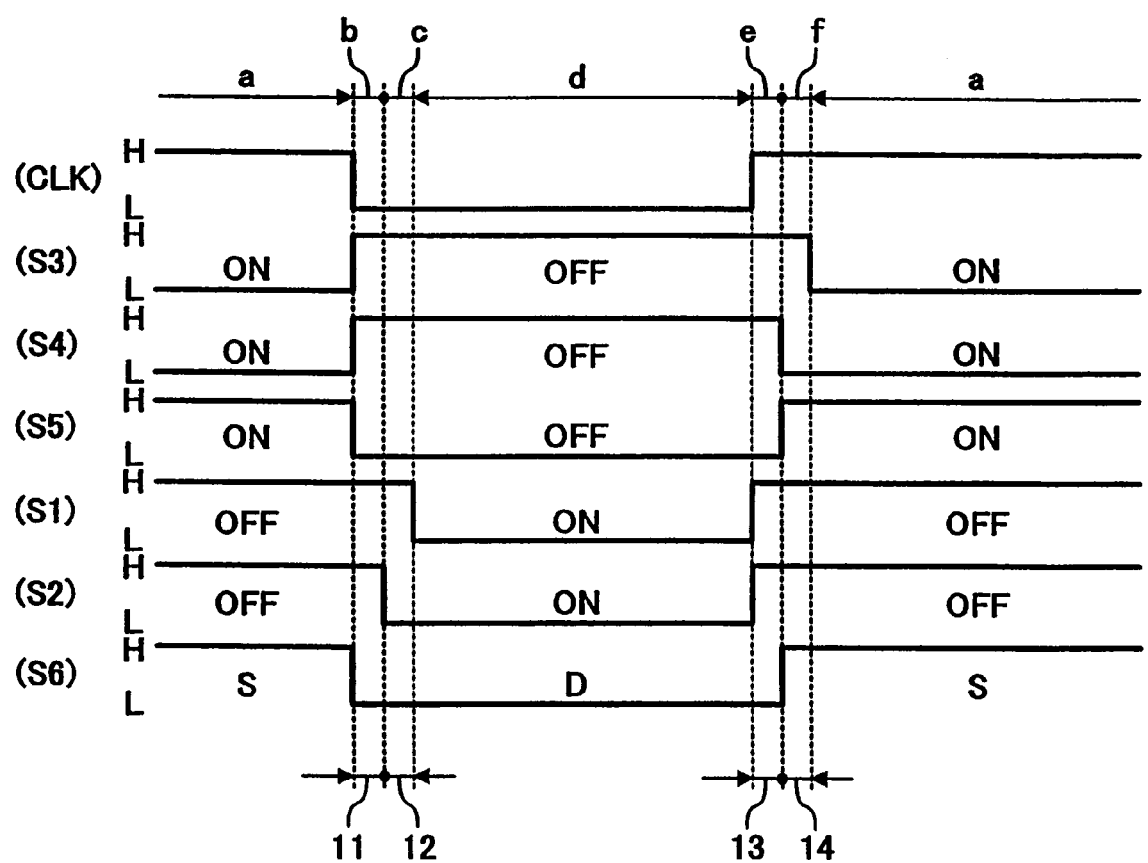
FIG. 2 is a timing chart showing exemplary control signals output from a control circuit unit (CONT) 4 in FIG. 1.

FIG. 2 is a timing chart showing the respective signals output from the control circuit unit 4, and FIGS. 3 to 8 are equivalent circuit diagrams illustrating exemplary operations of the charge pump circuit unit 2 for respective states of the signals shown in FIG. 2. Now, the operation of the charge pump circuit unit 2 will be described with reference to FIGS. 2 to 8.

The control circuit unit 4 generates the respective control signals S1, S2, S5, S6 at high (High) level and the respective control signals S3, S4 at low (Low) level in a state a where the clock signal CLK is at a high (High) level.

Figure 3:
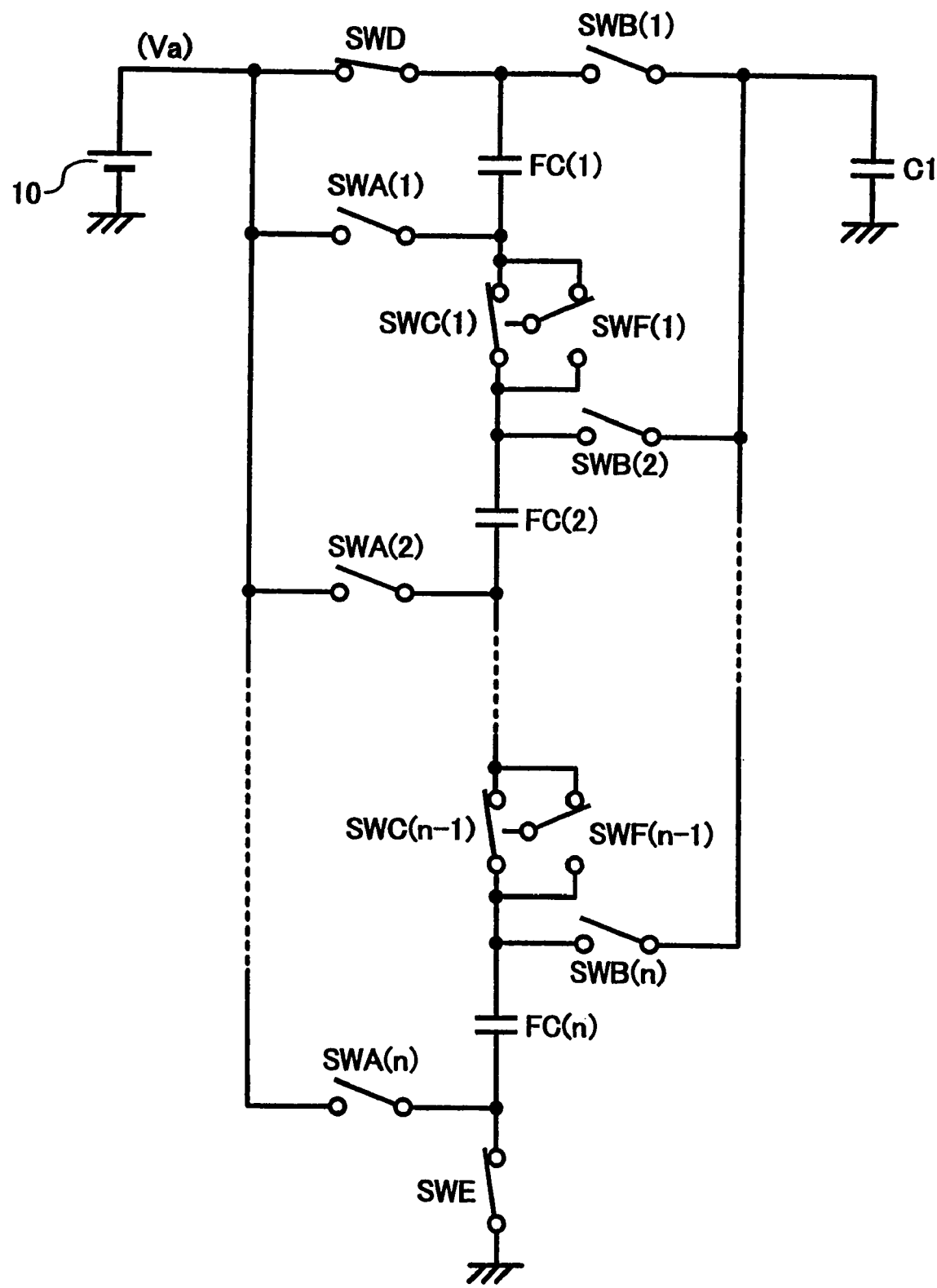
FIG. 3 is an equivalent circuit diagram illustrating an exemplary operation of a charge pump circuit unit 2 in a state a in FIG. 2.

As illustrated in FIG. 3, in the state a, each of the first switching elements SWA(1)–SWA(n) and the second switching elements SWB(1)–SWB(n) is turned off, i.e., in a shut-off state, whereas each of the third switching elements SWC(1)–SWC(n), fourth switching element SWD and fifth switching element SWE is turned on, i.e., in a conductive state. Each of the change-over switches SWF(1)–SWF(n−1) in turn connects the substrate gate to the source in the corresponding third switching element SWC(1)–SWC(n−1).

In the state a, since each of the fly back capacitors FC(1)–FC(n) connected in series is charged with the input constant voltage Va, each of the fly back capacitors FC(1)–FC(n) is charged to 1/n of the constant voltage Va.

Figure 4:
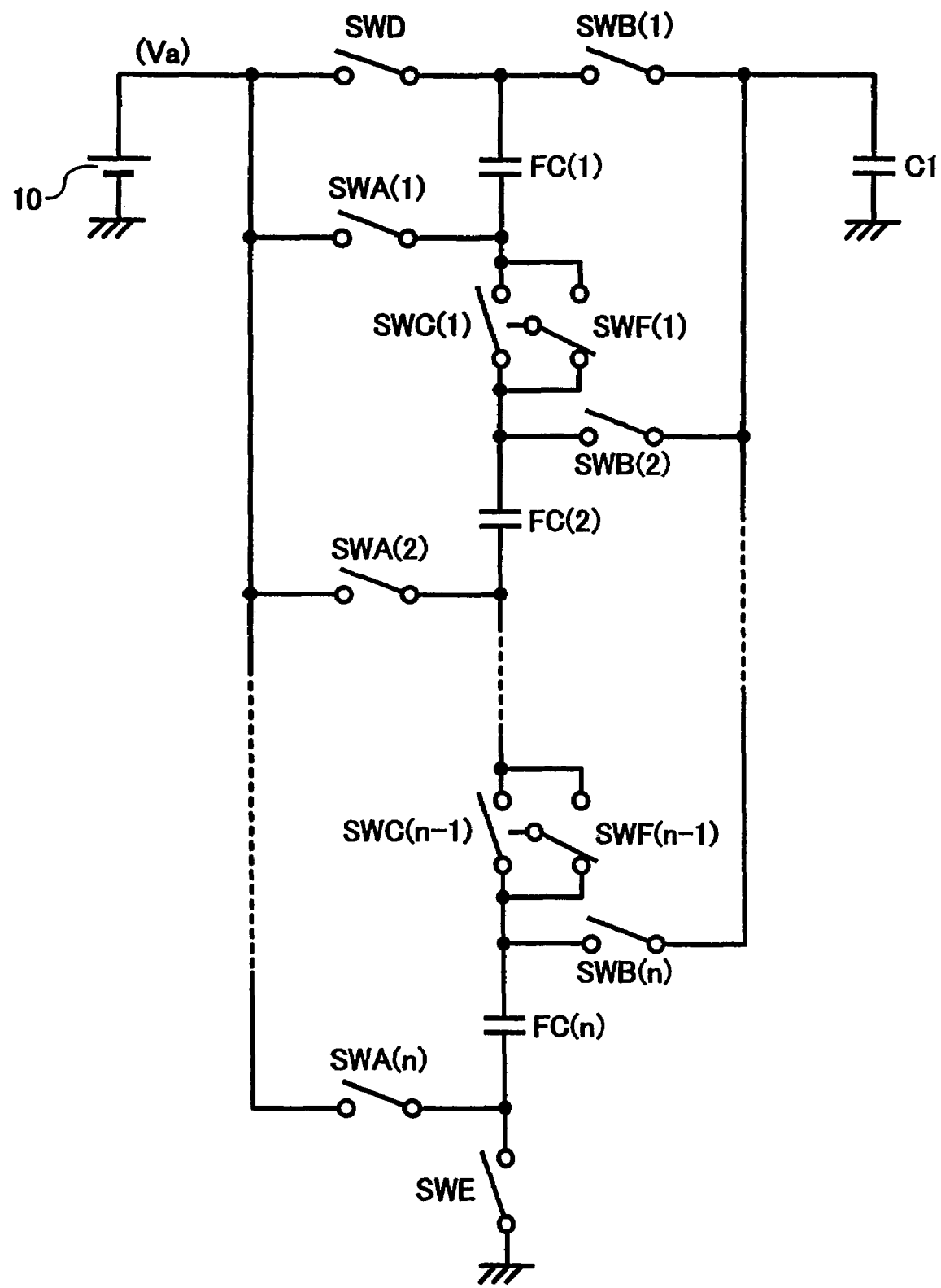
FIG. 4 is an equivalent circuit diagram illustrating an exemplary operation of a charge pump circuit unit 2 in a state b in FIG. 2.

Next, as the clock signal CLK falls to a low level, the control circuit unit 3 immediately brings the control signals S3, S4 to a high level and brings each of the control signals S5, S6 to a low level, causing a transition to a state b in FIG. 2. In response to the transition from the state a to the state b, each of the third switching elements SWC(1)–SWC(n−1), fourth switching element SWD and fifth switching element SWE is turned off and in a shut-off state, as illustrated in FIG. 4. Simultaneously, each of the change-over switches SWF (1)–SWF (n−1) connects the substrate gate to the drain in the corresponding third switching element SWC(1)–SWC (n−1). In the state b, since the all the switching elements are turned off and remain in the shut-off state, each of the fly back capacitors FC(1)–FC(n) remains charged at the voltage 1/n as high as the constant voltage Va.

Figure 5:
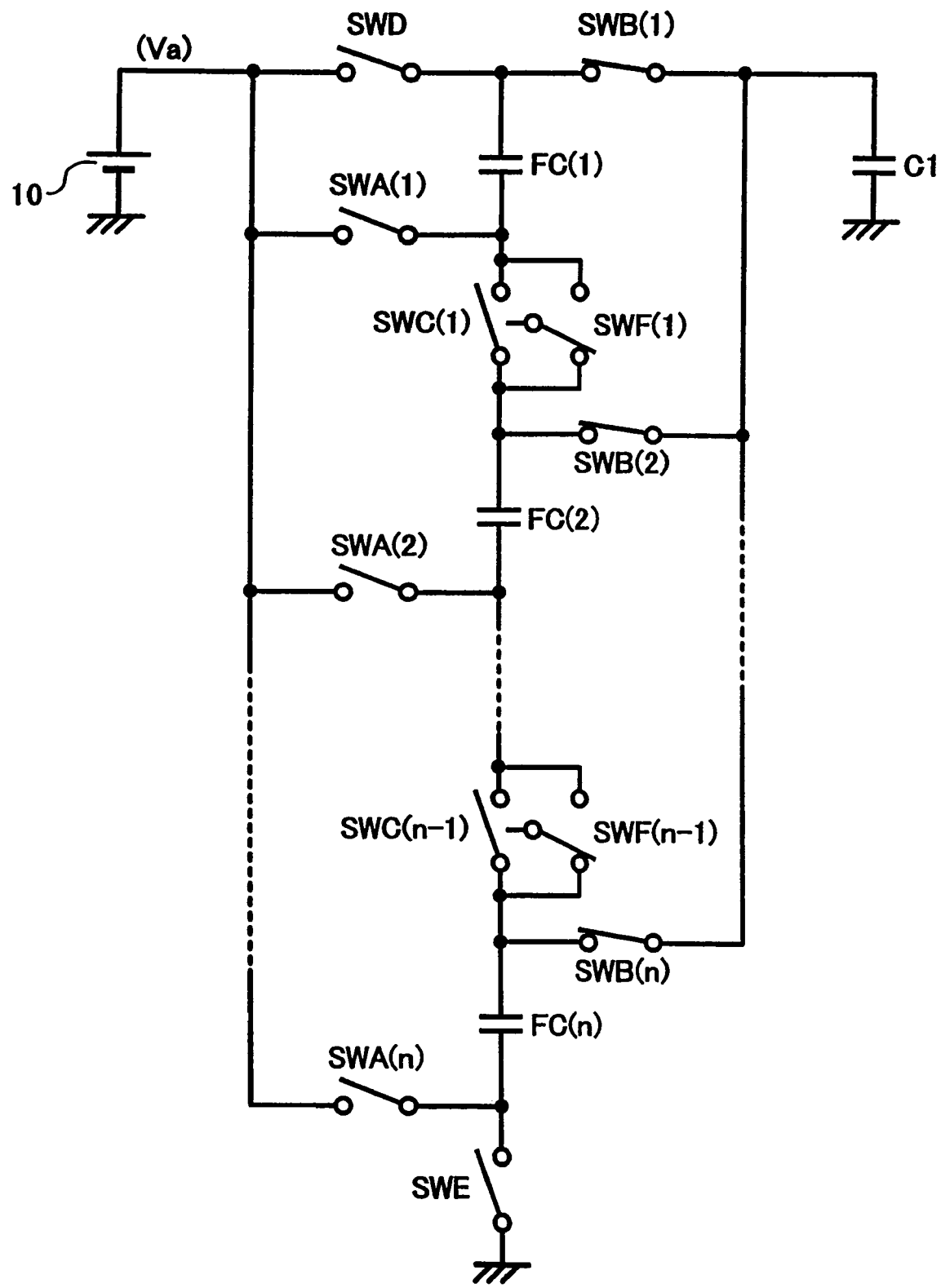
FIG. 5 is an equivalent circuit diagram illustrating an exemplary operation of the charge pump circuit unit 2 in a state c in FIG. 2.

Next, the control circuit unit 3 brings the control signal S2 to a low level in a predetermined time t1 after the clock signal CLK falls to a low level, resulting in a transition to a state c in FIG. 2. In response to the transition from the state b to the state c, each of the second switching elements SWB(1)–SWB(n) is turned on and in a conductive state, as illustrated in FIG. 5. In the state c, the respective second switching elements are turned on, the remaining switching elements are turned off, and high potential sides of the respective fly back capacitors FC(1)–FC(n) are connected to the output terminal OUT. In this event, when the voltage on the catch up capacitor C1 is higher than the constant voltage Va, the fourth switching element SWD has a drain voltage higher than a source voltage. However, since the fourth switching element SWD has the substrate gate connected to the drain, no current will flow through a parasitic diode of the fourth switching element SWD.

Also, each of the switching elements SWC(1)–SWC(n−1) has a drain voltage equal to the voltage on the catch-up capacitor C1, and a source voltage lower than the voltage on the catch-up capacitor C1 by Va/n. This causes each of the third switching elements SWC(1)–SWC(n−1) to have a drain voltage higher than a source voltage. However, since each of the change-over switches SWF(1)–SWF(n−1) has connected the substrate gate to the drain in each of the third switching elements SWC(1)–SWC(n), no current will flow through a parasitic diode of each of the third switching elements SWC(1)–SWC(n).

Figure 6:
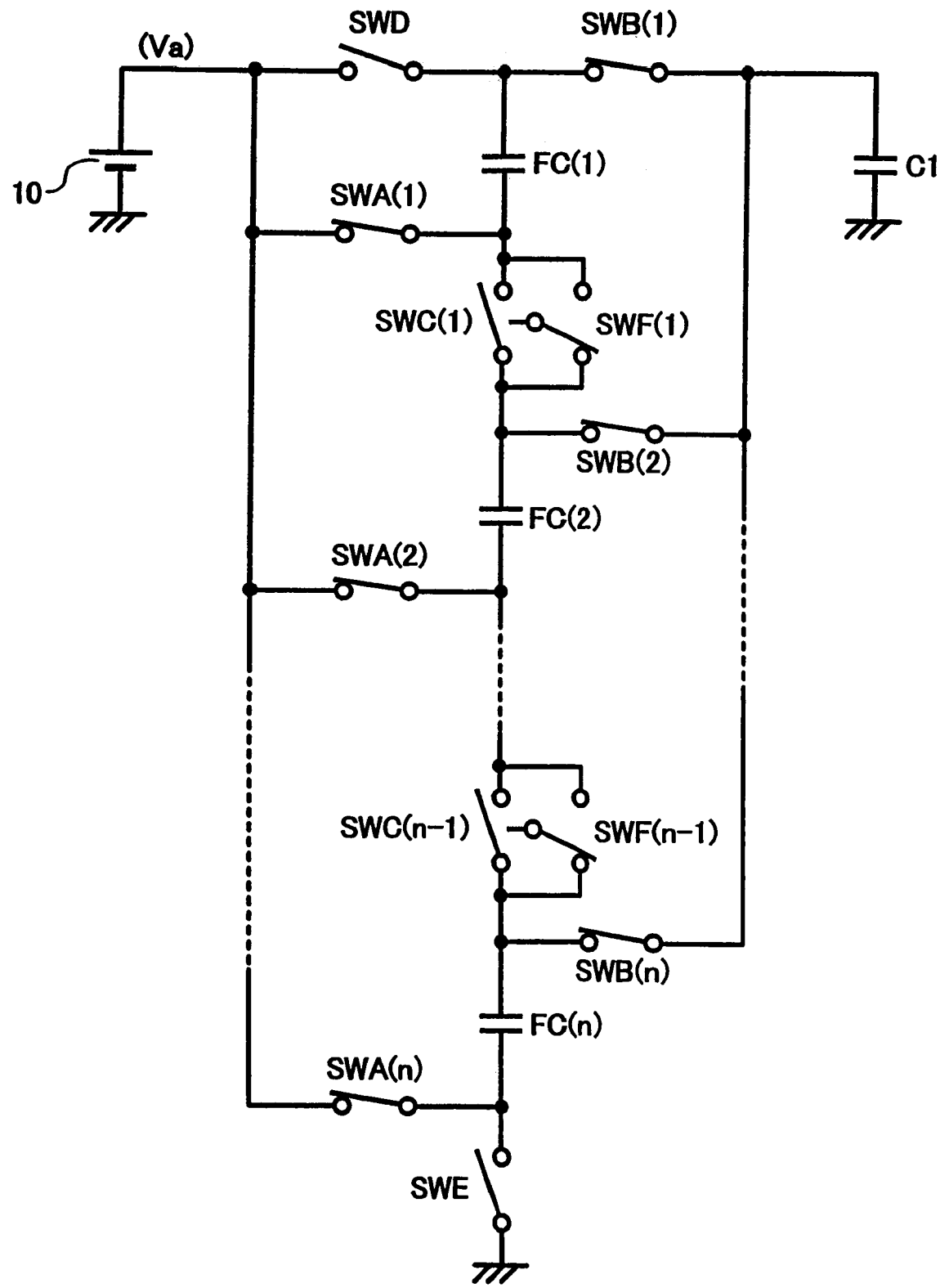
FIG. 6 is an equivalent circuit diagram illustrating an exemplary operation of the charge pump circuit unit 2 in a state d in FIG. 2.

The control circuit unit 3 brings the control signal S1 to a low level in a predetermined time t2 after the transition to the state c, resulting in a transition to a state d in FIG. 2. In response to the transition from the state c to the state d, each of the first switching elements SWA(1)–SWA(n) is turned on and in a conductive state, as illustrated in FIG. 6. In the state d, each of the first switching elements SWA(1)–SWA(n) and second switching elements SWB(1)–SWB(n) is turned on, while each of the third switching elements SWC(1)–SWC(n−1), fourth switching element SWD and fifth switching element SWE is turned off.

Consequently, low potential sides of the respective fly back capacitors FC(1)–FC(n) are connected to the output terminal OUT. From the foregoing, a voltage on the high potential side of each of the fly back capacitors FC(1)–FC(n) is (1+1/n) times as high as the constant voltage Va. The catch-up capacitor C1 is charged with this voltage, and the voltage on the catch-up capacitor C1 also rises to a level (1+1/n) times as high as the constant voltage Va.

Figure 7:
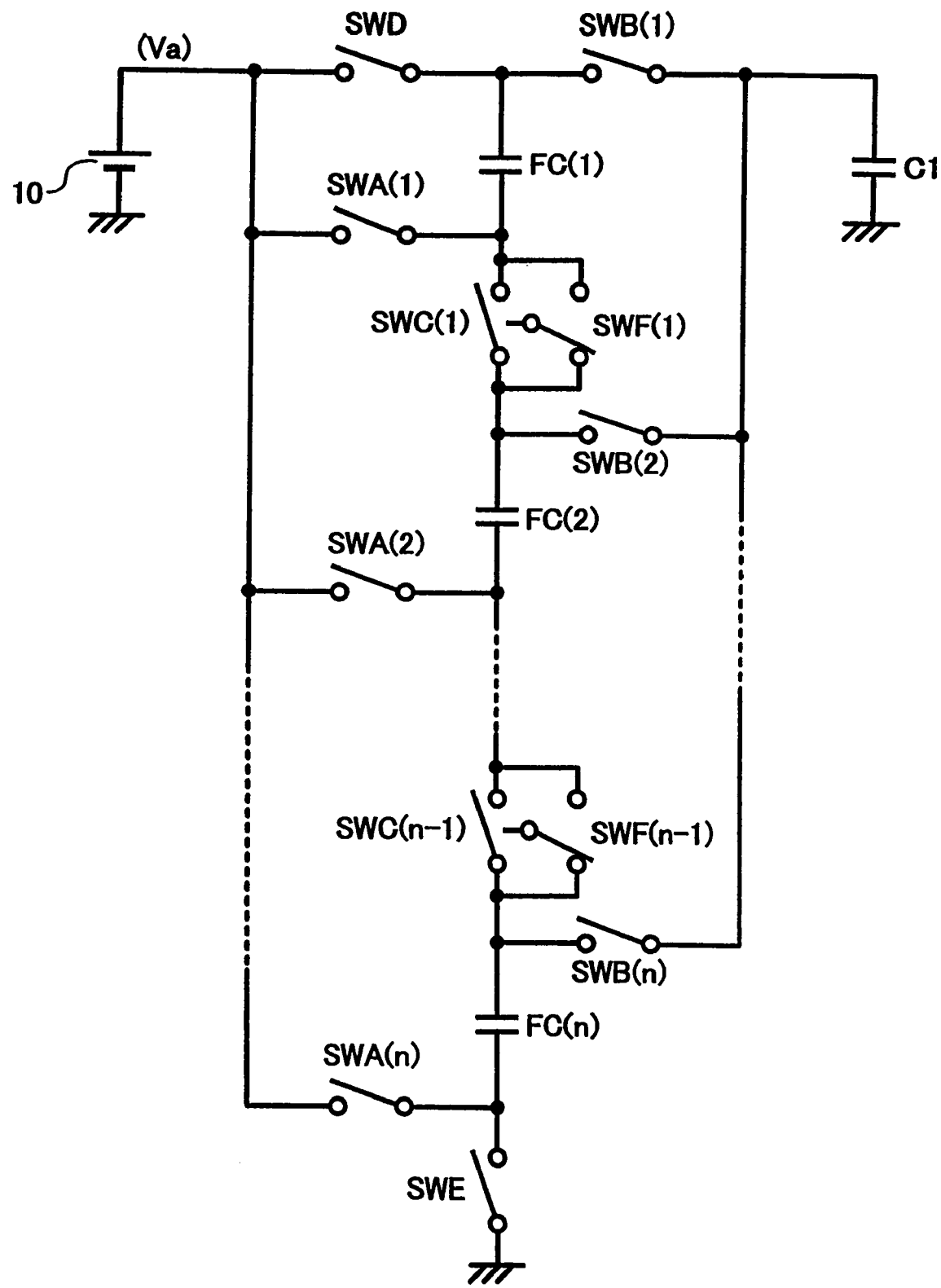
FIG. 7 is an equivalent circuit diagram illustrating an exemplary operation of the charge pump circuit unit 2 in a state e in FIG. 2.

Next, as the clock signal CLK rises to a high level, the control circuit unit 3 brings the control signals S1, S2 to a high level, resulting in a transition to a state e in FIG. 2. In response to the transition from the state d to the state e, each of the first switching elements SWA(1)–SWA(n) and second switching elements SWB(1)–SWB(n) is turned off and in a shut-off state, as illustrated in FIG. 7. In the state e, all the switching elements are turned off, and the fly back capacitors FC(1)–FC(n) supply charges to the catch-up capacitor C1, so that the charged voltage is lower than a voltage 1/n as high as the constant voltage Va.

Figure 8:
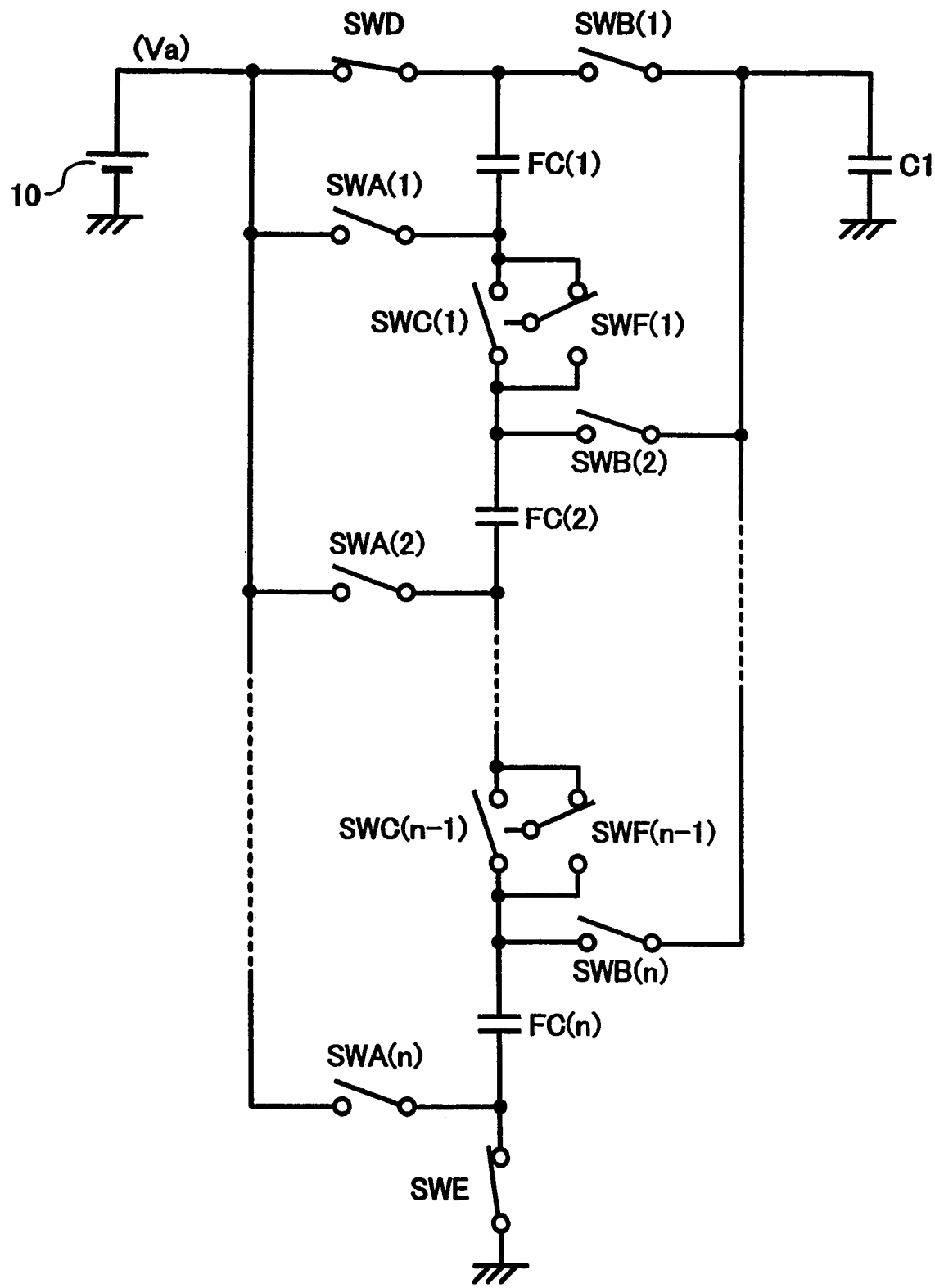
FIG. 8 is an equivalent circuit diagram illustrating an exemplary operation of the charge pump circuit unit 2 in a state f in FIG. 2.

Next, the control circuit unit 3 brings the control signal S4 to a low level and the control signals S5, S6 to a high level in a predetermined time t3 after the clock signal CLK rises to a high level, resulting in a transition to a state f in FIG. 2. In response to the transition from the state e to the state f, each of the fourth switching element SWD and fifth switching element SWE is turned on and in the conductive state, as illustrated in FIG. 8. Also, each of the change-over switches SWF(1)–SWF(n−1) connects the substrate gate to the source of the third switching element SWC(1)–SWC(n−1) corresponding thereto.

In the state f, since each of the fourth switching element SWD and fifth switching element SWE is turned on to bring the high potential side of the fly back capacitor FC(1) to a voltage equal to the constant voltage Va, causing the low potential side of the fly back capacitor FC(1) to be slightly higher than Va/n. Also, in the fly back capacitor FC(n), the low potential side is equal to the ground voltage, so that the high potential side is slightly lower than Va/n. From the foregoing, since each of the third switching elements SWC(1)–SWC(n−1) has the source voltage higher than the drain voltage, the connection of the substrate gate in each of the third switching elements SWC(1)–SWC(n−1) is switched from the drain to the source by the change-over switch SWF(1)–SWF(n−1) corresponding thereto, thereby preventing a reactive current which would be otherwise generated by the parasitic diode of each of the third switching elements SWC(1)–SWC(n−1) as well as preventing a reactive current flowing through a parasitic transistor based on the substrate gate.

The control circuit unit 3 brings the control signal S3 to a low level in a predetermined time t4 after the transition to the state f, resulting in a transition to the state a in FIG. 2. In response to the transition from the state f to the state a, each of the switching elements SWC(1)–SWC(n−1) is turned on and in a conductive state, as previously illustrated in FIG. 3.

Here, description will be made on the reason why the timing at which each of the first switching elements SWA (1)–SWA(n) is turned on is shifted from the timing at which each of the second switching elements SWB(1)–SWB(n) is turned on after the clock signal CLK falls to a low level.

Since the voltage on the high potential side of the catch-up capacitor C1 is generally higher than the input voltage Va, the drain voltage is higher than the source voltage in each of the second switching elements SWB(1)–SWB(n) when each of the fly back capacitors FC(1)–FC(n) is charged in the state a.

For this reason, if the substrate gate is connected to the source in each of the second switching elements SWB(1)–SWB(n), a forward current flows into the parasitic diode of the MOS transistor, thereby causing a reactive current. To eliminate this inconvenience, when the fly back capacitors FC(1)–FC(n) are charged, the substrate gate is connected to the drain in each of the second switching elements SWB(1)

–SWB(n) to reverse the parasitic diode of the MOS transistor to prevent the reactive current from flowing.

When the first switching elements SWA(1)–SWA(n) are turned on prior to the second switching elements SWB(1)–SWB(n) in response to the transition from the state b to the state c, the voltage on the high potential side of each of the fly back capacitors FC(1)–FC(n) is increased to a voltage (1+1/n) times as high as the input voltage Va. In response, the source voltage becomes higher than the drain voltage because the substrate gate is connected to the drain in each of the second switching elements SWB(1)–SWB(n), causing a reactive current to flow through the substrate gate in each of the second switching elements SWB(1)–SWB(n). Thus, such a reactive current can be prevented by turning on the second switching elements SWB(1)–SWB(n) prior to the first switching elements SWA(1)–SWA(n) in response to the transition from the state b to the state c.

Next, description will be made on the reason why the timing at which each of the fourth switching element SWD and fifth switching element SWE is turned on and the timing at which each of the third switching elements SWC(1)–SWC(n−1) is turned on are shifted upon transition from the state e to the state f and upon transition from the state f to the state a.

In the state d, the gate voltage is substantially equal to the input voltage Va, and the drain voltage is approximately (1+1/n) times as high as the input voltage Va in each of the third switching elements SWC(1)–SWC(n−1), so that a junction capacitance between the gate and source is charged with a voltage 1/n times as high as the input voltage Va, where the gate has the minus polarity with reference to the drain. This can be applied as well to the state e.

When the fifth switching element SWE is turned on at the same timing as each of the third switching elements SWC(1)–SWC(n−1) upon transition from the state e to the state f, the fifth switching element turned on causes a voltage at the connection of each of the fly back capacitors FC(1)–FC(n) with the drain of each of the third switching elements SWC(1)–SWC(n−1) to be reduced to approximately 1/n times as high as the input voltage Va. Consequently, in each of the third switching elements SWC(1)–SWC(n−1), the gate voltage is becoming lower due to the influence of a charge accumulated on the junction capacitance between the gate and drain.

In this event, when each of the third switching elements SWC(1)–SWC(n−1) is applied at the gate with a signal which changes from a high level to a low level for turning on each of the third switching elements SWC(1)–SWC(n−1), each of the third switching elements will be over-driven due to the influence of the charge accumulated on the junction capacitance between the gate and drain, as mentioned above, resulting in an instantaneously minus gate voltage generated in each of the third switching elements SWC(1)–SWC(n−1).

Since the control circuit unit 4 has an output circuit generally based on CMOS for driving the gates of the respective third switching elements SWC(1)–SWC(n−1), a reactive current flows into a base substrate of an NMOS transistor which comprises the output circuit, causing a parasitic transistor of the NMOS transistor to turn on to give rise to latch-up. For preventing the latch-up, the control circuit unit 4 turns on each of the third switching elements SWC(1)–SWC(n−1) in the predetermined time t4 after the fifth switching element SWE is turned on.

Next, an exemplary operation of the control circuit unit 4 will be described in greater detail with reference to FIG. 9 which illustrates an exemplary circuit configuration of the control circuit unit 4.

Figure 9:
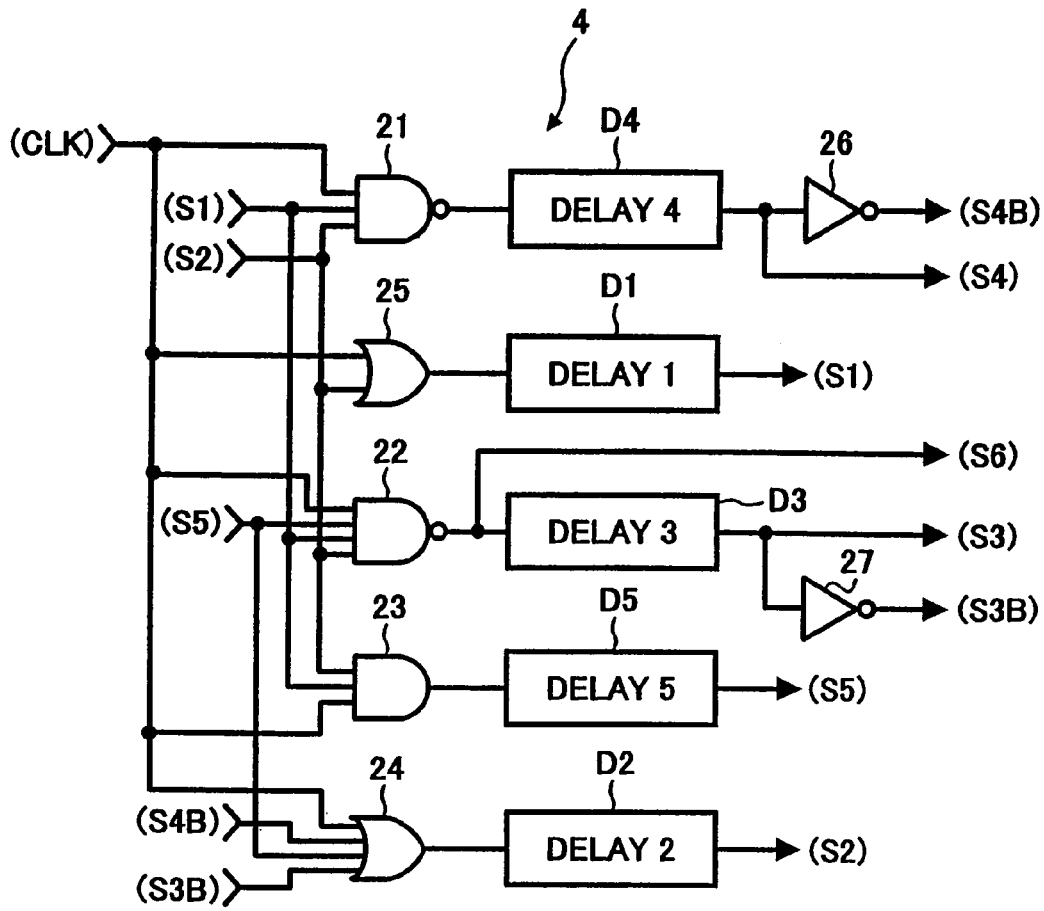
FIG. 9 is a circuit diagram illustrating an exemplary circuit configuration of the control circuit unit 4 in FIG. 1.

In FIG. 9, the control circuit unit 4 comprises a three-input AND circuit 21, a four-input NAND circuit 22, a three-input AND circuit 23, a four-input OR circuit 24, a two-input OR circuit 25, inverters 26, 27, a first delay circuit (DELAY 1) D1, a second delay circuit (DELAY 2) D2, a third delay circuit (DELAY 3) D3, a fourth delay circuit (DELAY 4) D4, and a fifth delay circuit (DELAY 5) D5.

The clock signal CLK from the clock signal generator circuit unit 3 is fed to corresponding input terminals of the NAND circuits, 21, 22, AND circuit 23, and OR circuits 24, 25, respectively. An output signal of the OR circuit 25 is delayed by the first delay circuit D1 by a predetermined time, and output therefrom as the control signal S1. An output signal of the OR circuit 24 is delayed by the second delay circuit D2 by a predetermined time, and output therefrom as the control signal S2. The control signal S1 is applied to corresponding input terminals of the NAND circuits 21, 22 and AND circuit 23, while the control signal S2 is applied to corresponding input terminals of the NAND circuits 21, 22, AND circuit 23 and OR circuit 25, respectively.

Each of the NAND circuit 21 and AND circuit 23 is applied with the clock signal CLK and control signals S1, S2. An output signal of the NAND circuit 21 is delayed by the fourth delay circuit D4 by a predetermined time, and output therefrom as the control signal S4. An output signal of the AND circuit 23 in turn is delayed by the fifth delay circuit D5 by a predetermined time, and output therefrom as the control signal S5. The control signal S4 is inverted its signal level by the inverter 26, and is applied to a corresponding input terminal of the OR circuit 24 as a control signal S4B. The control signal S5 in turn is applied to corresponding input terminals of the NAND circuit 22 and OR circuit 24, respectively.

The NAND circuit 22 is applied with the clock signal CLK and control signals S1, S2, S5. An output signal of the NAND circuit 22 is output as a control signal S6, and also is delayed by the third delay circuit D3 by a predetermined time, and output therefrom as the control signal S3. The signal level of the control signal S3 is inverted by the inverter 27, and applied to a corresponding input terminal of the OR circuit 24 as a control signal S3B. The OR circuit 24 is applied with the clock signal CLK and control signals S3B, S4B, S5. An output signal of the OR circuit 24 is delayed by the second delay circuit D2 by a predetermined time, and output therefrom as the control signal S2. The OR circuit 25 is applied with the clock signal SLK and control signal S2. An output signal of the OR circuit 25 is delayed by the first delay circuit D1 by a predetermined time, and output therefrom as the control signal S1.

The predetermined time t1 which is the duration of the state b in FIG. 2 is determined by a delay time provided by the delay circuit D2, while the predetermined time t2 which is the duration of the state c in FIG. 2 is determined by a delay time provided by the first delay circuit D1. Also, the predetermined time t3 which is the duration of the state e in FIG. 2 is determined by the respective delay times provided by the fourth and fifth delay circuits D4, D5, while the predetermined time t4 which is the duration of the state f in FIG. 2 is determined by a delay time provided by the third delay circuit D3. The first to fifth delay circuits D1–D5 are required to perform the delay operation only when the corresponding control signals S1–S5 are asserted, so that the delay circuits need not perform the delay operation in the remaining time. Also, the first to fifth delay circuits D1–D5 are set their respective delay times such that they are equal to or longer than a time required for a switching element, which is turned on or off earlier to completely turn on or off, at a switching timing synchronized to the clock signal CLK.

However, when each of the switching elements in the charge pump circuit unit 2 turns on or off in a time shorter than a delay time of a combined logic circuit in the control circuit unit 4 in FIG. 9, the first to fifth delay circuits D1–D5 may be omitted. When such a condition is satisfied in each of the first to fifth delay circuits D1–D5, the same delay time may be set in the respective delay circuits D1–D5. Alternatively, different delay times may be set in the respective delay circuits D1–D5 considering delay differences due to the gate capacitance (a total of the capacitances between the gate and source, between the gate and drain, and between the gate and bulk) in each of the switching elements in the charge pump circuit unit 2.

Figure 10:
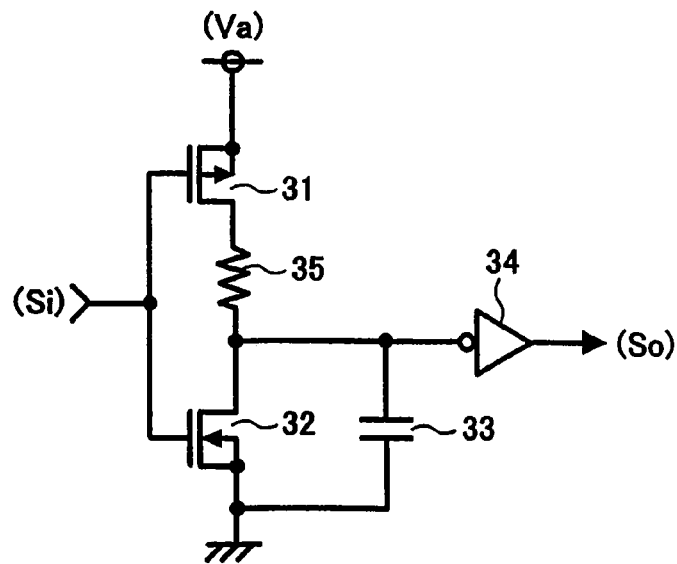
FIG. 10 is a circuit diagram illustrating exemplary configurations of a first delay circuit D1, a second delay circuit D2, a third delay circuit D3, and a fourth delay circuit D4.

FIG. 10 illustrates an exemplary configuration of the first delay circuit D1, second delay circuit D2, third delay circuit D3 and fourth delay circuit D4.

In FIG. 10, as a signal Si applied to a gate of each of a PMOS transistor 31 and an NMOS transistor 32 rises to a high level, the PMOS transistor 31 is turned off and in a shut-off state, while the NMOS transistor 32 is turned on. Consequently, a charge accumulated on a capacitor 33 is discharged by the NMOS transistor 32, causing an input terminal of the inverter 34 to immediately go to a low level so that an input signal Si is output as an output signal So without delay.

On the other hand, as the input signal Si falls to a low level, the PMOS transistor 31 is turned on while the NMOS transistor 32 is turned off. Consequently, the capacitor 33 is charged through a resistor 35, causing the output signal So to go to a low level with a delay which is equal to a time required for the charging. From the foregoing, in the delay circuit of FIG. 10, the output signal So rises without delay when the input signal Si rises, and the output signal So falls after it is delayed by a time which is set by the capacitance of the capacitor 33 and the resistance of the resistor 35 when the input signal Si falls. In other words, desired delay times can be set in the first delay circuit D1, second delay circuit D2, third delay circuit D3 and fourth delay circuit D4, respectively, by changing the capacitance of the capacitor 33 and the resistance of the resistor 35.

Figure 11:
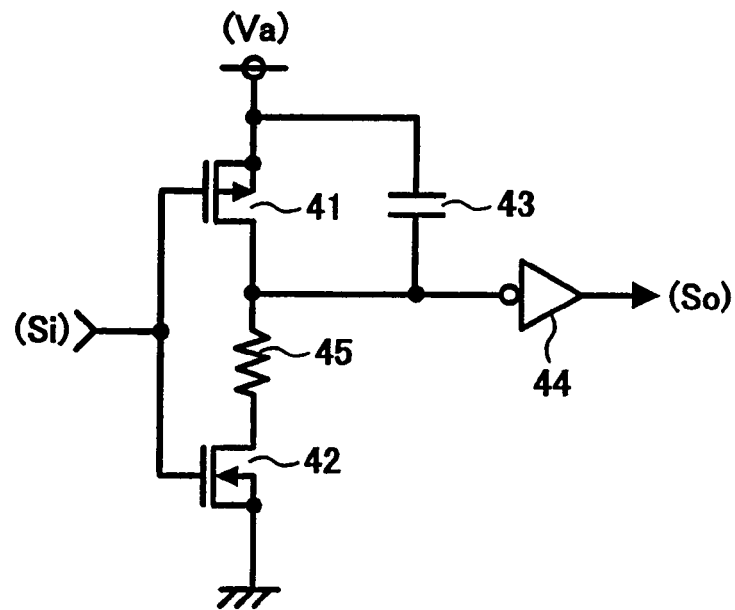
FIG. 11 is a circuit diagram illustrating an exemplary configuration of a fifth delay circuit D5 in FIG. 9.

FIG. 11 illustrates an exemplary configuration of the fifth delay circuit D5.

In FIG. 11, as a signal Si applied to a gate of each of a PMOS transistor 41 and an NMOS transistor 42 falls to a low level, the NMOS transistor 42 is turned off and in a shut-off state, while the PMOS transistor 41 is turned on. Consequently, an input terminal of an inverter 44 immediately goes to the high level, causing the input signal Si to be output as an output signal So without delay.

On the other hand, as the input signal Si goes to a high level, the PMOS transistor 41 is turned off, while the NMOS transistor 42 is turned on. Consequently, the capacitor 43 is charged through a resistor 45, so that the output signal So goes to a high level after it is delayed by a time required for the charging. From the foregoing, in the delay circuit of FIG. 11, the output signal So falls without delay when the input signal Si falls, and the output signal So rises after it is delayed by a time set by the capacitance of the capacitor 43 and the resistance of the resistor 45 when the input signal Si rises. In other words, a desired delay time can be set in the fifth delay circuit D5 by changing the capacitance of the capacitor 43 and the resistance of the resistor 45.

Figure 12:
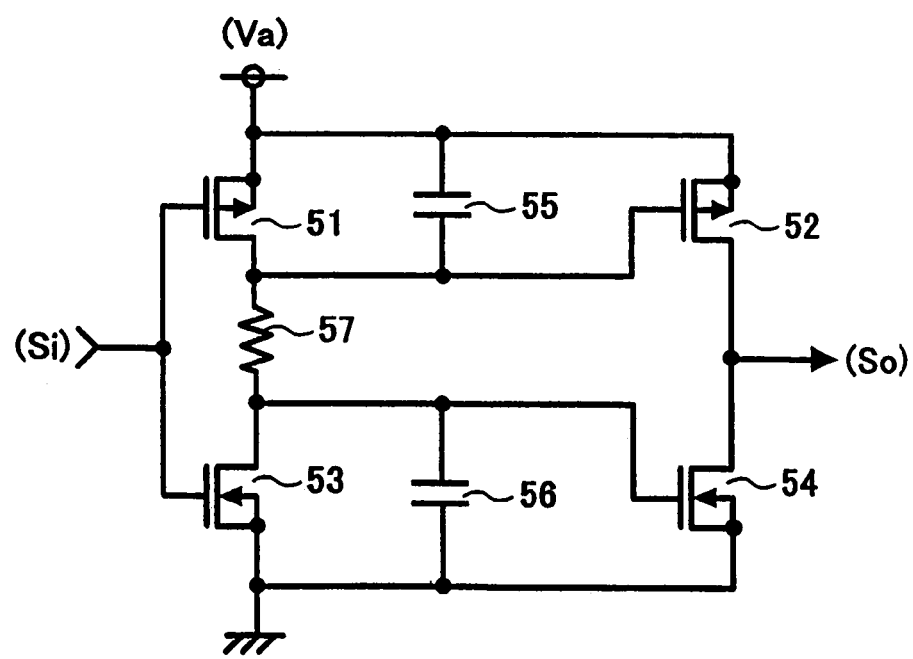
FIG. 12 is a circuit diagram illustrating another exemplary configuration of the first delay circuit D1, second delay circuit D2, third delay circuit D3, fourth delay circuit D4, and fifth delay circuit D5.

FIG. 12 illustrates another exemplary configuration of the first delay circuit D1, second delay circuit D2, third delay circuit D3, fourth delay circuit D4 and fifth delay circuit D5.

In FIG. 12, as a signal Si applied to a gate of each of the PMOS transistor 51 and an NMOS transistor 53 rises to a high level, the PMOS transistor 51 is turned off and in a shut-off state, while the NMOS transistor 53 is turned on. Consequently, an NMOS transistor 54 is turned off and in a shut-off state, a charge accumulated on a capacitor 56 is discharged by the NMOS transistor 532, and a capacitor 55 is charged through a resistor 57. From the foregoing, the PMOS transistor 52 is turned on with a delay which is equal to a time required by the capacitor 55 to be fully charged, causing an output signal So to rise.

On the other hand, as the input signal Si falls to a low level, the PMOS transistor 51 is turned on, while the NMOS transistor 53 is turned off. Consequently, the PMOS transistor 52 is turned off and in a shut-off state, a charge accumulated on the capacitor 55 is discharged by the PMOS transistor 51, and the capacitor 56 is charged through the resistor 57. From the foregoing, the NMOS transistor 54 is turned on with a delay which is equal to a time required for the capacitor 56 to be fully charged, causing the output signal So to fall. While this circuit is advantageous in that a pass current hardly flows through the NMOS transistor 54 and PMOS transistor 52 because these transistors 52, 54 are not turned on simultaneously in any period, the circuit still has a problem that the output is temporarily at a high impedance.

From the foregoing, in the delay circuit of FIG. 12, when the input signal Si rises, the signal So rises after it is delayed by a time set by the capacitance of the capacitor 55 and the resistance of the resistor 57. Also, in the delay circuit of FIG. 12, when the input signal Si falls, the output signal So falls after it is delayed by a time set by the capacitance of the capacitor 56 and the resistance of the resistor 57. In other words, desired delay times can be set in the first delay circuit D1, second delay circuit D2, third delay circuit D3, fourth delay circuit D4 and fifth delay circuit D5, respectively, by changing the capacitances of the respective capacitors 55, 56 and the resistance of the resistor 57.

On the other hand, when each of the delay circuits illustrated in FIGS. 10 to 12 is integrated into an IC chip, the resistor for use in setting a delay time can be made of polysilicon, N+ diffusion or P+ diffusion. For accurately setting a delay time for each delay circuit, the resistor is trimmed for the setting. The capacitor for use in setting the delay time can be the gate capacitance of the MOS transistor.

Figures 13, 13A:
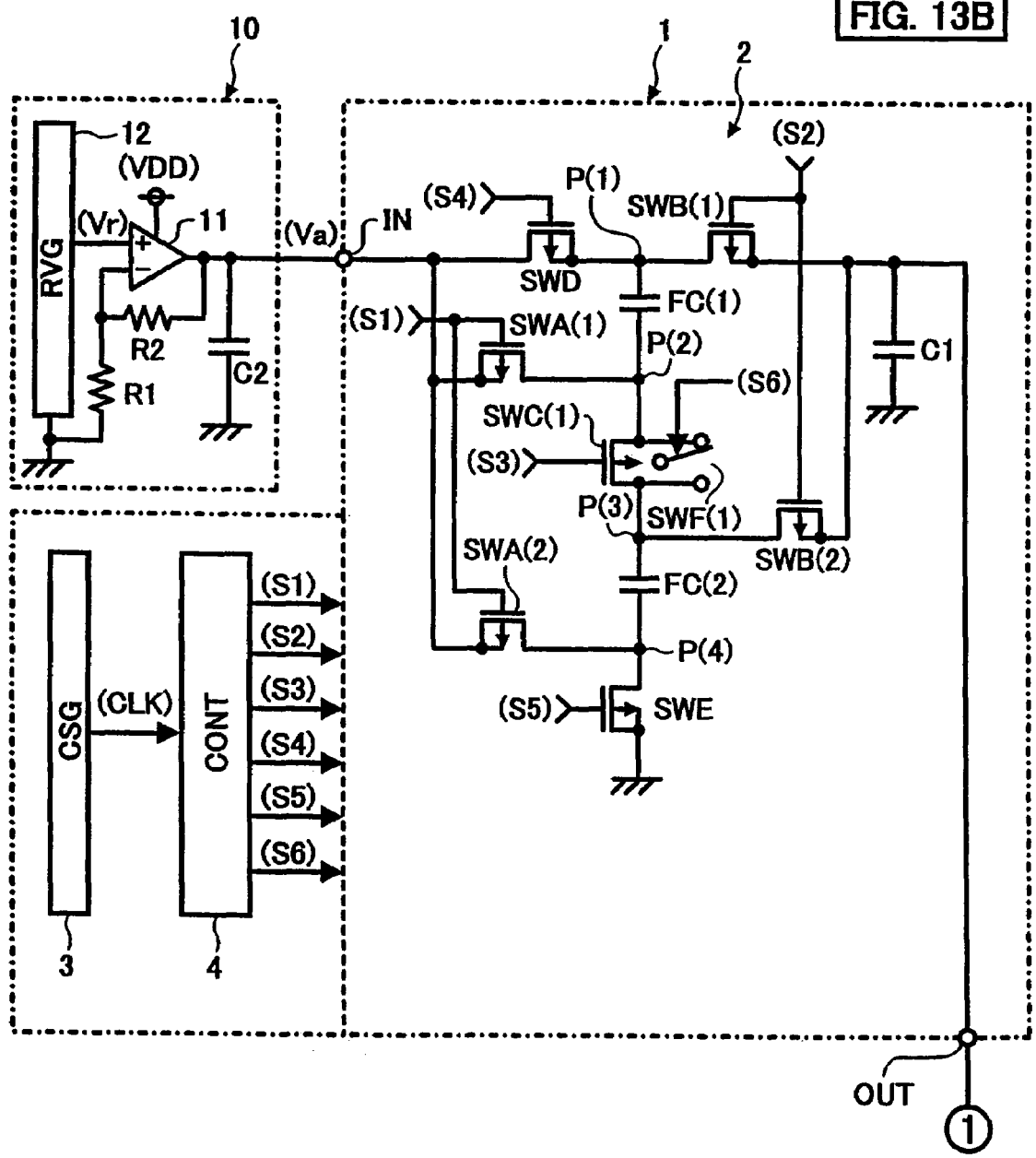
FIG. 13 is a circuit diagram illustrating an exemplary configuration of the charge pump circuit 1 in FIG. 1 when n is equal to two (n=2)
Figure 13B:
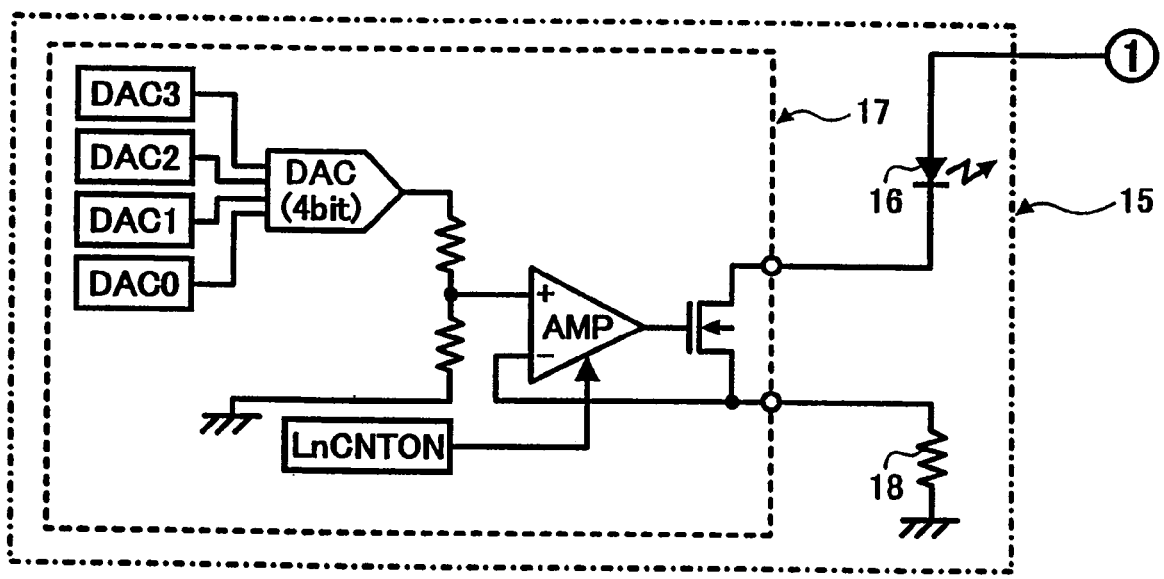

When n is chosen to be two in the charge pump circuit 1 of FIG. 1, the resulting circuit is as illustrated in FIG. 13. While FIGS. 1 and 13 show that a single LED 16 is included as the load circuit 15, a plurality of LEDs may be included in a similar manner, in which case a plurality of load circuits 15 are connected in parallel between the output terminal OUT and ground voltage in FIGS. 1 and 13.

As described above, the charge pump circuit in the first embodiment comprises the fourth switching element SWD having the substrate gate connected to the drain for preventing a current from flowing back to the input terminal IN from the high potential side of the fly back capacitors FC(1)–FC(n) connected in series, and the second switching element SWB(1) having the substrate gate connected to the drain for preventing a current from flowing back to the fly back capacitors FC(1)–FC(n) from the high potential side of the catch-up capacitor C1. With this strategy, it is possible to prevent the current from flowing back from the high potential side of the capacitors without relying on diodes, thereby eliminating a voltage drop due to forward currents of the diodes.

Also, when the fly back capacitors FC(1)–FC(n−1) are charged with the input voltage Va, each of the third switching elements SWC(1)–SWC(n−1) are turned on after the fourth switching element SWD and fifth switching element SWE are turned on. With this strategy, it is possible to prevent a reactive current from flowing into the base substrate of the NMOS transistor which comprises the output circuit of the control circuit unit 4 for driving the gate of each of the third switching elements SWC(1)–SWC(n−1), and to prevent the parasitic transistor of the NMOS transistor from turning on to cause latch-up.

When charges accumulated on the fly back capacitors FC(1)–FC(n−1) are output to the output terminal OUT, each of the change-over switches SWF(1)–SWF(n−1) connects the substrate gate to the drain in the corresponding one of the third switching elements SWC(1)–SWC(n−1) before each of the second switching elements SWB(1)–SWB(n) is turned on, and then, each of the first switching elements SWA(1)–SWA(n) is turned on. With this strategy, it is possible to prevent a reactive current from flowing through a capacitive diode in each of the third switching elements SWC(1)–SWC(n−1) and to make the source voltage higher than the drain voltage in each of the second switching elements SWB(1)–SWB(n), thereby preventing a reactive current from flowing through the substrate gate of each of the second switching elements SWB(1)–SWB(n).

Figure 14A:
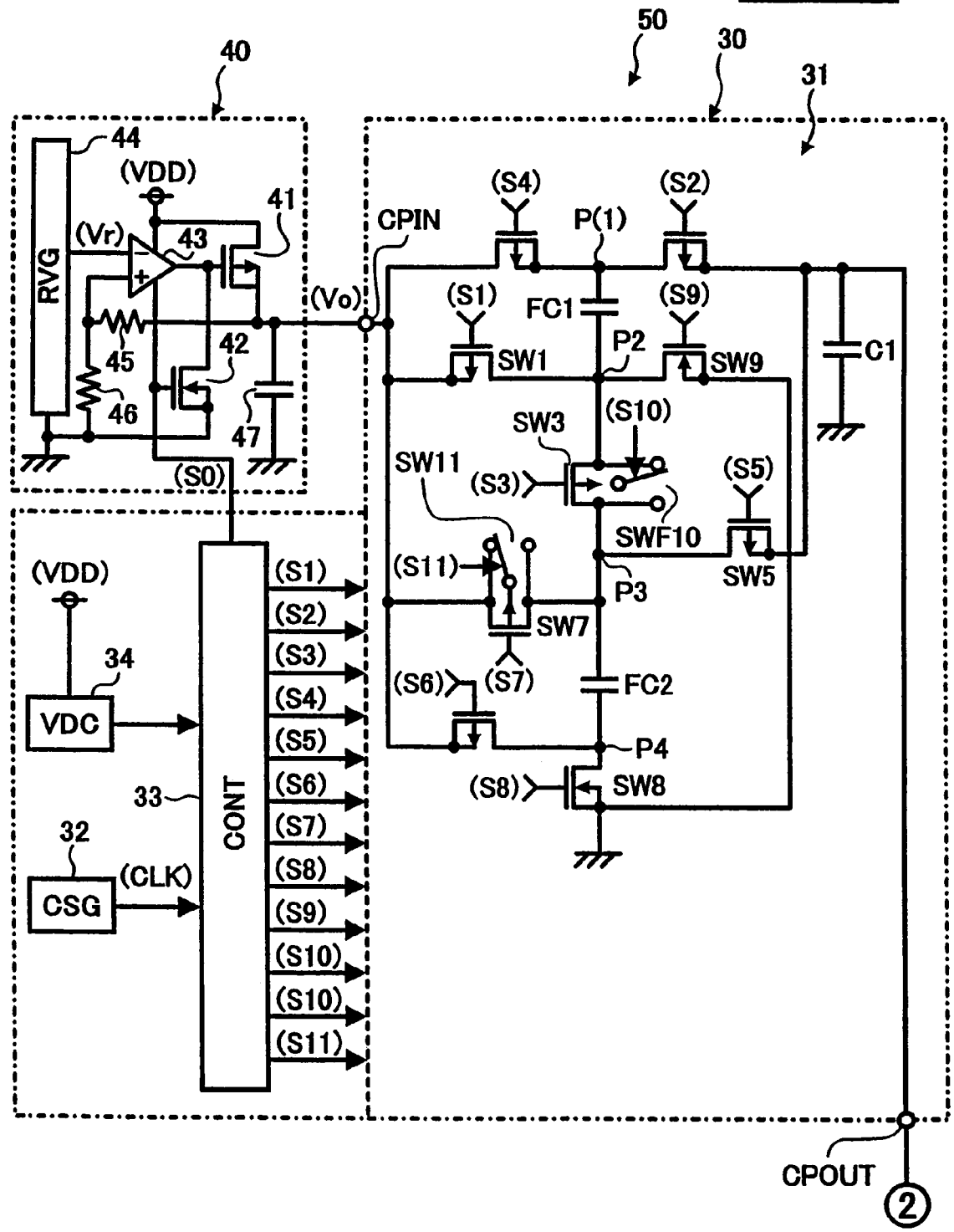
FIG. 14 is a circuit diagram illustrating an exemplary power supply circuit in a second embodiment of the present invention.
Figure 14B:
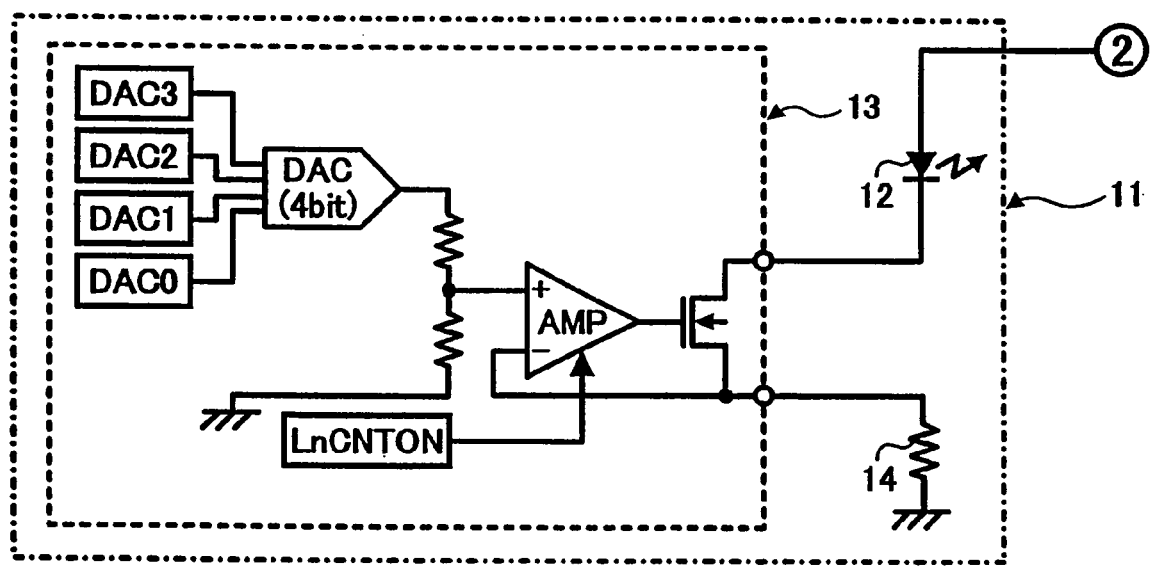

Second Embodiment:

FIG. 14 is a circuit diagram illustrating an exemplary power supply circuit 50 according to a second embodiment of the present invention. FIG. 14 illustrates a three-mode charge pump circuit 30, given as an example, which is capable of boosting at three different scaling factors.

The power supply circuit 50 in FIG. 14 comprises a voltage regulator circuit 40 for generating a predetermined constant voltage Va from a supply voltage VDD applied from a DC power supply (not shown) such as a battery to output the predetermined constant voltage Va as an output voltage Vo; and a charge pump circuit 30 for boosting the voltage Vo applied to an input terminal CPIN from the voltage regulator circuit 40 and outputting the boosted voltage from an output terminal CPOUT. A load circuit 11 is connected to the output terminal CPOUT of the charge pump circuit 30.

The voltage regulator circuit 40 comprises an output control transistor 41 which is a P-channel type MOS transistor (hereinafter referred to as the "PMOS transistor") for controlling a current output from the output terminal in response to a gate voltage; an N-channel type MOS transistor (hereinafter referred to as the "NMOS" transistor) 42 for controlling the gate voltage of the output control transistor 41 in response to a control signal applied to a gate thereof; and an error amplifier 43 for controlling the operation of the output control transistor 41.

The voltage regulator circuit 40 further comprises a reference voltage generator circuit unit (RVG) 44 for generating and outputting a predetermined reference voltage Vr; a series circuit of a resistor 45 and a resistor 46 for dividing the output voltage Vo; and a capacitor 47. The error amplifier 43 amplifies and outputs an error of the output voltage Vo divide by the resistors 45, 46 with respect to the reference voltage Vr for controlling the operation of the output control transistor 41. A drain voltage of the output control transistor 41 is stabilized by the capacitor 47, so that the output voltage Vo at the constant voltage Va is output from the output terminal.

The charge pump circuit 30 comprises a three-mode charge pump circuit unit 31 for boosting the voltage Vo applied from the voltage regulator circuit 40 by a factor of 1, 1.5 or 2 and outputting the boosted voltage; a clock signal generator circuit unit (CSG) 32 for generating and outputting a clock signal CLK at a predetermined frequency (in a range of 100 kHz to 1 MHz); and a control circuit unit (CONT) 33 for controlling the boosting operation of the charge pump circuit unit 31 based on the clock signal CLK applied from the clock signal generator circuit unit 32. The charge pump circuit 30 further comprises a voltage detector circuit unit (VDC) 34 for detecting a supply voltage VDD and outputting the result of the detection to the control circuit unit 33. The charge pump circuit unit 31 comprises two capacitors (hereinafter referred to as the "fly back capacitors") FC1, FC2 having the same capacitance; a capacitor (hereinafter referred to as the catch-up capacitor) C1 for stabilizing the output voltage of the charge pump circuit unit 31; a first switching element SW1, a second switching element SW2, a third switching element SW3, a fourth switching element SW4, a fifth switching element SW5, a sixth switching element SW6 and a seventh switching element SW7, each comprised of a PMOS transistor; an eighth switching element SW8 and a ninth switching element SW9 each including a NMOS transistor; and change-over switches SW10, SW11, each of which is switched in response to a control signal applied thereto.

The first to ninth switching elements SW1–SW9 are applied with control signals S1–S9, corresponding thereto, from the control circuit unit 33 at the bases thereof. The change-over switches SW10, SW11 are applied with control signals S10, S11, corresponding thereto, from the control circuit unit 33. A control signal S0 from the control circuit unit 33 is applied to the gate of the NMOS transistor 42 in the voltage regulator circuit 40 and to an enable signal input terminal of the error amplifier 43.

The charge pump circuit unit 31 boosts the input voltage Vo by a factor of 1, 1.5 or 2 in response to the control signals S0–S11 applied from the control circuit unit 33, and outputs the boosted voltage from the output terminal CPOUT. The charge pump circuit 30 is operable in the following three operation modes: a first operation mode for boosting the input voltage Vo by a factor of 1, i.e., outputting the output voltage of the voltage regulator circuit 40; a second operation mode for boosting the input voltage Vo by a factor of 1.5; and a third operation mode for boosting the input voltage Vo by a factor of 2.

In the charge pump circuit unit 31, the fourth switching element SW4, fly back capacitor FC1, third switching element SW4, fly back capacitor FC2 and eighth switching element SW8 are connected in series between the input terminal CPIN which is applied with the output voltage Vo of the voltage regulator circuit 2 and a ground voltage which serves as a negative supply voltage. Here, a connection between the fourth switching element SW4 and fly back capacitor FC1 is designated by P1, and a connection between the fly back capacitor FC1 and third switching element SW3 is designated by P2. Further, a connection between the third switching element SW3 and fly back capacitor FC2 is designated by P3, and a connection between the fly back capacitor FC2 and eighth switching element SW8 is designated by P4.

The first switching element SW1 is connected between the input terminal CPIN and connection P2; the seventh switching element SW7 between the input terminal CPIN and connection P3; and the sixth switching element SW6 between the input terminal CPIN and connection P4, respectively. Also, the second switching element SW2 is connected between the connection P1 and output terminal CPOUT; the fifth switching element SW5 between the connection P3 and output terminal CPOUT; and the ninth switching element SW9 between the connection P2 and ground voltage.

The change-over switch SW10 is provided in correspondence to the third switching element SW3 for switching a connection of a substrate gate (back gate) to a source or a drain in the third switching element SW3 in response to the control signal S10 applied thereto. Similarly, the change-over switch SW11 is provided in correspondence to the seventh switching element SW7 for switching a connection of a substrate gate to a source or a drain in the seventh switching element SW7 in response to the control signal S11 applied thereto.

The catch-up capacitor C1 and load circuit 11 are connected in parallel between the output terminal CPOUT and ground voltage. The load circuit 11 is formed, for example, of a series circuit comprised of a LED 12, a current regulator circuit 13 and a resistor 14. While FIG. 14 shows that a single LED 12 is included as the load circuit 11, a plurality of LEDs may be included in a similar manner, in which case a plurality of load circuits 11 are connected in parallel between the output terminal OUT and ground voltage in FIG. 14.

Also, in FIG. 14, the output control transistor 41, NMOS transistor 42, error amplifier 43, reference voltage generator circuit unit 44 and resistors 45, 46 in the voltage regulator circuit 40, the clock signal generator circuit unit 32, control circuit unit 33, and voltage detector circuit unit 34 in the charge pump circuit 30, and the respective switching elements SW1–SW11 in the charge pump circuit unit 31 may be integrated into a single IC chip. Furthermore, these components may be integrated into a single IC chip including the current regulator circuit 13 in the load circuit 11. When integrated in this manner, the change-over switches SW10, SW11 are implemented by electronic circuits instead of mechanical switches having contacts.

Now, an exemplary control operation performed by the control circuit unit 33 for controlling the operation of the charge pump circuit unit 31 will be described with reference to a flow chart of FIG. 15.

Figure 15:
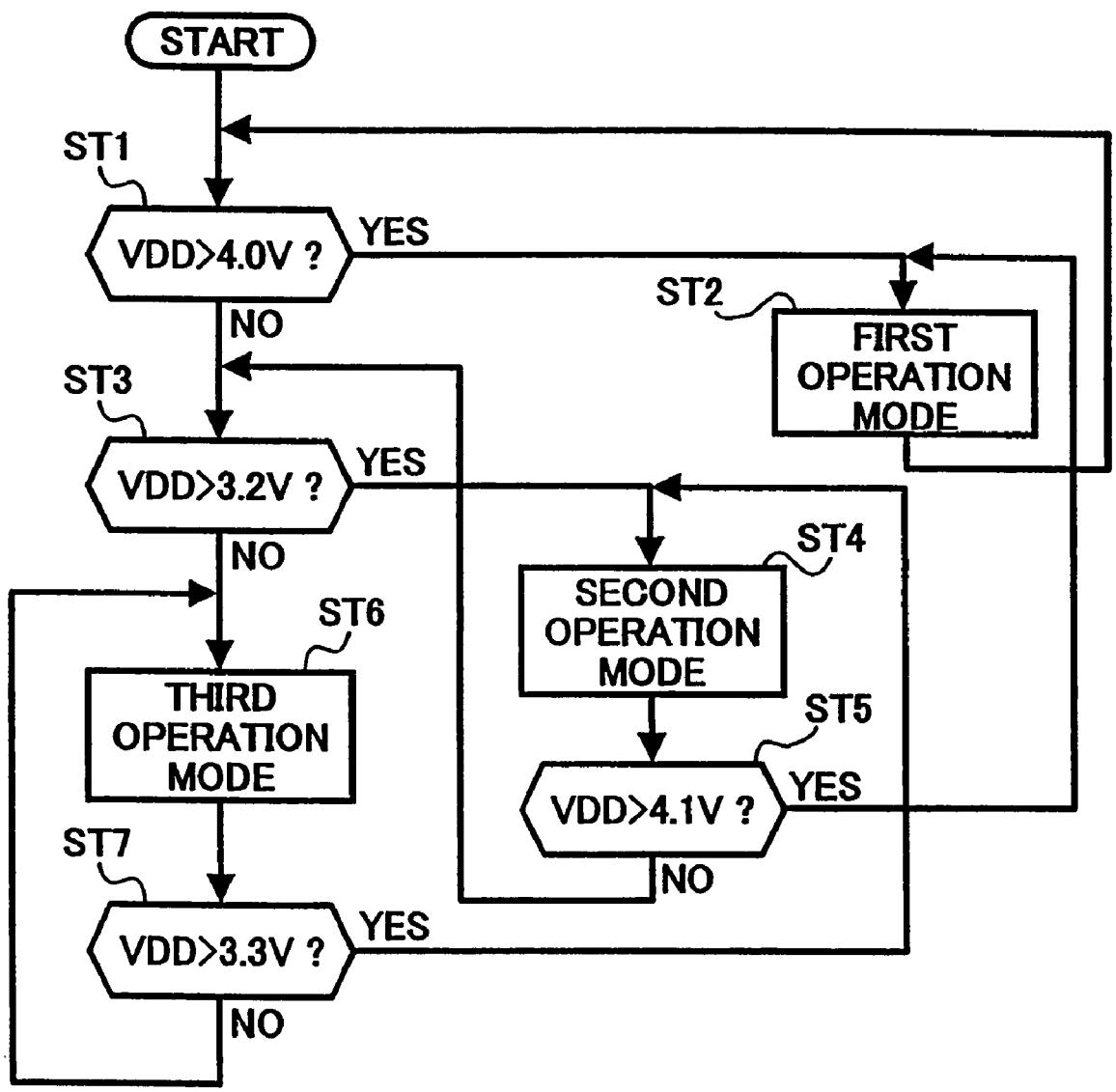
FIG. 15 is a flow chart illustrating an exemplary control operation performed by a control circuit unit 33 for controlling the operation of a charge pump circuit unit 31.

In FIG. 15, the control circuit unit 33 first examines whether or not the supply voltage VDD detected by the voltage detector circuit unit 34 exceeds a predetermined value V1, for example, 4.0 V (step ST1). When the supply voltage VDD exceeds the predetermined value V1 (YES), the control circuit unit 33 brings the control signal S0 to a high level to turn on the NMOS transistor 42 in the voltage regulator circuit 40, and to stop operating the error amplifier 43 to output the supply voltage VDD from the voltage regulator circuit 40 as the output voltage Vo. Then, the control circuit unit 33 operates the charge pump circuit unit 31 in the first mode (step ST2), followed by the flow returning to step ST1.

When the supply voltage. VDD is equal to or lower than 4.0 V at step ST1 (No), the control circuit unit 33 examines whether or not the supply voltage VDD detected by the voltage detector circuit unit 34 exceeds a predetermined value V2 smaller than the predetermined value V1, for example, 3.2 V (step ST3). When the supply voltage VDD exceeds 3.2 V at step ST3 (YES), the control circuit unit 33 brings the control signal So to a low level to turn off the NMOS transistor 42 in the voltage regulator circuit 40, and to activate the error amplifier 43, and operates the charge pump circuit unit 31 in the second operation mode (step ST4). Then, the control circuit unit 33 examines whether or not the supply voltage VDD detected by the voltage detector circuit unit 34 exceeds 4.1 V (sep ST5). The flow proceeds to step ST2 when the supply voltage VDD exceeds 4.1 V at step ST5 (YES), or returns to step ST3 when the supply voltage VDD is equal to or lower than 4.1 V (NO).

Next, when the supply voltage VDD is equal to or lower than 3.2 V at step ST3 (NO), the control circuit unit 33 brings the control signal S0 to a low level to turn off the NMOS transistor 42 in the voltage regulator circuit 40 and to activate the error amplifier 43, and operates the charge pump circuit unit 31 in the third operation mode (step ST6). Subsequently, the control circuit unit 33 examines whether or not the supply voltage VDD detected by the voltage detector circuit unit 34 exceeds 3.3 V (sep ST7). The flow proceeds to step ST4 when the supply voltage VDD exceeds 3.3 V at step. ST7 (YES), or returns to step ST6 when the supply voltage VDD is equal to or lower than 3.3 V (NO). In this manner, the control circuit unit 33 operates the charge pump circuit unit 31 in one of the three modes in accordance with the result of the detection made by the voltage detector circuit unit 34.

Figure 16:
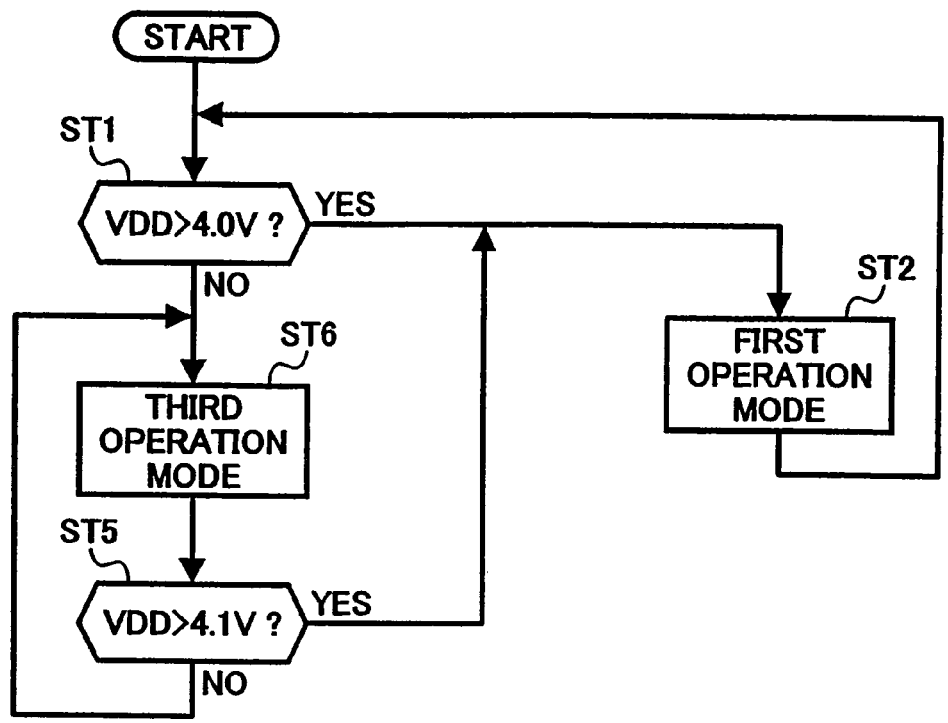
FIG. 16 is a flow chart illustrating another exemplary control operation performed by the control circuit unit 33 for controlling the operation of the charge pump circuit unit 31.

In FIG. 15, the control circuit unit 33 operates the charge pump circuit unit 31 in one of the three operation modes in accordance with the result of the detection made by the voltage detector circuit unit 34. Alternatively, the control circuit unit 33 may operate the charge pump circuit unit 31 in one of two modes in accordance with the result of the detection made by the voltage detector circuit unit 34. This alternative control operation performed by the control circuit unit 33 for controlling the operation of the charge pump circuit unit 31 will be described with reference to FIG. 16. In FIG. 16, wherein the control circuit unit 33 operates the charge pump circuit unit 31 in the first or third operation mode, steps at which the same processing is performed as in FIG. 15 are designated by the same reference letters, and description thereon is omitted here.

In FIG. 16, the control circuit unit 33 first performs the processing at step ST1 in FIG. 15. When the supply voltage VDD exceeds 4.0 V at step ST1 (YES), the control circuit unit 33 performs the processing at step ST2 in FIG. 15, followed by the flow returning to step ST1. When the supply voltage VDD does not exceed 4.0 at step ST1 (NO), the control circuit unit 33 performs the processing at step ST6 in FIG. 15, and then performs the processing at step ST5. The flow proceeds to step ST2 when the supply voltage VDD exceeds 4.1 V at step ST5 (YES), and returns to step ST6 when the supply voltage VDD is equal to or lower than 4.1 V (NO).

Figure 17:
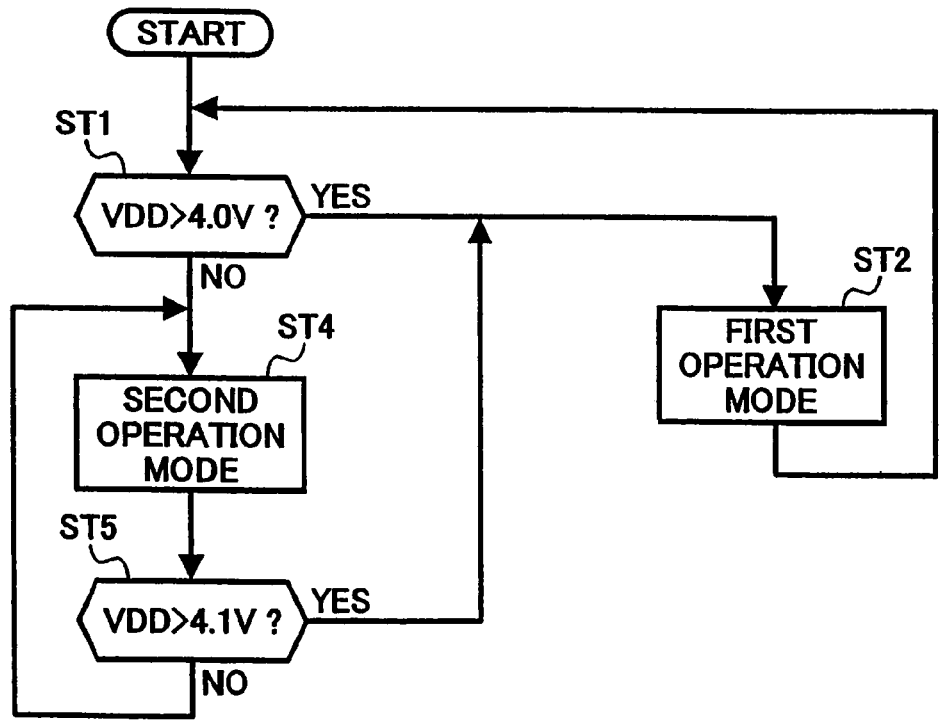
FIG. 17 is a flow chart illustrating another exemplary control operation performed by the control circuit unit 33 for controlling the operation of the charge pump circuit unit 31.

Next, FIG. 17 illustrates an exemplary operation of the control circuit unit 33 when it operates the charge pump circuit unit 31 in the first or second operation mode. In FIG. 17, steps at which the same processing is performed as in FIG. 15 are designated by the same reference letters, and description thereon is omitted here.

In FIG. 17, the control circuit unit 33 first performs the processing at step ST1 in FIG. 15, and performs the processing at step ST2 in FIG. 15 when the supply voltage VDD exceeds 4.0 V at step ST1 (YES), followed by the flow returning to step ST1. On the other hand, when the supply voltage VDD is equal to or lower than 4.0 V at step ST1 (NO), the control circuit unit 33 performs the operation at step ST4 in FIG. 15, and performs the processing at step ST5 in FIG. 15. The flow proceeds to step ST2 when the supply voltage VDD exceeds 4.1 V (YES), or returns to step ST4 when the supply voltage VDD is equal to or lower than 4.1 V (NO).

Figure 18:
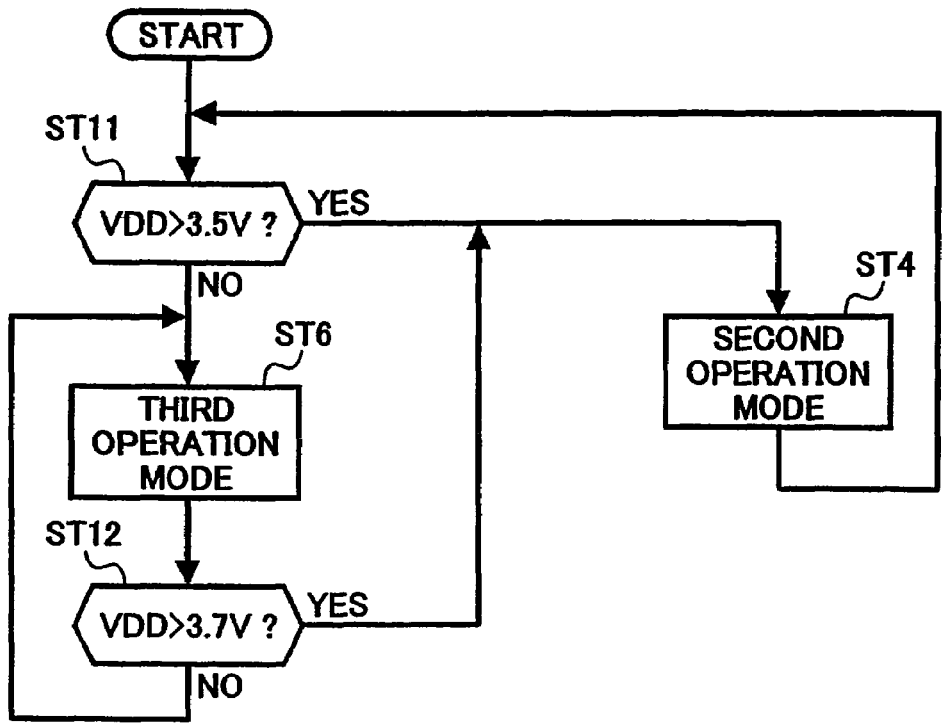
FIG. 18 is a flow chart illustrating another exemplary control operation performed by the control circuit unit 33 for controlling the operation of the charge pump circuit unit 31.

FIG. 18 illustrates an exemplary operation of the control circuit unit 33 when the charge pump circuit unit 31 is operated in the second or third operation mode. In FIG. 18, steps at which the same processing is performed as in FIG. 15 are designated by the same reference letters, and description thereon is omitted here.

In FIG. 18, the control circuit unit 33 first examines whether or not the supply voltage VDD detected by the voltage detector circuit unit 34 exceeds a predetermined value V3, for example, 3.5 V (step ST11). When the supply voltage VDD exceeds 3.5 V (YES), the control circuit unit 33 performs the processing at step ST4 in FIG. 15, followed by the flow returning to step ST11.

When the supply voltage VDD is equal to or lower than 3.5 V at step ST11 (NO), the control circuit unit 33 performs the processing at step ST6 in FIG. 15, and then examines whether or not the supply voltage VDD detected by the voltage detector circuit unit 34 exceeds 3.7 V (step ST12). The flow proceeds to step ST4 when the supply voltage VDD exceeds 3.7 V at step ST12 (YES), or returns to step ST6 when the supply voltage VDD is equal to or lower than 3.7 V (NO).

Next, the operation of the control circuit unit 33 and charge pump circuit unit 31 in the respective modes will be described in greater detail with reference to FIGS. 19 to 32.

Figure 19:
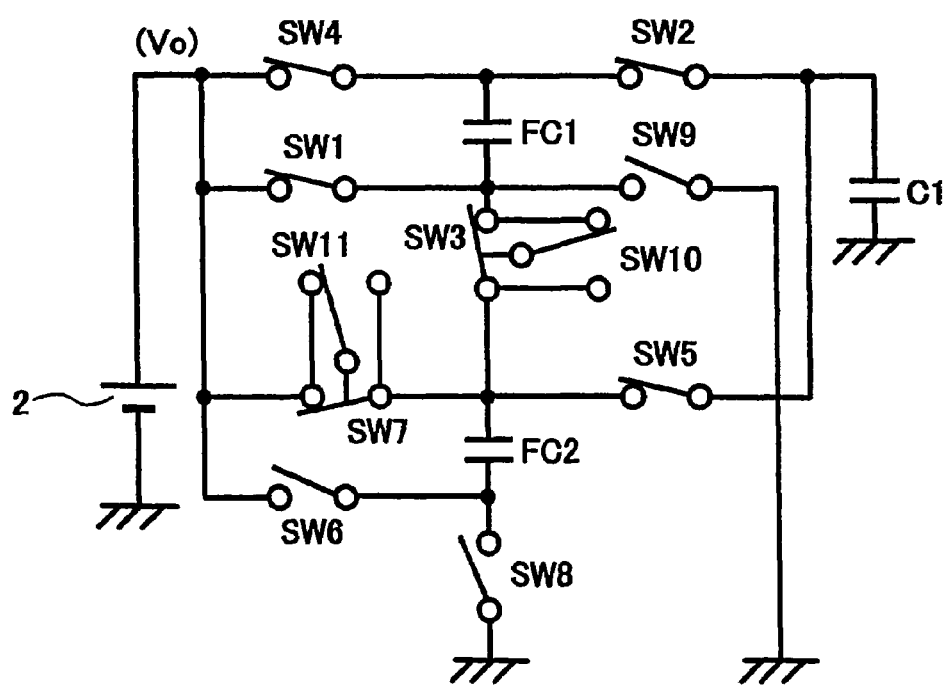
FIG. 19 is an equivalent circuit diagram illustrating states of respective switching elements which make up the charge pump circuit unit 31 in a first operation mode.

FIG. 19 is an equivalent circuit diagram illustrating the states of the respective switching elements in the charge pump circuit unit 31 in the first operation mode. The operation of the charge pump circuit 30 in the first mode will be described with reference to FIG. 19.

As can be seen from FIG. 19, in the first operation mode, each of the first switching element SW1, second switching element SW2, third switching element SW3, fourth switching element SW4, fifth switching element SW5 and seventh switching element SW7 is turned on and in a conductive state, while each of the sixth switching element SW6, eighth switching element SW8 and ninth switching element SW9 is turned off and in a shut-off state. Further, the change-over switch SW10 connects the substrate gate to the source in the third switching element SW3, while the change-over switch SW11 connects the substrate gate to the source in the seventh switching element SW7.

In this way, the output voltage Vo of the voltage regulator circuit 40 is output from the output terminal CPOUT of the charge pump circuit 30 as it is in the first operation mode. Since a voltage difference between the source and drain in each of the third switching element SW3 and seventh switching element SW7 is 0 V, the substrate gate may be connected either to the drain or to the source in the respective switching elements. However, since the current is flowing from the source to the drain, each substrate gate is connected to the source in FIG. 19.

Figure 20:
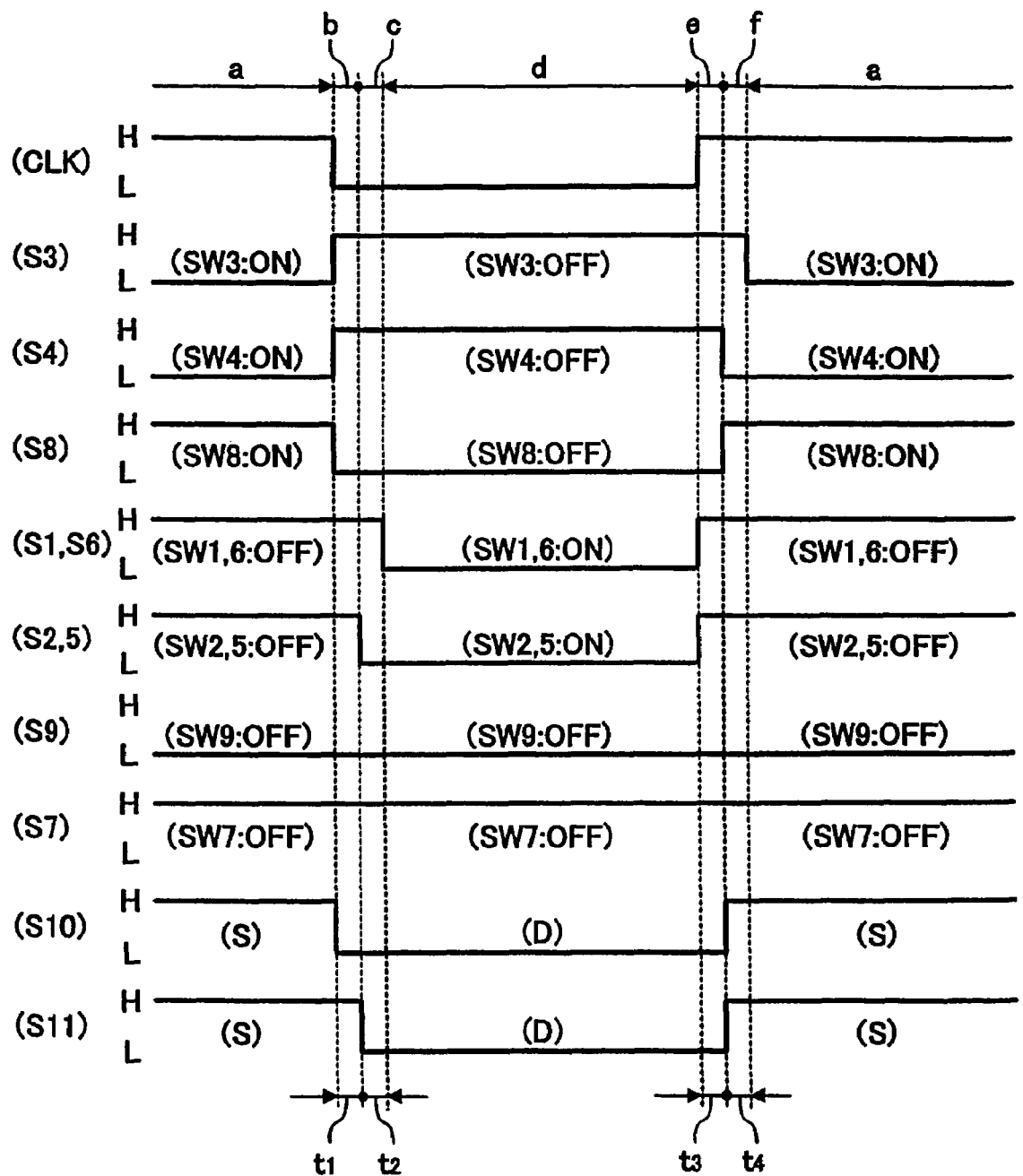
FIG. 20 is a timing chart showing exemplary control signals S1–S11 in FIG. 14 in a second operation mode.

Next, the second mode operation will be described with reference to FIGS. 20 to 26. FIG. 20 is a timing chart showing the respective control signals S1–S11 in the second operation mode, and FIGS. 21 to 26 are equivalent circuit diagrams each illustrating an exemplary operation of the charge pump circuit unit 31 in each state of the control signals S1–S11. The operation of the charge pump circuit 30 in the second operation mode will be described with reference to FIGS. 20 to 26.

In a state a in which the clock signal CLK is at a high (High) level, the control circuit unit 33 brings each of the control signals S1, S2, S5–S8, S10, S11 to a high level, and each of the control signals S3, S4, S9 to a low (Low) level.

Figure 21:
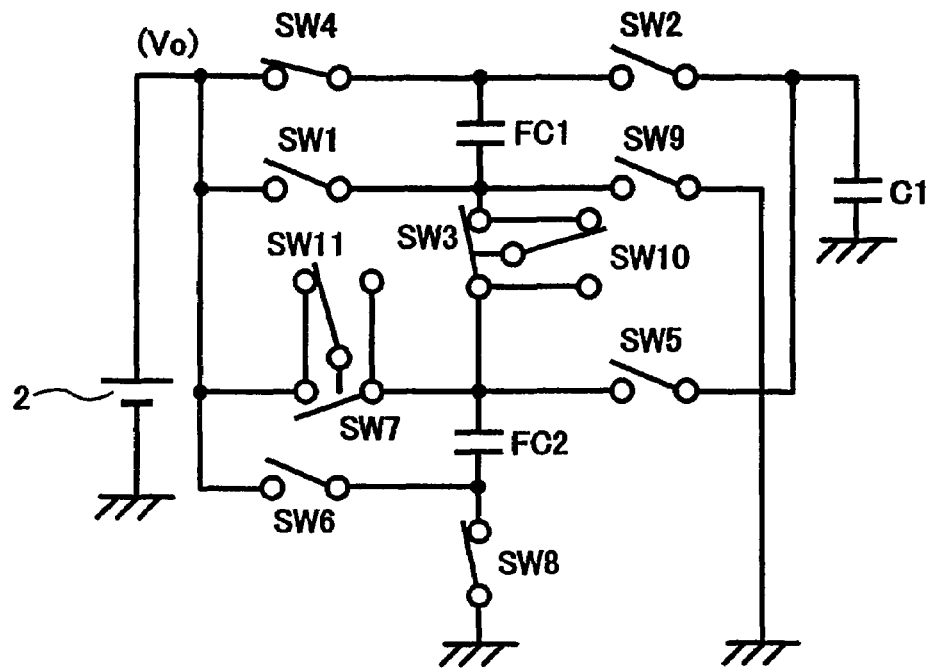
FIG. 21 is an equivalent circuit diagram illustrating an exemplary operation of the charge pump circuit unit 31 in a state a in FIG. 20.

In the state a as mentioned above, each of the first switching element SW1, second switching element SW2, fifth switching element SW5, sixth switching element SW6, seventh switching element SW7 and ninth switching element SW9 is turned off, i.e., in a shut-off state, while each of the third switching element SW3, fourth switching element SW4 and eighth switching element SW8 is turned on, i.e., in a conductive state, as illustrated in FIG. 21. Further, the change-over switches SW10, SW11 connect the substrate gate to the source in the third switching element SW3 and seventh switching element SW7, respectively. In the state a, since each of the fly back capacitors FC1, FC2 connected in series is charged with the input voltage Vo, each of the fly back capacitors FC1, FC2 is charged to one half of the voltage Vo.

Figure 22:
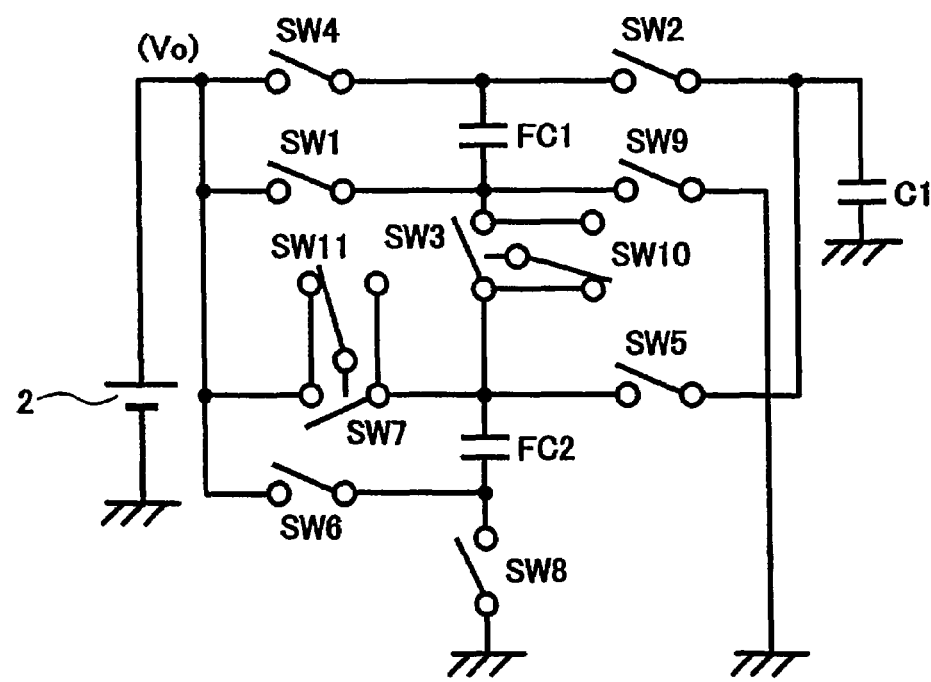
FIG. 22 is an equivalent circuit diagram illustrating an exemplary operation of the charge pump circuit unit 31 in a state b in FIG. 20.

Next, as the clock signal CLK falls to a low level, the control circuit unit 33 immediately brings each of the control signals S3, S4 to a high level, and brings each of the control signals S8, S10 to a low level, resulting in a transition to a state b in FIG. 20. In response to the transition from the state a to the state b, each of the third switching element SW3, fourth switching element SW4 and eighth switching element SW8 is turned off and in a shut-off state, as illustrated in FIG. 22. Simultaneously, the change-over switch SW10 connects the substrate gate to the drain in the third switching element SW3. Since all the switching elements are turned off and in a shut-ff state in the state b, each of the fly back capacitors FC1, FC2 remains charged at one half of the voltage Vo.

Figure 23:
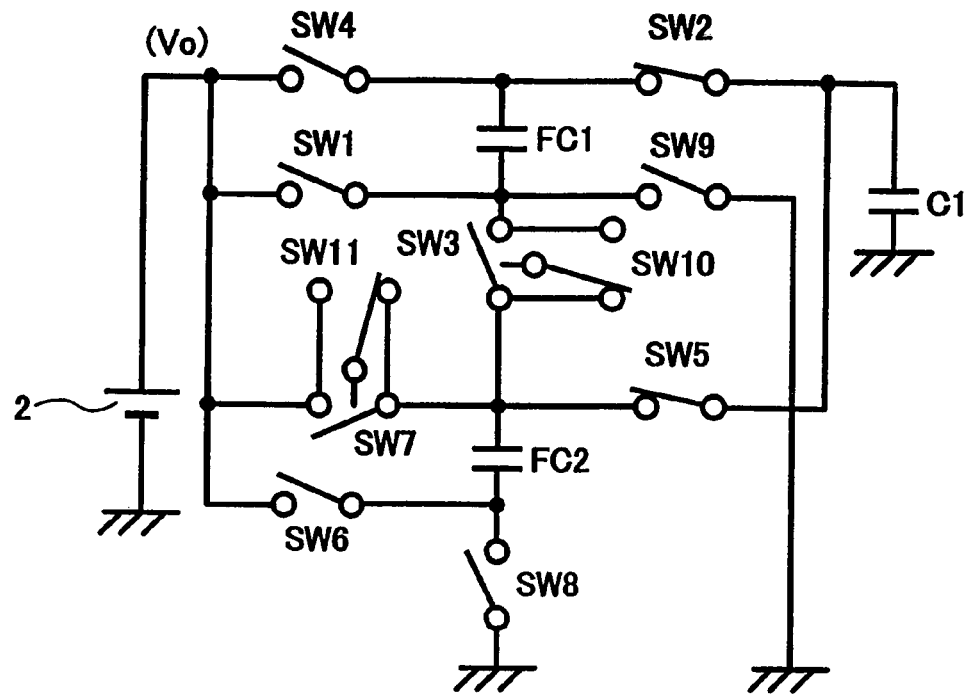
FIG. 23 is an equivalent circuit diagram illustrating an exemplary operation of the charge pump circuit unit 31 in a state c in FIG. 20.

Next, the control circuit unit 33 brings each of the control signals S2, S5, S11 to a low level in a predetermined time t1 after the clock signal CLK falls to a low level, resulting in a transition to a state c in FIG. 20. In response to the transition from the state b to the state c, each of the second switching element SW2 and fifth switching element SW5 is turned on and in a conductive state, as illustrated in FIG. 23. In the state c, each of the switching elements SW2, SW5 is turned on, each of the remaining switching elements is turned off and the high potential side of each of the fly back capacitors FC1, FC2 is connected to the output terminal CPOUT.

In this event, when a voltage on the catch-up capacitor C1 is higher than the voltage Vo, the fourth switching element SW4 has a drain voltage higher than a source voltage. However, since the substrate gate is connected to the drain in the fourth switching element SW4, no current will flow through a parasitic diode of the fourth switching element SW4. Similarly, while the seventh switching element SW7 has a drain voltage higher than a source voltage, the substrate gate is connected to the drain in the seventh switching element SW7 by the change-over switch SW11, so that no current will flow through a parasitic diode of the seventh switching element.

In the third switching element SW3, a drain voltage becomes equal to the voltage on the catch-up capacitor C1, and a source voltage becomes equal to a voltage lower than the voltage on the catch-up capacitor C1 by Vo/2. Therefore, in the third switching element SW3, the drain voltage is higher than the source voltage. However, since the substrate gate is connected to the drain in the third switching element SW3 by the change-over switch SW10, no current will flow through a parasitic diode of the third switching element SW3.

Figure 24:
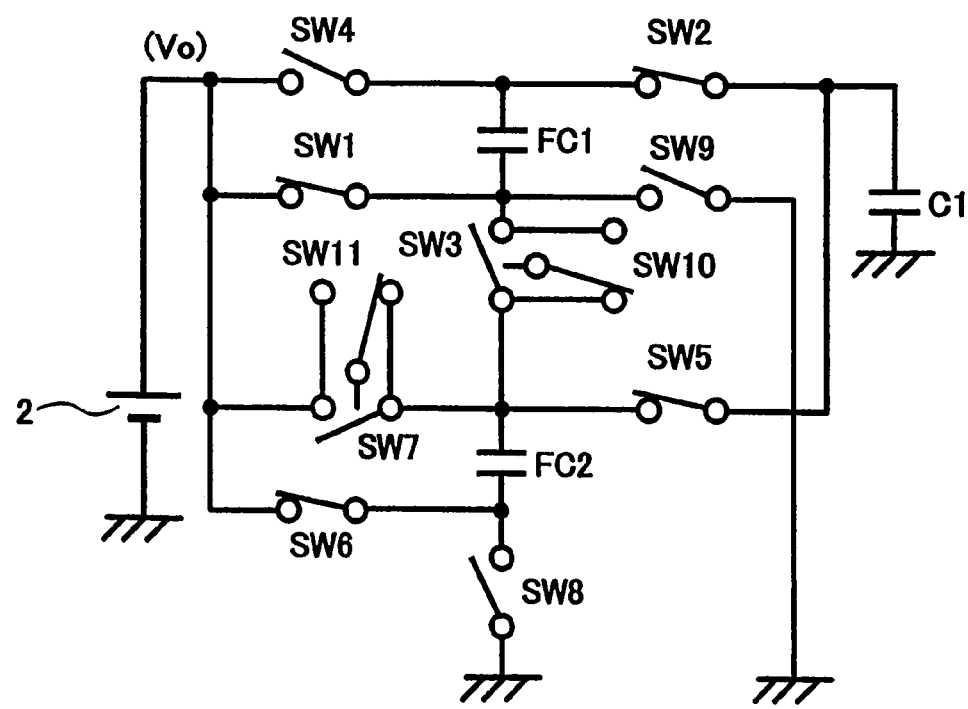
FIG. 24 is an equivalent circuit diagram illustrating an exemplary operation of the charge pump circuit unit 31 in a state d in FIG. 20.

Next, the control circuit unit 33 brings each of the control signals S1, S6 to a low level in a predetermined time t2 after the transition to the state c, resulting in a transition to a state d in FIG. 20. In response to the transition from the state c to the state d, each of the first switching element SW1 and sixth switching element SW6 is turned on and in a conductive state, as illustrated in FIG. 24. In the state d, each of the first switching element SW1, second switching element SW2, fifth switching element SW5 and sixth switching element SW6 is turned on, while each of the third switching element SW3, fourth switching element SW4, seventh switching element SW7, eighth switching element SW8 and ninth switching element SW9 is turned off.

Therefore, the low potential side of each of the fly back capacitors FC1, FC2 is connected to the input terminal CPIN. From the foregoing, a voltage on the high potential side of each of the fly back capacitors FC1, FC2 is increased to a voltage 1.5 times as high as the voltage Vo. The catch-up capacitor C1 is charged with this voltage, so that the voltage on the catch-up capacitor C1 also increases to the voltage 1.5 times as high as the voltage Vo.

Figure 25:
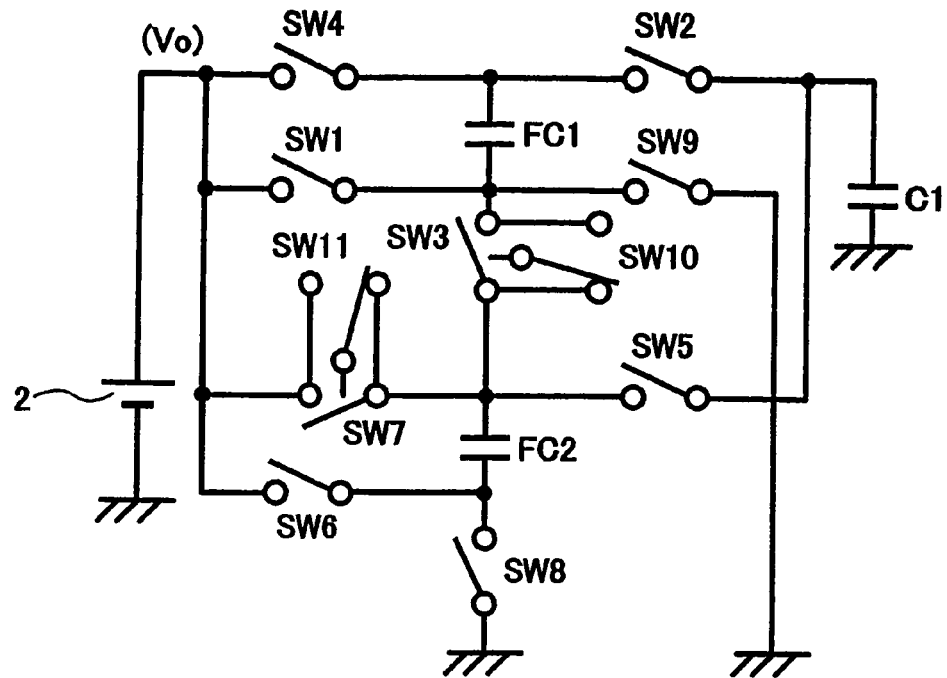
FIG. 25 is an equivalent circuit diagram illustrating an exemplary operation of the charge pump circuit unit 31 in a state e in FIG. 20.

Next, as the clock signal CLK rises to a high level, the control circuit unit 33 immediately brings each of the control signals S1, S2, S5, S6 to a high level, resulting in a transition to a state e in FIG. 20. In response to the transition from the state d to the state e, each of the first switching element SW1, second switching element SW2, fifth switching element SW5 and sixth switching element SW6 is turned off and in a shut-off state, as illustrated in FIG. 25. In the state e, all the switching elements are turned off, and the fly back capacitors FC1, FC2 have supplied charges to the catch-up capacitor C1, so that the charged voltages thereon are reduced to a level lower than the voltage Vo/2.

Figure 26:
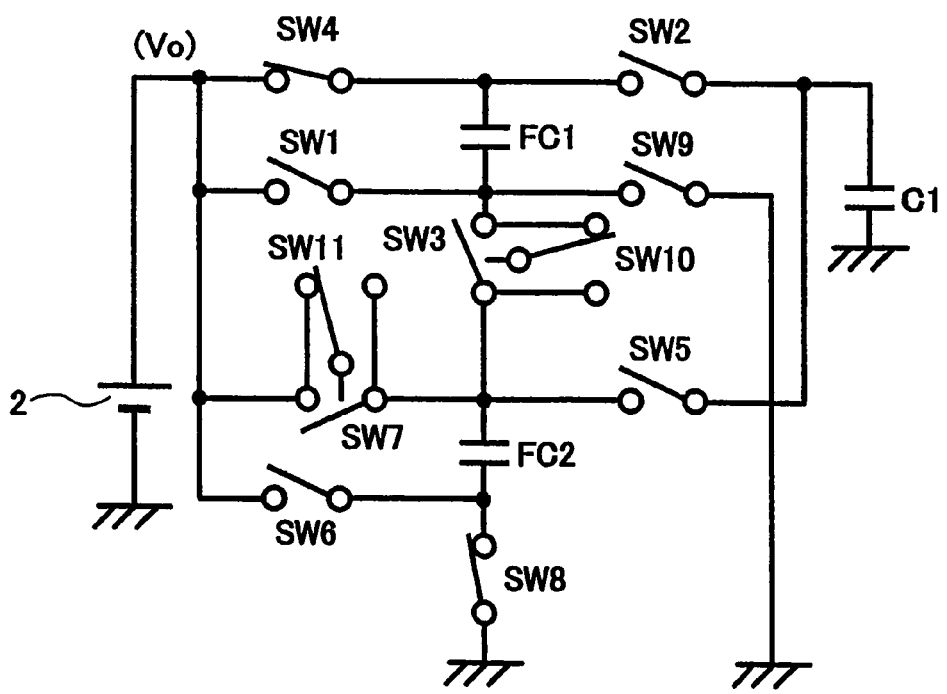
FIG. 26 is an equivalent circuit diagram illustrating an exemplary operation the charge circuit unit 31 in a state f in FIG. 20.

Next, the control circuit unit 33 brings the control signal S4 to a low level, and brings each of the control signals S8, S10, S11 to a high level in a predetermined time t3 after the clock signal CLK rises to a high level, resulting in a transition to a state f in FIG. 20. In response to the transition from the state e to the state f, each of the fourth switching element SW4 and eighth switching element SW8 is turned on and in a conductive state, as illustrated in FIG. 26. Also, each of change-over switches SW10, SW11 connects the substrate gate to the source in the third switching element SW3 or seventh switching element SW7 corresponding thereto.

In the state f, each of the fourth switching element SW4 and eighth switching element SW8 is turned on to bring the high potential side of the fly back capacitor FC1 to the same voltage as the voltage Vo, causing the low potential side of the fly back capacitor FC1 to be at a voltage slightly higher than Vo/2. Since the low potential side of the fly back capacitor FC2 is equal to the ground potential, the high potential side thereof is at a voltage slightly lower than Vo/2. From the foregoing, the third switching element SW3 has a source voltage higher than a drain voltage. Therefore, in the third switching element SW3, the connection of the substrate gate is switched from the drain to the source by the change-over switch SW10 corresponding thereto, thereby preventing a reactive current due to the parasitic diode of the third switching element SW3, and simultaneously preventing a reactive current from flowing through a parasitic transistor based on the substrate gate.

Similarly, the seventh switch SW7 has a source voltage higher than a drain voltage. Therefore, in the seventh switching element SW7, the connection of the substrate gate is switched from the drain to the source by the change-over switch SW11 corresponding thereto, thereby preventing a reactive current due to the parasitic diode of the seventh switching element SW7, and simultaneously preventing a reactive current from flowing through a parasitic transistor based on the substrate gate.

Also, the control circuit unit 33 brings the control signal S3 to a low level in a predetermined time t4 after the transition to the state f, resulting in a transition to the state a in FIG. 20. In response to the transition from the state f to the state a, the third switching element SW3 is turned on and in a conductive state, as illustrated in FIG. 21. In this way, each of the seventh switching element SW7 and ninth switching element SW9 is not used and remain in a shut-off state in the second operation mode.

Here, description will be made on the reason why the timing at which the first switching element SW1 is turned on is shifted from the timing at which the sixth switching element SW6 is turned on after the clock signal CLK falls to a low level.

Since the voltage on the high potential side of the catch-up capacitor C1 is generally higher than the input voltage Vo, the drain voltage is higher than the source voltage in each of the second switching element SW2 and fifth switching element SW5 when each of the fly back capacitors FC1, FC2 is charged in the state a.

For this reason, if the substrate gate is connected to the source in each of the second switching element SW2 and fifth switching element SW5, a forward current flows into the parasitic diode of the MOS transistor, thereby causing a reactive current. To eliminate this inconvenience, when the fly back capacitors FC1, FC2 are charged, the substrate gate is connected to the drain in each of the second switching element SW2 and fifth switching element SW5 to reverse the parasitic diode of the MOS transistor to prevent the reactive current from flowing.

When the first switching element SW1 and fifth switching element SW6 are turned on prior to the second switching element SW2 and fifth switching element SW5 upon transition from the state b to the state c, the voltage on the high potential side of each of the fly back capacitors FC1, FC2 is increased to a voltage 1.5 times as high as the input voltage Vo. In response, the source voltage becomes higher than the drain voltage because the substrate gate is connected to the drain in each of the second switching element SW2 and fifth switching element SW5, causing a reactive current to flow through the substrate gate in each of the second switching element SW2 and fifth switching element SW5. Thus, such a reactive current can be prevented by turning the second switching element SW2 and fifth switching element SW5 prior to the first switching element SW1 and sixth switching element SW6 upon transition from the state b to the state c.

Next, description will be made on the reason why the timing at which each of the fourth switching element SW4 and eighth switching element SW8 is turned on and the timing at which the third switching element SW3 is turned on are shifted upon transition from the state e to the state f and upon transition from the state f to the state a.

In the state d, the gate voltage is substantially equal to the input voltage Vo, and the drain voltage is approximately 1.5 times as high as the input voltage Vo in the third switching element SW3, so that a junction capacitance between the gate and source is charged with a voltage one half as high as the input voltage Vo, where the gate has the minus polarity with reference to the drain. This can be applied as well to the state e.

When the eighth switching element SW8 is turned on at the same timing as the third switching element SW3 upon transition from the state e to the state f, the eighth switching element SW8 is turned on to reduce a voltage at the connection of the fly back capacitor FC2 with the drain of the third switching element SW3 to approximately one half as high as the input voltage Vo. Consequently, the gate voltage is becoming lower due to the influence of a charge accumulated on the junction capacitance between the gate and drain in the third switching element SW3.

In this event, when the third switching element SW3 is applied at the gate with a signal which changes from a high level to a low level for turning on the third switching element SW3, the third switching element SW3 will be over-driven due to the influence of the charge accumulated on the junction capacitance between the gate and drain, as mentioned above, resulting in an instantaneously minus gate voltage generated in the third switching element SW3.

Since the control circuit unit 33 has an output circuit generally based on CMOS for driving the gate of the third switching element SW3, a reactive current flows into a base substrate of an NMOS transistor which comprises the output circuit, causing a parasitic transistor of the NMOS transistor to turn on to give rise to latch-up. For preventing the latch-up, the control circuit unit 33 turns on the third switching element SW3 in a predetermined time t4 after the eighth switching element SW8 is turned on.

Figure 27:
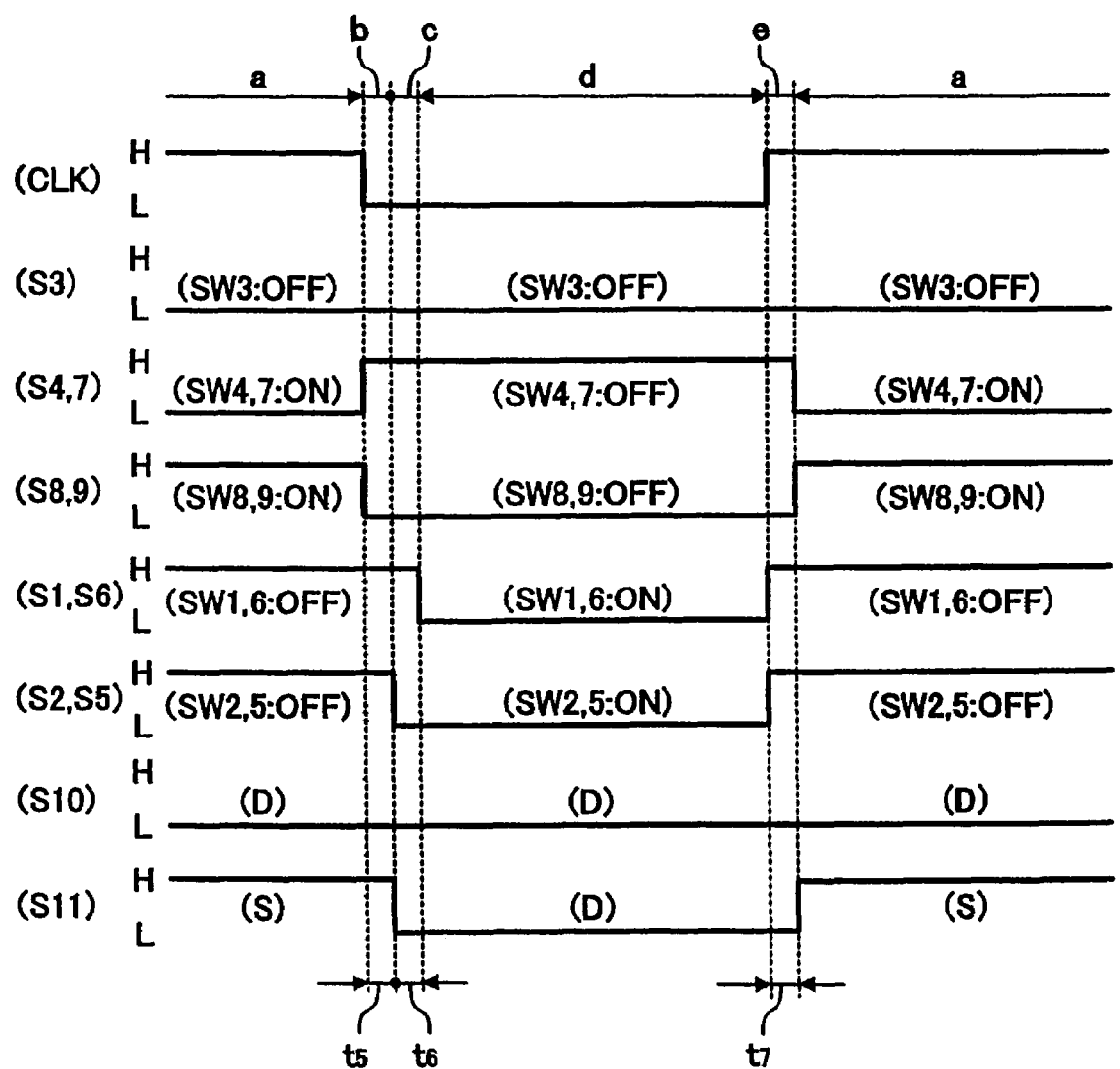
FIG. 27 is a timing chart showing exemplary control signals S1–S11 in FIG. 14 in a third operation mode.

Next, the third operation mode will be described with reference to FIGS. 27 to 32. FIG. 27 is a timing chart showing the respective control signals S1–S11 in the third operation mode, and FIGS. 28 to 32 are equivalent circuit diagrams each illustrating an exemplary operation of the charge pump circuit unit 31 in each of states of the respective control signals in FIG. 27. The operation of the charge pump circuit 30 in the third operation mode will be described with reference to FIGS. 27 to 32.

In a state a in which the clock signal CLK is at a high level, the control circuit unit 33 brings each of the control signals S1, S2, S5, S6, S8, S9, S11 to a high level, and brings each of the control signals S3, S4, S7, S10 to a low level.

Figure 28:
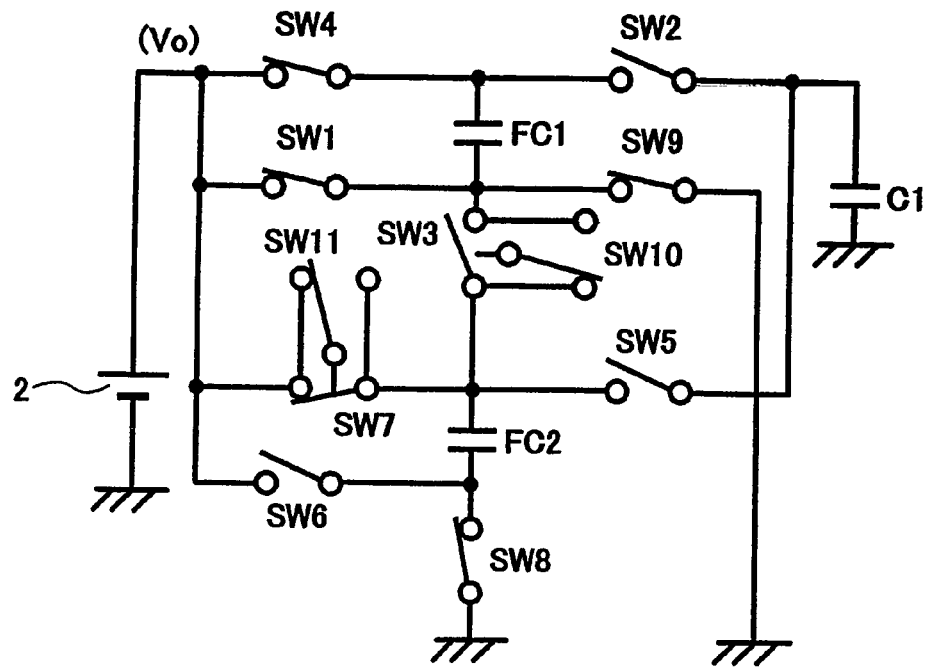
FIG. 28 is an equivalent circuit diagram illustrating an exemplary operation of the charge pump circuit unit 31 in a state a in FIG. 27.

In the state a as mentioned above, each of the first switching element SW1, second switching element SW2, third switching element SW3, fifth switching element SW5 and sixth switching element SW6 is turned off and in a shut-off state, while each of the fourth switching element SW4, seventh switching element SW7, eighth switching element SW8 and ninth switching element SW9 is turned on and in a conductive state, as illustrated in FIG. 28. Further, the change-over switch SW10 connects the substrate gate to the drain in the third switching element SW3, while the change-over switch SW11 connects the substrate gate to the source in the seventh switching element SW7. In the state a, each of the fly back capacitors CF1, CF2 is charged with the output voltage Vo of the voltage regulator circuit 40.

Figure 29:
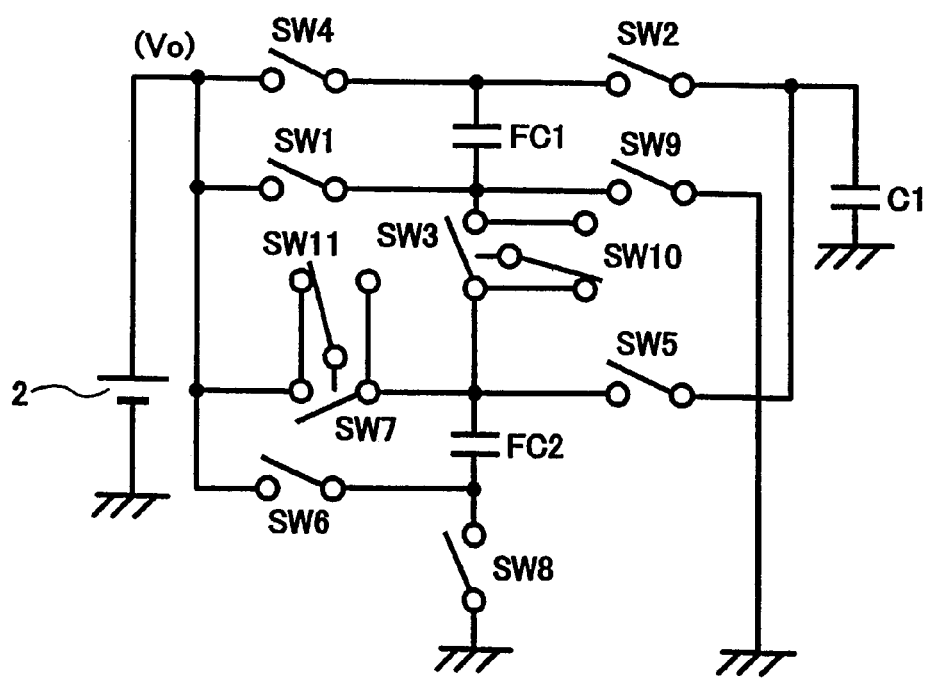
FIG. 29 is an equivalent circuit diagram illustrating an exemplary operation of the charge pump circuit unit 31 in a state b in FIG. 27.

Next, as the clock signal CLK falls to a low level, the control circuit unit 33 immediately brings each of the control signals S4, S7 to a high level, and brings each of the control signals S8, S10 to a low level, resulting in a transition to a state b in FIG. 27. In response to the transition from the state a to the state b, each of the fourth switching element SW4, seventh switching element SW7, eighth switching element SW8 and ninth switching element SW9 is turned off and in a shut-off state, as illustrated in FIG. 29. In the state b, all the switching elements are turned off and remain in a shut-off state. The change-over switch SW10 continuously connects the substrate gate to the drain in the third switching element SW3, while the change-over switch SW11 continuously connects the substrate-gate to the source in the seventh switching element SW7. From the foregoing, each of the fly back capacitors FC1, FC2 remains charged at the voltage Vo.

Figure 30:
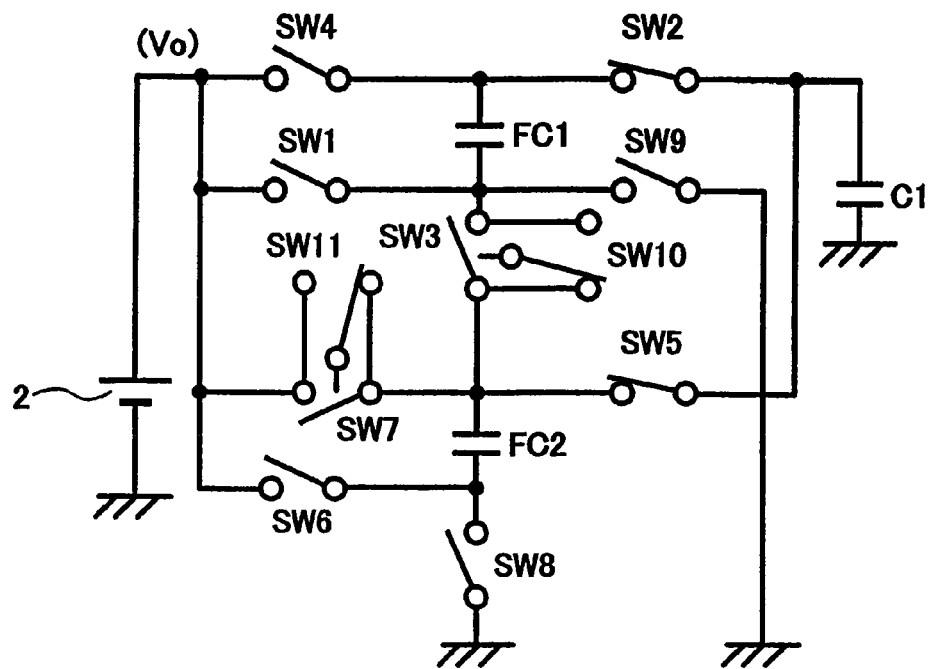
FIG. 30 is an equivalent circuit diagram illustrating an exemplary operation of the charge pump circuit unit 31 in a state c in FIG. 27.

Next, the control circuit unit 33 brings each of the control signals S2, 5, S11 to a low level in a predetermined time t5 after the clock signal CLK falls to a low level, resulting in a transition to a state c in FIG. 27. In response to the transition from the state b to the state c, each of the second switching element SW2 and fifth switching element SW5 is turned on and in a conductive state, and the change-over switch SW11 connects the substrate gate to the drain in the seventh switching element SW7, as illustrated in FIG. 30. In the state c, each of the second switching element SW2 and fifth switching element SW5 is turned on, while each of the remaining switching elements is turned off. The high potential side of each of the fly back capacitors FC1, FC2 is connected to the output terminal CPOUT.

In this event, in the third switching element, a drain voltage becomes equal to a voltage on the catch-up capacitor C1, and a source voltage becomes equal to a voltage lower than the voltage on the catch-up capacitor C1 by the voltage Vo. Therefore, in the third switching element SW3, the drain voltage is higher than the source voltage. However, since the substrate gate is connected to the drain in the third switching element SW3 by the change-over switch SW10, no current will flow through a parasitic diode of the third switching element SW3.

Similarly, in the seventh switching element SW7, a drain voltage becomes equal to the voltage on the catch-up capacitor C1, and a source voltage becomes equal to the voltage Vo. Therefore, in the seventh switching element SW7, the drain voltage is higher than the source voltage. However, since the substrate gate is connected to the drain in the seventh switching element SW7 by the change-over switch SW11, no current will flow through a parasitic diode of the seventh switching element SW7.

Figure 31:
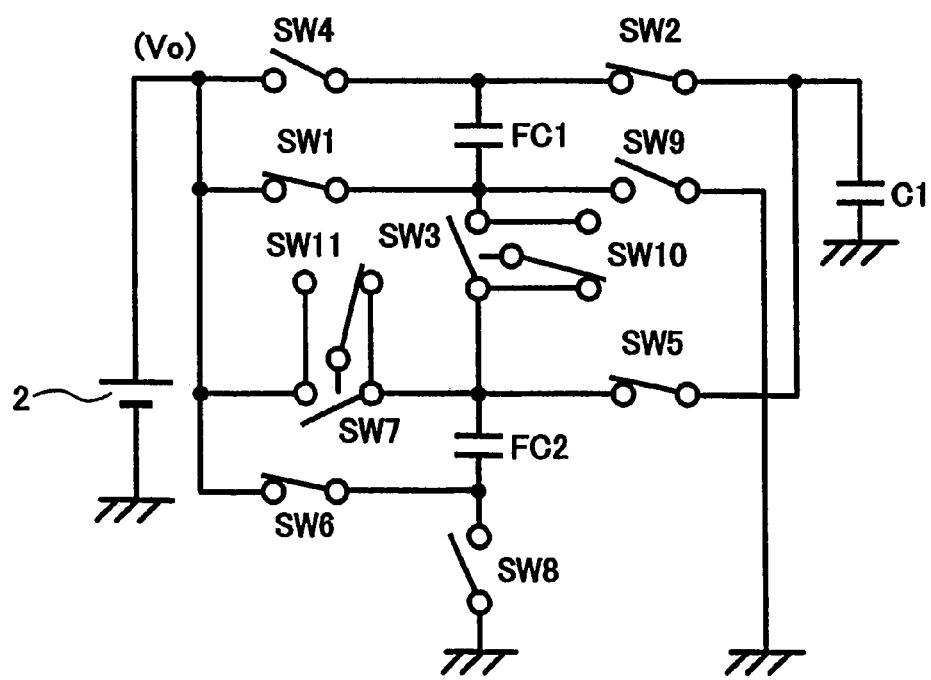
FIG. 31 is an equivalent circuit diagram illustrating an exemplary operation of the charge pump circuit unit 31 in a state d in FIG. 27.

Next, the control circuit unit 33 brings each of the control signals S1, S6 to a low level in a predetermined time t6 after the transition to the state c, resulting in a transition to a state d in FIG. 27. In response to the transition from the state c to the state d, each of the first switching element SW1 and sixth switching element SW6 is turned on and in a conductive state, as illustrated in FIG. 31. In the state d, each of the first switching element SW1, second switching element SW2, fifth switching element SW5 and sixth switching element SW6 is turned on, while each of the third switching element SW3, fourth switching element SW4, seventh switching element SW7, eighth switching element SW8 and ninth switching element SW9 is turned off.

Therefore, the low potential side of each of the fly back capacitors FC1, FC2 is connected to the input terminal CPIN. From the foregoing, a voltage on the high potential side of each of the fly back capacitors FC1, FC2 is increased to a voltage twice as high as the voltage Vo. The catch-up capacitor C1 is charged with this voltage, so that the voltage on the catch-up capacitor C1 also increases to the voltage twice as high as the voltage Vo.

Figure 32:
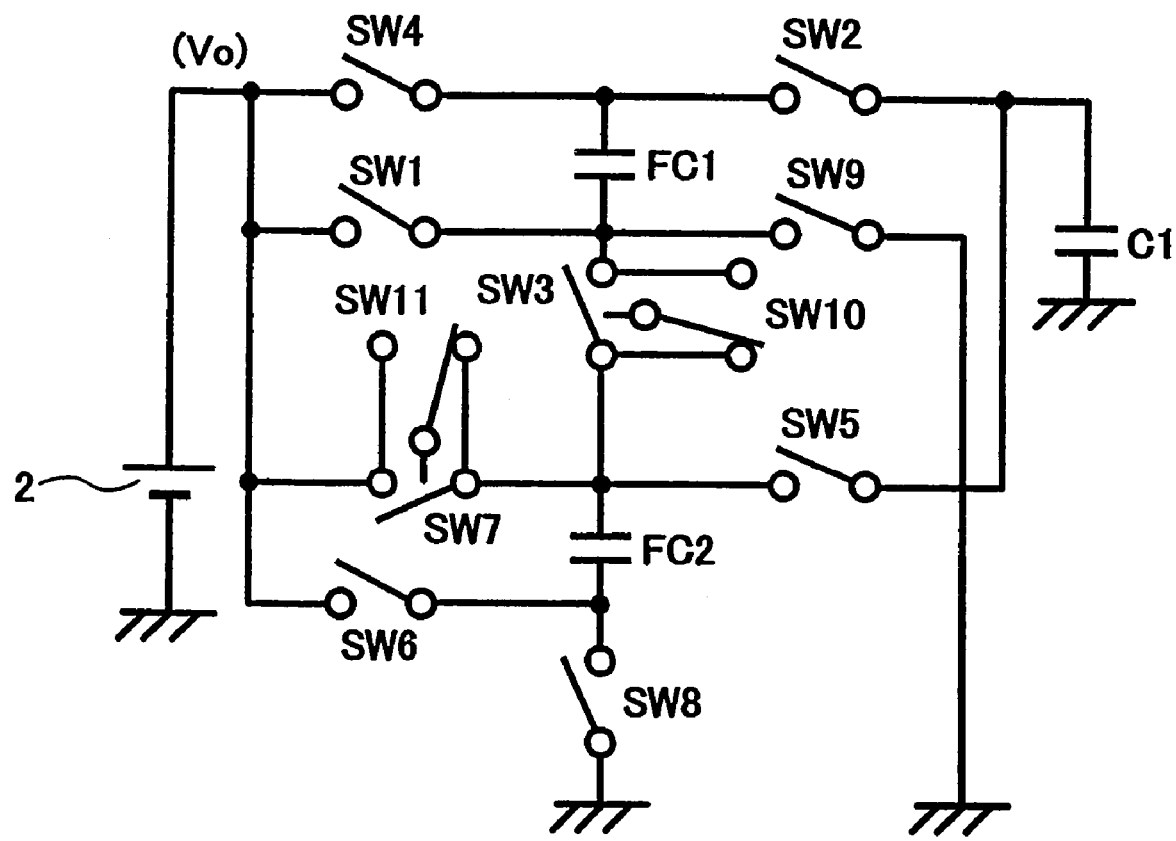
FIG. 32 is an equivalent circuit diagram illustrating an exemplary operation of the charge pump circuit unit 31 in a state e in FIG. 27.

Next, as the clock signal CLK rises to a high level, the control circuit unit 33 immediately brings each of the control signals S1, S2, S5, S6 to a high level, resulting in a transition to a state e in FIG. 27. In response to the transition from the state d to the state e, each of the first switching element SW1, second switching element SW2, fifth switching element SW5 and sixth switching element SW6 is turned off and in a shut-off state, as illustrated in FIG. 32. In the state e, all the switching elements are turned off, and the fly back capacitors FC1, FC2 have supplied charges to the catch-up capacitor C1, so that the charged voltages thereon are reduced to a level lower than the voltage Vo.

Next, the control circuit unit 33 brings each of the control signals S4, S7 to a low level, and brings each of the control signals S8, S9 to a high level in a predetermined time t7 after the transition to the state e, resulting in a transition to the state a in FIG. 27. In response to the transition from the state e to the state a, each of the fourth switching element SW4, seventh switching element SW7, eighth switching element SW8 and ninth switching element SW9 is turned on and in a conductive state, as illustrated in FIG. 28.

As described above, in the third operation mode, the third switching element SW3 remains in a shut-off state, so that the change-over switch SW10 will not change the connection of the substrate gate to the source in the third switching element SW3. The reason why each of the first switching element SW1 and sixth switching element is turned on at a timing shifted from a timing at which each of the second switching element SW2 and fifth switching element SW5 is turned on is similar to the second operation mode.

As will be appreciated from the foregoing, the power supply circuit according to the second embodiment of the present invention comprises the charge pump circuit 30 which receives the output voltage Vo of the voltage regulator circuit 40 as an input voltage for boosting the voltage Vo in the first operation mode for boosting by a factor of 1, in the second operation mode for boosting by a factor of 1.5, and in the third operation mode for boosting by a factor of 2. The charge pump circuit 30 is operated in either of the first operation mode, second operation mode and third operation mode in response to the value of the supply voltage VDD. It is therefore possible to supply a load circuit with a substantially constant voltage even using a DC power supply such as a battery which provides a gradually decreasing voltage, thereby making it possible to stabilize the output voltage from the charge pump circuit and increase the power efficiency.

Also, the fourth switching element SW4 having the substrate gate connected to the drain is provided for preventing a current from flowing back to the input terminal CPIN from the high potential side of the fly back capacitors FC1, FC2 connected in series, and the second switching element SW2 having the substrate gate connected to the drain is provided for preventing a current from flowing back to the fly back capacitors FC1, FC2 connected in series from the high potential side of the catch-up capacitor C1. With this strategy, it is possible to prevent a current from flowing back from the high potential side of the capacitors without using diodes, thereby eliminating a voltage drop due to forward currents of the diodes.

Also, when the fly back capacitors FC1, FC2 are charged with the input voltage Vo, the third switching element SW3 is turned on after the fourth switching element SW4 and eighth switching element SW8 are turned on. With this strategy, it is possible to prevent a reactive current from flowing into the substrate gate of the NMOS transistor which comprises the output circuit of the control circuit unit 4 for driving the gate of the third switching element SW3, and to prevent the parasitic transistor of the NMOS transistor from turning on to cause latch-up.

When voltages charged on the fly back capacitors FC1, FC2 are output to the output terminal CPOUT, the change-over switch SW10 connects the substrate gate to the drain in the third switching element SW3 before each of the second switching element SW2 and fifth switching element SW5 is turned on, and then, each of the first switching element SW1 and sixth switching element SW6 is turned on. With this strategy, it is possible to prevent a reactive current from flowing through a capacitive diode in the third switching element SW3 and to make the source voltage higher than the drain voltage in each of the second switching element SW2 and fifth switching element SW5, thereby preventing a reactive current from flowing through the substrate gate of each of second switching element SW2 and fifth switching element SW5.

Figure 33:
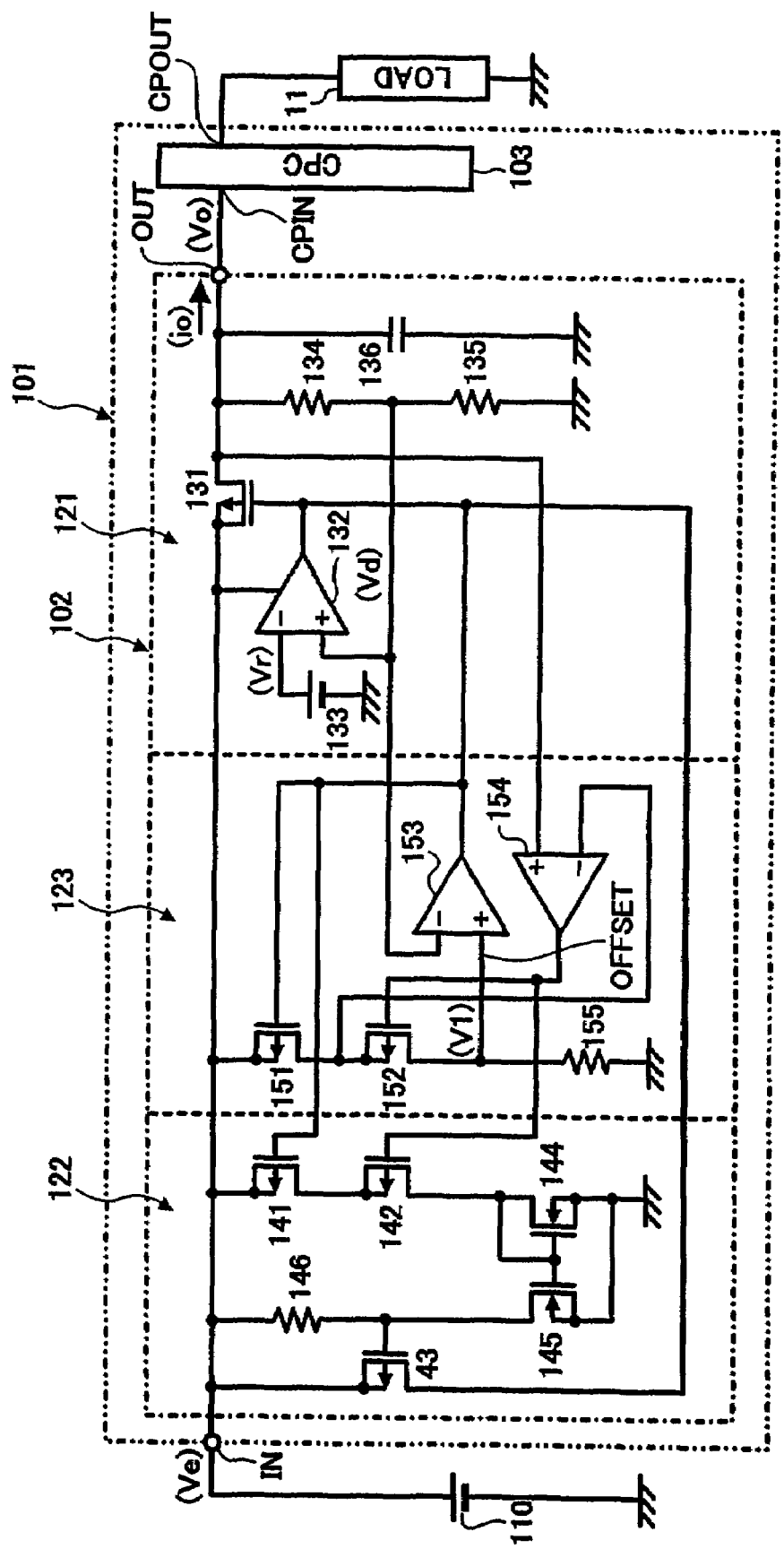
FIG. 33 is a block diagram generally illustrating an exemplary power supply circuit according to a third embodiment of the present invention.

Third Embodiment:

FIG. 33 is a block diagram generally illustrating an exemplary power supply circuit according to a third embodiment of the present invention.

The power supply circuit 101 in FIG. 33 comprises a voltage regulator circuit (CVC) 102 for generating a predetermined constant voltage Va from a supply voltage Ve applied to an input terminal IN from a DC power supply 110 such as a battery to output the predetermined constant voltage Va from an output terminal OUT as an output voltage Vo; and a charge pump circuit (CPC) 103 for boosting the output voltage Vo applied to an input terminal CPIN from the voltage regulator circuit 102 and outputting the boosted voltage from an output terminal CPOUT. A load 111 is connected to the output terminal CPOUT of the charge pump circuit 103.

The voltage regulator circuit 102 comprises a voltage regulator circuit unit 121 for generating the predetermined constant voltage Va from the supply voltage Ve applied to the input terminal IN to output the constant voltage Va from the output terminal OUT as the output voltage Vo; a current limiting circuit unit 122 for limiting an output current io output from the output terminal OUT such that the output current io does not exceed a predetermined value ia; and a short-circuit protection circuit unit 123 for limiting a current output from the voltage regulator circuit unit 121 such that the current is reduced simultaneously as the voltage output from the voltage regulator circuit unit 121 is reduced from the predetermined constant voltage Va. Thus, the limited current has a predetermined value ic when the output voltage of the voltage regulator circuit unit 121 is at the constant voltage Va, and has a predetermined value ib when the output voltage of the voltage regulator circuit unit 121 is at a ground voltage.

The voltage regulator circuit unit 121 comprises an output control transistor 131 comprised of a P-channel type MOS transistor (hereinafter referred to as the "PMOS transistor") for controlling the current output from the output terminal OUT in accordance with a gate voltage; an error amplifier 132 for controlling the operation of the output control transistor 131; a reference voltage generator circuit unit 133 for generating and outputting a predetermined reference voltage Vr; a series circuit of a resistor 134 and a resistor 135 for dividing the output voltage Vo; and a capacitor 136. The error amplifier 132 amplifies an error of a voltage Vd divided from the output voltage Vo by the resistors 134, 135 with respect to the reference voltage Vr, outputs the amplified error, and controls the operation of the output control transistor 131. The output control transistor 131 has a drain voltage stabilized by the capacitor 136, and the output voltage Vo at the constant voltage Va is output from the output terminal OUT.

The current limiting circuit unit 122 comprises PMOS transistors 141–143, N-channel type MOS transistors (hereinafter referred to as the "NMOS transistors") 144, 145, and a resistor 146. The PMOS transistors 141, 142 and NMOS transistor 144 are connected in series between the supply voltage Ve and ground voltage, and the NMOS transistors 144, 145 form a current mirror circuit. The PMOS transistor 141 has a gate connected to an output terminal of the error amplifier 132, while the PMOS transistor 142 has a gate connected to an output terminal of an operational amplifier 154 in the short-circuit protection circuit 123, later described. Also, between the supply voltage Ve and ground voltage, the resistor 146 and NMOS transistor 145 are connected in series, and a connection between the two components is connected to a gate of the PMOS transistor 143. The PMOS transistor 143 is connected between the supply voltage Ve and a gate of the output control transistor 131.

The short-circuit protection circuit 123 comprises PMOS transistors 151, 152, operational amplifiers 153, 154, and a resistor 155. The operational amplifier 153 is applied with a predetermined offset voltage at a non-inverting input terminal, such that the predetermined current value ib is determined by the offset voltage. When the short-circuit protection circuit 123 is integrated into an IC chip, the offset voltage can be readily provided by employing transistors having different sizes at differential inputs, employing different drain resistors for the transistors, and the like in the operational amplifier 153.

The PMOS transistors 151, 152 and resistor 155 are connected in series between the supply voltage Ve and ground voltage. The PMOS transistor 151 has a gate connected to the output terminal of the error amplifier 132, and the PMOS transistor 152 has a gate connected to an output terminal of the operational amplifier 154. The operational amplifier 153 has a non-inverting input terminal connected to a connection between the PMOS transistor 152 and resistor 155 for receiving a voltage V1 across the resistor 155, and an inverting input terminal applied with the divided voltage Vd. The operational amplifier 153 has an output terminal connected to the gate of the output control transistor 131.

The operational amplifier 154 has a non-inverting input terminal applied with the output voltage Vo, and an inverting input terminal applied with a drain voltage of he PMOS transistor 151. The operational amplifier 154 controls the operation of the PMOS transistors 142, 152 such that the drain voltage of the PMOS transistor 151 is equal to the output voltage Vo. Here, the respective PMOS transistors are formed such that the ratio of the gate size of the PMOS transistor 142 to the gate size of the PMOS transistor 152 is the same as the ratio of the gate size of the PMOS transistor 141 to the gate size of the PMOS transistor 142. By designing the respective PMOS transistors in this manner, the operational amplifier 154 can control the operation of the PMOS transistor 142 to make the drain voltage of the PMOS transistor 141 equal to the output voltage Vo.

An exemplary operation of the current limiting circuit unit 122 and short-circuit protection circuit unit 123 will be described in the foregoing configuration.

First, in the current limiting circuit unit 122, the gate of the PMOS transistor 141 is commonly connected to the gate of the output control transistor 131. Therefore, the PMOS transistor 141 outputs a current proportional to a current output from the output control transistor 131 to the NMOS transistor 144 which forms an input transistor of the current mirror circuit through the PMOS transistor 142.

Figure 34:
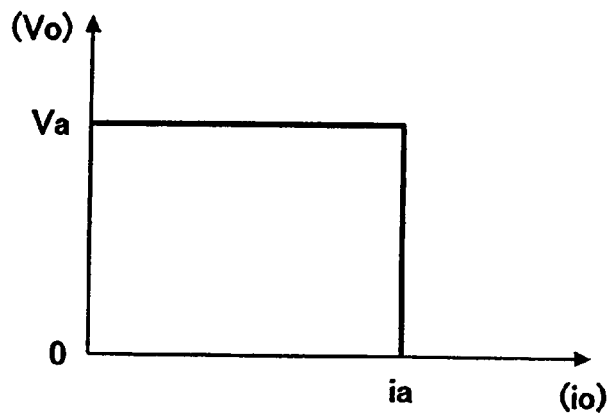
FIG. 34 is a diagram illustrating an exemplary operation of a current limiting circuit unit 122 in FIG. 33.

From the foregoing, a current in accordance with a current output from the output control transistor 131 flows through the resistor 146, and the supply voltage Ve is reduced by a voltage drop of the resistor 146 and applied to the gate of the PMOS transistor 143. As the PMOS transistor 143 is turned on, the gate voltage of the output control transistor 131 rises, and the output current io from the voltage regulator circuit unit 121 is limited not to exceed the predetermined current value ia. When the voltage regulator circuit 102 is comprised of the voltage regulator circuit unit 121 and current regulator circuit unit 122, the relationship between the output voltage Vo and output current io is as shown in FIG. 34.

Figure 35:
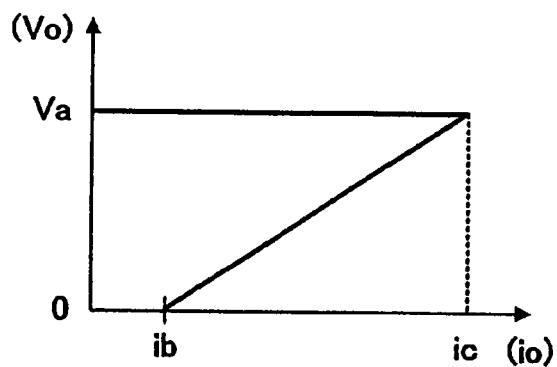
FIG. 35 is a diagram illustrating an exemplary operation of a short-circuit protection circuit unit 23 in FIG. 33.

Next, in the short-circuit protection circuit 123, the gate of the PMOS transistor 151 is commonly connected to the gate of the output control transistor 131. Therefore, the PMOS transistor 151 outputs a current proportional to a current output from the output control transistor 131 to the resistor 155 through the PMOS transistor 152. As the voltage V1 increases to the divided voltage Vd or higher, i.e., as the output current io increases to the predetermined current value ic or more, the operational amplifier 153 increases the gate voltage of the output control transistor 131 to reduce the output current io as well as the output voltage Vo, resulting in the divided voltage Vd equal to the voltage V1. When the voltage regulator circuit 102 is comprised of the voltage regulator circuit 121 and short-circuit protection circuit 123, the relationship between the output voltage Vo and output current io presents the characteristic as shown in FIG. 35.

Figure 36:
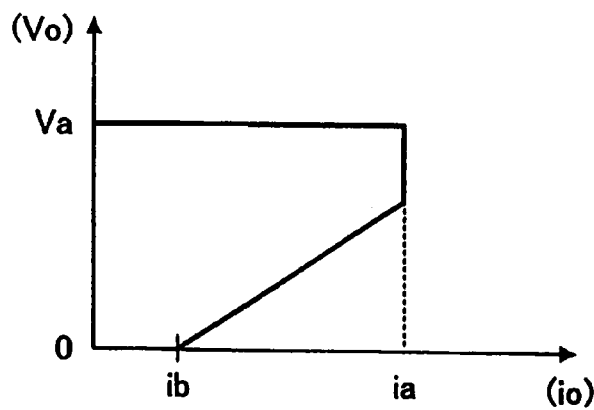
FIG. 36 is a diagram illustrating an exemplary operation when the current limiting circuit unit 122 operates together with the short-circuit protection circuit unit 123.

When the voltage regulator circuit 102 is comprised of the voltage regulator circuit unit 121, current limiting circuit unit 122 and short-circuit protection circuit unit 123 as illustrated in FIG. 33, the current value ic at which the short-circuit protection circuit unit 123 starts operating is set slightly larger than the limited current value ia of the current limiting circuit unit 122, resulting in the relationship between the output voltage Vo and output current io as shown in FIG. 36. As can be seen from FIG. 36, the current limiting circuit unit 122 first starts operating, followed by the operation of the short-circuit protection circuit unit 123 at the intersection of the output voltage Vo of the voltage regulator circuit unit 121 with the characteristic curve of the short-circuit protection circuit unit 123. Even if the output voltage Vo is reduced to 0 V, the current ib determined by the input offset voltage of the operational amplifier 153 flows from the output terminal OUT as the output current io.

Figure 37:
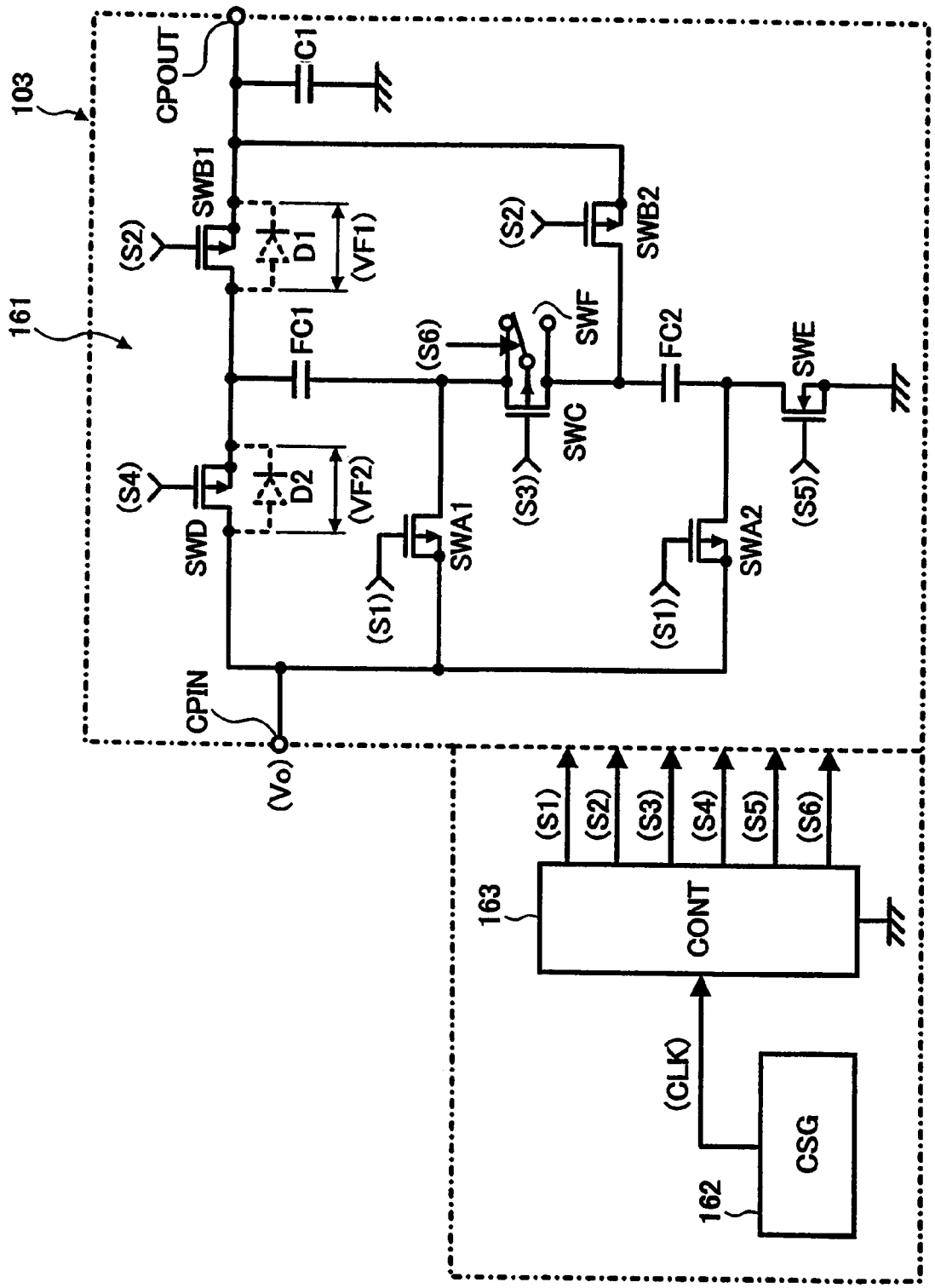
FIG. 37 is a diagram illustrating an exemplary circuit configuration of a charge pump circuit 103 in FIG. 33.

Next, FIG. 37 is a diagram illustrating an exemplary circuit configuration of the charge pump circuit 103 in FIG. 33.

In FIG. 37, the charge pump circuit 103 comprises a charge pump circuit unit 161 for boosting the voltage Vo applied from the voltage regulator circuit 102 by a factor of 1.5 and outputting the boosted voltage; a clock signal generator circuit unit (CSG) 162 for generating and outputting a clock signal CLK at a predetermined frequency (in a range of 100 kHz to 1 MHz); and a control circuit unit (CONT) 163 for controlling the boosting operation of the charge pump circuit unit 161 based on the clock signal CLK applied thereto from the clock signal generator circuit unit 162.

The charge pump circuit unit 161 comprises a pair of capacitors (hereinafter referred to as the "fly back capacitors".) FC1, FC2 having the same capacitance; a capacitor (hereinafter referred to as the "catch-up capacitor") C1 for stabilizing an output voltage of the charge pump circuit unit 161; and first switching elements SWA1, SWA2, second switching elements SWB1, SWB2, a third switching element SWC and a fourth switching element SWD each comprised of a PMOS transistor. The charge pump circuit unit 161 further comprises a fifth switching element SWE comprised of an NMOS transistor, and a change-over switch SWF which switches in response to a control signal S6 applied thereto.

Each of the first switching elements SWA1, SWA2 is applied with a control signal S1 at a gate from the control circuit unit 163, while each of the second switching elements SWB1, SWB2 is applied with a control signal S2 at a gate from the control circuit unit 163. Also, the third switching element SWC is applied with a control signal S3 at a gate from the control circuit unit 163, the fourth switching element SWD is applied with a control signal S4 at a gate from the control circuit unit 163, and the change-over switch SWF is applied with the control signal S6 from the control circuit unit 163.

When the clock signal CLK is at a high (High) level, the control circuit unit 163 holds each of the control signals S1, S2, S5, S6 at a high level, and each of the control signals S3, S4 at a low (Low) level. In this state, each of the first switching elements SWA1, SWA2 and the second switching elements SWB1, SWB2 is turned off and remains in a shut-off state, while each of the third switching element SWC, fourth switching element SWD and fifth switching element SWE is turned on and remains in a conductive state. Further, the change-over switch SWF connects a substrate gate (back gate) to a source in the third switching element SWC. In this state a, since each of the fly back capacitors FC1, FC2 connected in series is charged with the input voltage Vo, each of the fly back capacitors FC1, FC2 is charged to one half of the voltage Vo.

Next, as the clock signal CLK falls to a low level, the control circuit unit 163 immediately brings each of the control signals S3, S4 to a high level, and brings each of the control signals S5, S6 to a low level, resulting in a transition to a state b. In response to the transition from the state a to the state b, each of the third switching element SWC, fourth switching element SWD and fifth switching element SWE is turned off and in a shut-off state. Simultaneously, the change-over switch SWF connects the substrate gate to the drain in the third switching element SWC. Since all the switching elements are turned off in the state b, each of the fly back capacitors FC1, FC2 is charged to one half of the voltage Vo.

Next, the control circuit unit 163 brings the control signal S2 to a low level in a predetermined time t1 after the clock signal CLK falls to a low level, resulting in a transition to a state c. In response to the transition from the state b to the state c, each of the second switching elements SWB1, SWB2 is turned on and in a conductive state. In the state c, each of the second switching elements SWB1, SWB2 is turned on, each of the remaining switching elements is turned off, and a high potential side of each of the fly back capacitors FC1, FC2 is connected to the output terminal CPOUT. In this event, when a voltage on the catch-up capacitor C1 is higher than the voltage Vo, the fourth switching element has a drain voltage higher than a source voltage. However, since the substrate gate is connected to the drain in the fourth switching element SWD, no current will flow through a parasitic diode of the fourth switching element SWD.

Also, in the third switching element SWC, the drain voltage is equal to the voltage on the catch-up capacitor C1, and the source voltage is equal to one half of the voltage on the catch-up capacitor C1, causing the drain voltage to be higher than the source voltage in the third switching element SWC. However, since the change-over switch SWF connects the substrate gate to the drain in the third switching element SWC, no current will flow through a parasitic diode of the third switching element SWC.

The control circuit unit 163 brings the control signal S1 to a low level in a predetermined time t2 after the transition to the state c, resulting in a transition to a state d. In response to the transition from the state c to the state d, each of the first switching elements SWA1, SWA2 is turned on and in a conductive state. In the state d, each of the first switching elements SWA1, SWA2 and second switching elements SWB1, SWB2 is turned on, while each of the third switching element SWC, fourth switching element SWD and fifth switching element SWE is turned off.

Therefore, a low potential side of each of the fly back capacitors FC1, FC2 is connected to the input terminal CPIN. From the foregoing, a voltage on the high potential side of each of the fly back capacitors FC1, FC2 is 1.5 times as high as the voltage Vo. The catch-up capacitor C1 is charged with this voltage, so that the voltage on the catch-up capacitor C1 is also increased to a voltage 1.5 times as high as the voltage Vo.

Next, as the clock signal CLK rises to a high level, the control circuit unit 163 immediately brings each of the control signals S1, S2 to a high level, resulting in a transition to a state e. In response to the transition from the state d to the state e, each of the first switching elements SWA1, SWA2 and second switching elements SWB1, SWB2 is turned off and in a shut-off state. In the state e, all the switching elements are turned off, and the fly back capacitors FC1, FC2 have supplied charges thereon to the catch-up capacitor C1, so that each of the charged voltages on the fly back capacitors FC1, FC2 is lower than one half of the voltage Vo.

Next, the control circuit unit 163 brings the control signal S4 to a low level and brings each of the control signals SS, S6 to a high level in a predetermined time t3 after the clock signal CLK rises to a high level, resulting in a transition to a state f. In response to the transition from the state e to state f, each of the fourth switching element SWD and fifth switching element SWE is turned on and in a conductive state. The change-over switch SWF in turn connects the substrate gate to the source in the third switching element SWC.

In the state f, each of the fourth switching element SWD and fifth switching element SWE is turned on to make the high potential side of the fly back capacitor FC1 equal to the voltage Vo, causing the low potential side of the fly back capacitor FC1 to be at a voltage slightly higher than Vo/2. Also, since the low potential side of the fly back capacitor FC2 is at the ground potential, the high potential side is at a voltage slightly lower than Vo/2. From the foregoing, the third switching element SWC has a source voltage higher than a drain voltage, causing the change-over switch SWF to switch the connection of the substrate gate from the drain to the source in the third switching element SWC, thereby preventing a reactive current due to the parasitic diode of the third switching element SWC as well as preventing a reactive current flowing through a parasitic transistor based on the substrate gate.

The control circuit unit 163 brings the control signal S3 to a low level in a predetermined time t3 after the transition to the state f, resulting in a transition to the state a. In response to the transition from the state f to the state a, the third switching element SWC is turned on and in a conductive state.

Since the charge pump circuit unit 161 charges a capacitor having a relatively large capacitance with the voltage Vo applied from the voltage regulator circuit 102, a large rush current is generated upon power-on. Since the rush current flows through the first switching elements SWA1, SWA2, second switching elements SWB1, SWB2, third switching element SWC, fourth switching element SWD and fifth switching element SWE in the charge pump circuit unit 161, and the output control transistor 131 in the voltage regulator circuit 102, as well as through lead wires of terminals for connecting the capacitors, these elements must have high current tolerances. However, since an element having a higher current tolerance necessarily results in a larger size of the element, a large chip area is required when implemented in an IC chip, causing an increase in the cost.

To solve this problem, the power supply circuit according to the third embodiment comprises the voltage regulator circuit 102 as an input power supply for the charge pump circuit 103. The voltage regulator circuit 102 is provided with the current limiting circuit 122 to reduce the rush current, thereby making it possible to implement an IC chip without increasing the size of each element. Further, even when the output terminal CPOUT of the charge pump circuit 103 is short-circuited to the ground voltage, the short-circuit protection circuit unit 123 provided in the voltage regulator circuit 102 can protect the first switching elements SWA1, SWA2, second switching elements SWB1, SWB2, third switching element SWC, fourth switching element SWD, fifth switching element SWE, the output control transistor 31 in the voltage regulator circuit 102, and the like from a large current.

Fourth Embodiment

In the charge pump circuit 103 shown in the third embodiment, since each of the switching elements in the charge pump circuit unit 161 is comprised of a MOS transistor, a parasitic diode is formed. For example, the second switching element SWB1 and fourth switching element SWD are formed with associated parasitic diodes D1, D2 as indicated by dotted lines in FIG. 5. Therefore, even when the output terminal CPOUT of the charge pump circuit 3 is at the ground potential due to short-circuiting of the load 111, the output voltage Vo is applied from the voltage regulator circuit 102, causing a current to flow through the parasitic diodes D1, D2.

From the foregoing, the output voltage Vo of the voltage regulator circuit 102 upon short-circuiting of the load amounts to the sum of a forward voltage VF1 of the parasitic diode D1, a forward voltage VF2 of the parasitic diode D2, and a voltage calculated by:

Short-Circuit Current×(RF1+FR2+wiring resistance)

so that the output voltage Vo is merely reduced to about 2 V, where RF1 represents a DC resistance component of the parasitic diode D1, and RF2 represents a DC resistance component of the parasitic diode D2. If the output voltage Vo of the voltage regulator circuit 102 is reduced only to a voltage as low as the foregoing upon short-circuiting of a load, the short-circuit protection circuit unit 123 does not sufficiently act, thereby leaving a large current to continuously flow from the voltage regulator circuit 102. To effectively operate the short-circuit protection circuit unit 123, the output voltage Vo of the voltage regulator circuit 102 should be reduced to near 0 V. A fourth embodiment of the present invention provides such a configuration for solving the above-mentioned problem.

Figure 38:
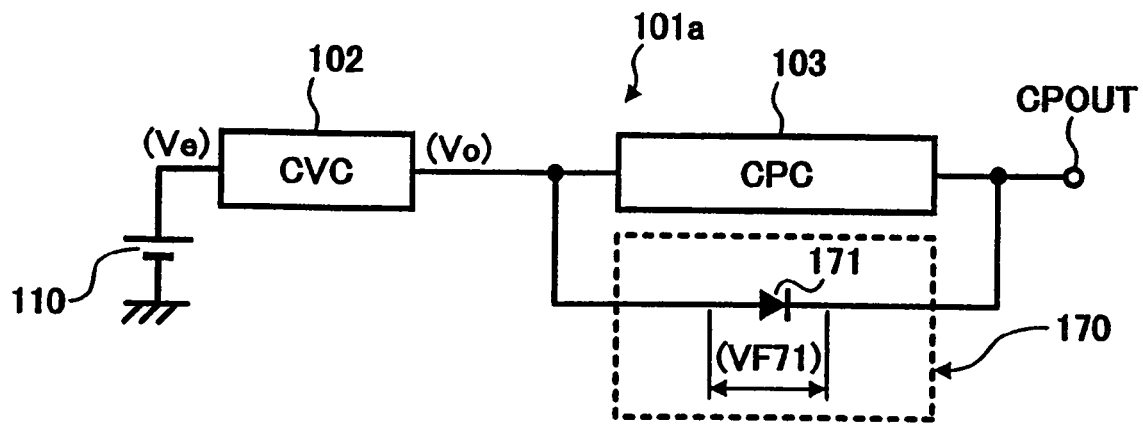
FIG. 38 is a block diagram generally illustrating an exemplary power supply circuit according to a fourth embodiment of the present invention.

FIG. 38 is a block diagram generally illustrating an exemplary power supply circuit according to the fourth embodiment of the present invention. In FIG. 38, components identical to those in FIG. 33 are designated the same reference numerals, and description thereon is omitted. The following description will be made only on differences with FIG. 33.

The power supply circuit illustrated in FIG. 38 differs from that in FIG. 33 in that a switching circuit 170 is provided for controlling a connection of the output terminal OUT of the voltage regulator circuit 102 to the output terminal CPOUT of the charge pump circuit 103. This involves replacement of the power supply circuit 101 in FIG. 33 with the power supply circuit 101a in FIG. 38.

The switching circuit 170 comprises a diode 171 connected in parallel with the charge pump circuit 103 such that the charge pump circuit 103 has the input terminal CPIN to the output terminal CPOUT connected in a forward direction. The diode 171 may be implemented by a MOS transistor which has a gate and a source or a gate and a drain connected to each other to have diode characteristics.

When the output voltage of the charge pump circuit 103 is lower than the output voltage Vo of the voltage regulator circuit 102 which is applied to the charge pump circuit 103, a current flows through the diode 71 to reduce a difference between the input voltage and output voltage of the charge pump circuit 103. In this way, when the voltage at the output terminal CPOUT is reduced to 0 V, the switching circuit 170 can reduce the output voltage Vo of the voltage regulator circuit 102 to near 0 V. It is therefore possible to effectively operate the short-circuit protection circuit unit 123 in the voltage regulator circuit 102.

Specifically, when the output voltage of the charge pump circuit 103 is lower than the output voltage Vo of the voltage regulator circuit 102 applied to the charge pump circuit 103 by a forward voltage VF71 of the diode 171 or more, the diode 171 turns on. Therefore, when the output terminal CPOUT of the charge pump circuit 103 is short-circuited to be at 0 V, the output voltage Vo of the voltage regulator circuit 102 is equal to the forward voltage VF71 of the diode 171, causing the short-circuit protection circuit unit 123 to act to prevent a large current from continuously flowing from the voltage regulator circuit 102. When a Schottky diode having a smaller forward voltage is used for the diode 171, the short-circuit protection circuit unit 123 acts more effectively, making it possible to reduce the current output from the voltage regulator circuit 102 when the output terminal CPOUT is short-circuited to the ground voltage.

Figure 39:
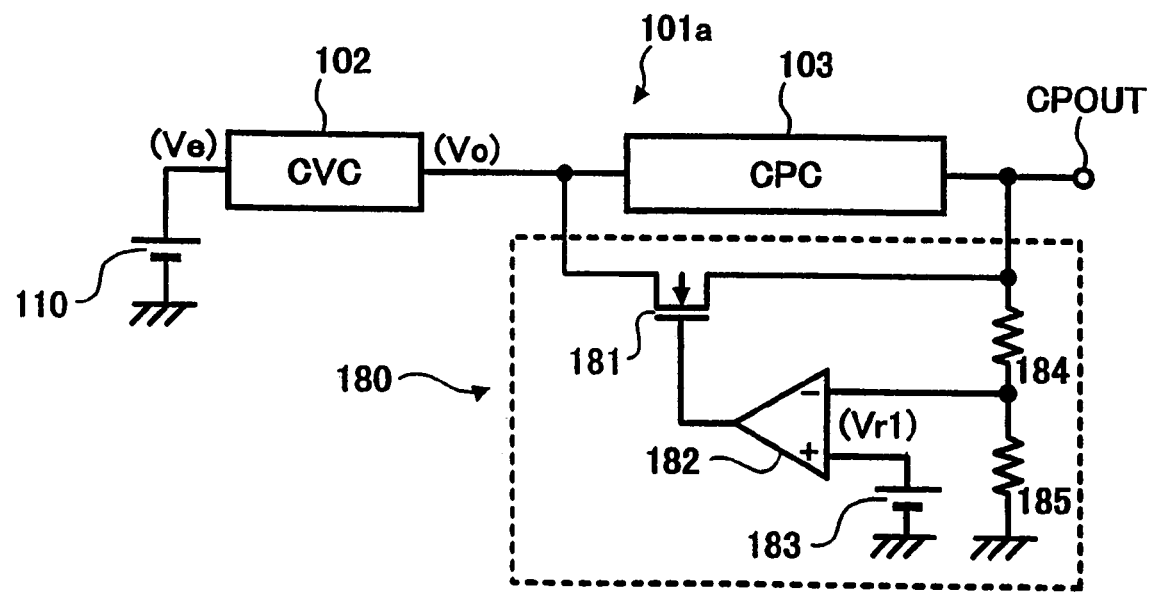
FIG. 39 is a block diagram illustrating another exemplary power supply circuit in the fourth embodiment of the present invention.

FIG. 39 is a block diagram illustrating another exemplary power supply circuit in the fourth embodiment of the present invention. Components in FIG. 39 identical to those in FIG. 38 are designated the same reference numerals, and description thereon is omitted here. The following description will be made only on differences with FIG. 39.

A switching circuit 180 in FIG. 39 comprises an NMOS transistor 181, a comparator 182, a constant voltage generator circuit 183, and resistors 184, 185. The NMOS transistor 181 is substituted for the diode 171 in FIG. 38 such that a voltage at which the NMOS transistor 181 is turned on can be set in an arbitrary manner with respect to the output voltage of the charge pump circuit 103.

In the switching circuit 180, the NMOS transistor 181 is connected between the input terminal CPIN and output terminal CPOUT of the charge pump circuit 103. The NMOS transistor 181 has a gate connected to an output terminal of the comparator 182. On the other hand, a series circuit of the resistors 84, 85 is connected between the output terminal CPOUT and ground voltage. The output voltage of the charge pump circuit 103 is divided by the resistors 184, 185, and the resulting voltage is applied to an inverting input terminal of the comparator 182. A constant voltage Vr1 is applied to a non-inverting input terminal of the comparator 182 from the constant voltage generator circuit 183. The constant voltage Vr1 is set at a voltage smaller than the output voltage Vo.

In the configuration as described above, as the voltage at the output terminal CPOUT is reduced to cause the voltage divided by the resistors 184, 185 to be lower than the constant voltage Vr1, the output terminal of the comparator 182 rises from a low level to a high level to turn on the NMOS transistor 181. In this way, the switching circuit 180 can further reduce the output voltage Vo of the voltage regulator circuit 102 when the output terminal CPOUT of the charge pump circuit 103 is short-circuited. Moreover, it is possible to arbitrarily set the output voltage of the charge pump circuit 103 at which the NMOS transistor 181 is turned on.

Figure 40:
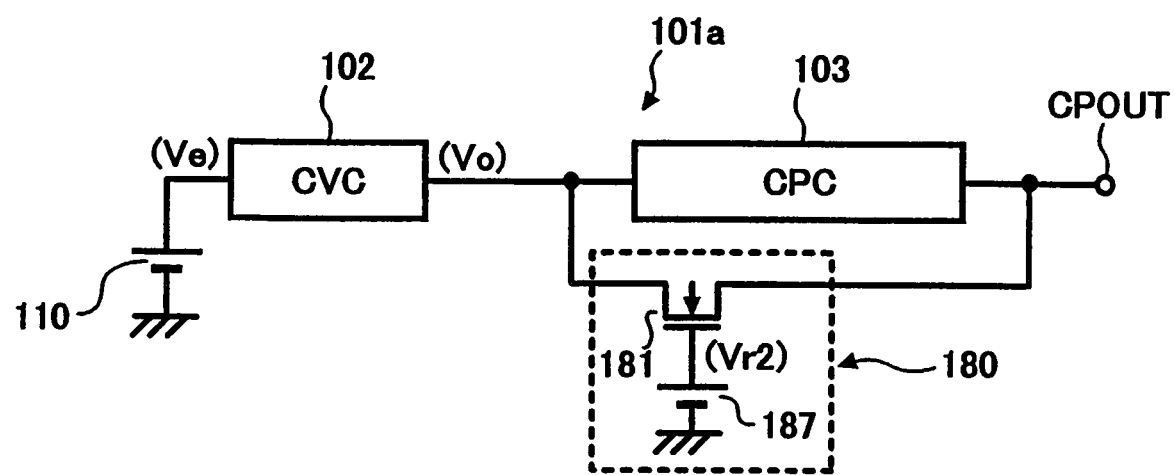
FIG. 40 is a block diagram illustrating a further exemplary power supply circuit in the fourth embodiment of the present invention.

Alternatively, a predetermined constant voltage may be applied to the gate of the NMOS transistor 181 in FIG. 39, in which case the resulting switching circuit 180 is as illustrated in FIG. 40. Components in FIG. 40 identical to those in FIG. 39 are designated the same reference numerals.

In FIG. 40, the switching circuit 180 comprises an NMOS transistor 181 and a constant voltage generator circuit 187 which generates a predetermined constant voltage Vr which is output to a gate of the NMOS transistor 181. The constant voltage Vr2 is set at a voltage lower than the sum of the output voltage Vo of the voltage regulator circuit 102 and a threshold voltage of the NMOS transistor 181. As the voltage at the output terminal CPOUT is reduced below the constant voltage Vr2, the NMOS transistor 181 is turned on.

As described above, the power supply circuit according to the fourth embodiment is provided with the switching circuit for reducing the output voltage Vo of the voltage regulator circuit 102 when the output terminal CPOUT is short-circuited to the ground voltage. From the foregoing, the output voltage Vo of the voltage regulator circuit 102 can be reduced upon short-circuiting of a load, causing the short-circuit protection circuit unit 123 to operate to prevent a large current from continuously flowing from the voltage regulator circuit 102.

In the fourth embodiment, the switching circuit is connected external to the charge pump circuit 103 for facilitating the understanding of the description. It should be understood that this is a mere example, and the present invention is not limited to the illustrated particular configuration. Alternatively, the switching circuit may be disposed in the charge pump circuit 103.

Numerous additional modifications and variations are possible in light of the above teachings. It is therefore to be understood that within the scope of the appended claims, the disclosure of this patent specification may be practiced otherwise than as specifically described herein.

What is claimed is:

1. A circuit comprising:
    a single integrated circuit chip, said integrated circuit chip comprising:
        a charge pump circuit, said charge pump circuit comprising:
            a plurality of conductor pairs, each conductor pair for coupling to a respective one of plurality of first capacitors each to be charged with an input voltage, each conductor pair having a first low potential side conductor and a second high potential side conductor;
            a plurality of first switching elements each for connecting the low potential side conductor of a corresponding one of said plurality of pairs of conductors to a positive power supply input terminal;
            a plurality of second switching elements each for connecting the high potential side conductor of the corresponding one of said plurality of pairs of conductors to an output terminal;
            at least one third switching element connected to a corresponding one of said plurality of conductor pairs in series;
            a fourth switching element for connecting one end of a series circuit of each corresponding one of said plurality of conductor pairs and said at least one third switching element to said positive power supply input terminal;
            a fifth switching element for connecting the other end of the series circuit of each corresponding one of said plurality of conductor pairs and said at least one third switching element to a negative power supply input terminal; and
            a control circuit for controlling each of said first switching elements, each of said second switching elements, each of said at least one third switching element, said fourth switching element and said fifth switching element in response to a clock signal; and
        a current regulator circuit connecting a load.

2. The circuit of claim 1, wherein each of said second switching elements comprises a MOS transistor having a substrate gate connected to form a parasitic diode in a direction in which a current flow is prevented from said output terminal to the corresponding one of said plurality of conductor pairs; and
    said fourth switching element, comprises a MOS transistor having a substrate gate connected to form a parasitic diode in a direction in which a current flow is prevented from each of said plurality of conductor pairs to said positive power supply input terminal.

3. The circuit of claim 1, wherein said control circuit turns off each of said first switching elements, each of said second switching elements, each of said at least one third switching element, said fourth switching element and said fifth switching element in response to a change in a signal level of said clock signal, turns on each of said second switching elements after the lapse of a first predetermined time from said change in the clock signal, and turns on each of said first switching elements after the lapse of a second predetermined time after said change in the clock signal.

4. The circuit of claim 1, wherein said control circuit, on said single integrated circuit chip, turns off each of said first switching elements, each of said second switching elements, each of said at least one third switching element, said fourth switching element and said fifth switching element in response to a change in a signal level of said clock signal, turns on said fourth switching element and said fifth switching element after the lapse of a third predetermined time from said change in the clock signal, and turns on each of said at least one third switching element after the lapse of a fourth predetermined time from said change in the clock signal.

5. The circuit of claim 1, wherein
    each of said at least one third switching element comprises a MOS transistor;
    said charge pump circuit further comprises a plurality of change-over switches each for connecting a substrate gate of a corresponding one of said MOS transistors to a drain or a source of said MOS transistor; and
    said control circuit controls the switching of said change-over switches in response to said clock signal.

6. The circuit of claim 5, wherein said control circuit turns off each of said first switching elements, each of said second switching elements, each of said at least one third switching element, said fourth switching element and said fifth switching element in response to a change in a signal level of said clock signal, turns on said fourth switching element and said fifth switching element, and switches each of said change-over switches after the lapse of a third predetermined time from said change in the clock signal.

7. The circuit of claim 6, wherein said control circuit controls each of said change-over switches to switch the connection of the substrate gate after the lapse of the third predetermined time to form a parasitic diode in a direction in which a current generated by a voltage applied to said positive power supply input terminal is prevented.

8. The circuit of claim 1, wherein said charge pump circuit further comprises an output capacitor connected to said output terminal.

* * * * *